(12) United States Patent
Griffel et al.

(10) Patent No.: US 11,170,219 B2
(45) Date of Patent: Nov. 9, 2021

(54) SYSTEMS AND METHODS FOR IMPROVED LANDSCAPE MANAGEMENT

(71) Applicant: Battelle Energy Alliance, LLC, Idaho Falls, ID (US)

(72) Inventors: Lloyd M. Griffel, Idaho Falls, ID (US); Damon S. Hartley, Idaho Falls, ID (US); Matthew R. Kunz, Idaho Falls, ID (US)

(73) Assignee: BATTELLE ENERGY ALLIANCE, LLC., Idaho Falls, ID (US)

( * ) Notice: Subject to any disclaimer, the term of this patent is extended or adjusted under 35 U.S.C. 154(b) by 80 days.

(21) Appl. No.: 16/550,081

(22) Filed: Aug. 23, 2019

(65) Prior Publication Data

US 2021/0004592 A1    Jan. 7, 2021

Related U.S. Application Data

(60) Provisional application No. 62/870,674, filed on Jul. 3, 2019, provisional application No. 62/871,076, filed on Jul. 5, 2019.

(51) Int. Cl.
| | | |
|---|---|---|
| *G06K 9/00* | (2006.01) | |
| *G06K 9/62* | (2006.01) | |
| *G06Q 50/02* | (2012.01) | |
| *G06N 20/00* | (2019.01) | |
| *A01C 21/00* | (2006.01) | |
| *A01B 79/00* | (2006.01) | |

(52) U.S. Cl.
CPC ........ *G06K 9/00657* (2013.01); *A01B 79/005* (2013.01); *A01C 21/007* (2013.01); *G06K 9/6256* (2013.01); *G06N 20/00* (2019.01); *G06K 2009/00644* (2013.01); *G06Q 50/02* (2013.01)

(58) Field of Classification Search
CPC ............. G06K 9/00657; G06K 9/6265; G06K 2009/00644; G06K 9/6256; A01C 21/007; G06Q 50/02; A01B 79/005; G06N 20/00; G06N 3/082
See application file for complete search history.

(56) References Cited

U.S. PATENT DOCUMENTS

2016/0148104 A1* 5/2016 Itzhaky et al. ........... G06N 5/04
2018/0070527 A1* 3/2018 Richt ................... A01B 79/005

* cited by examiner

*Primary Examiner* — Siamak Harandi

(57) ABSTRACT

Disclosed here are systems, methods, apparatus, and/or non-transitory computer-readable storage comprising machine-readable code for the development and application of high-resolution crop yield models. The disclosed yield models may be captured yield data and corresponding remote sensing data covering relatively limited areas. Embodiments of the disclosed yield models may be capable of estimating spatial yield characteristics in areas for which accurate yield data are not available (and/or not practical to acquire), thereby enabling more widespread application of integrated land management techniques.

24 Claims, 18 Drawing Sheets

SYSTEMS AND METHODS FOR IMPROVED LANDSCAPE MANAGEMENT

CROSS-REFERENCES TO RELATED APPLICATIONS

The Application Data Sheet filed herewith is incorporated by reference. This application claims priority to U.S. Provisional Patent Application No. 62/870,674, filed Jul. 3, 2019 and U.S. Provisional Patent Application No. 62/871,076, filed Jul. 5, 2019, each of which is hereby incorporated by reference to the extent such subject matter is not inconsistent with this disclosure.

STATEMENT REGARDING FEDERALLY SPONSORED RESEARCH OR DEVELOPMENT

This invention was made with government support under Contract Number DE-AC07-05-ID14517 awarded by the United States Department of Energy. The government has certain rights in the invention.

TECHNICAL FIELD

The present disclosure generally relates to integrated landscape management, and, in particular, to utilizing remote sensing data and machine learning techniques to improve the accuracy, resolution, and scalability of yield predictions.

BACKGROUND

The demand for food and animal feed is expected to increase over the coming decades as population and average incomes increase throughout the world. At the same time, the urgent need to meet rising energy demands through the development of biofuels has resulted in policies that encourage cultivation of biomass feedstocks. In order to progress towards making food-, feed-, and energy-related practices more sustainable, broader land use aspects of agricultural operations are gaining prominence. Against this backdrop, techniques for managing crop-producing land at higher levels of granularity are being developed, leading to better utilization of crop production inputs where properly applied. As used herein, crop production inputs (or simply "inputs") refer to any suitable means for cultivating land and/or producing an output therefrom, including, but not limited to: fertilizers, herbicides, seed, fuel (fuel required to apply various inputs), any/or the like. As used herein, an agricultural output (or simply "output" or "yield") refer to any benefit derived from cultivated land, including, but not limited to: biomass, a crop, a primary crop, one or more secondary crops, soil conditioning, carbon sequestration, and/or the like.

As used herein, techniques for managing crop production at higher levels of granularity (e.g., by subfield location) may be referred to as High-Resolution Land Management (HRLM) or subfield management. HRLM may comprise and/or incorporate Variable-Rate Technologies to control the utilization of crop production inputs within respective fields (at a subfield level of granularity). As used herein, Variable-Rate Technology (VRT) refers to any technology and/or technological process configured to enable and/or control variations in crop inputs within a field, VRT may combine a variable-rate (VR) control system with application equipment to apply crop production inputs at a precise time and/or location to achieve determined, site-specific application rates of various inputs.

The efficacy of HRLM methodologies are predicated on a number of important considerations: 1) substantial variations exist within crop-producing regions (fields), which variations can have a significant impact on output; 2) the causes of these variations can be identified and measured; and 3) information from these measurements can be used to adapt agricultural practices (e.g., inputs) at a subfield level, leading to improved outputs, decreased costs, and/or reduced environmental impacts.

Existing methods for yield prediction and/or modeling are not sufficiently accurate or scalable. Many conventional yield assessments are derived from National Commodity Crop Productivity Index (NCCPI) values. NCCPI were developed by the United States Department of Agriculture (USDA) as a means for estimating commodity crop production based on inherent soil properties in rain-fed agricultural systems, and are intended to reflect gradations between the point at which combinations of soil, site, and climate features have the greatest impact on inherent soil productivity. NCCPI values are available in Soil Survey Geographic Database (SSURGO) tables as decimal values ranging from 0.001 (low productivity) to 1.0 (high productivity). However, NCCPI values often provide inaccurate assessments since, inter alia, NCCPI values fail to account for spatial variability in crop yield patterns driven by complex interactions of soil, topography, fertility, water and nutrient variability, pests, and weed pressures, and other factors.

Some producers capture yield data during harvest operations. As used herein, "measured yield data," "machine yield data," or "captured yield data" refers to yield data configured to monitor the actual yield obtained at respective field locations. Captured yield data may comprise spatiotemporal yield measurements, each yield measurement quantifying a yield (and/or yield rate) obtained at a specified time at a specified location. For example, machine yield data may be captured by harvesting equipment and/or by use of a yield monitor device(s) operatively coupled to the harvesting equipment (e.g., on a harvester, combine, and/or the like). The yield monitor device may be configured to monitor yield as a function of location and/or time, e.g., may monitor the location of the harvesting equipment and capture yield measurements at a determined monitoring frequency (e.g., every N seconds).

Attempting to utilize machine yield data for widespread HRLM is error-prone, inefficient, complex, and non-scalable. Many organizations (producers) may not have the capability (or interest) in capturing machine yield data. Organizations that do capture machine yield data may not be willing to make such data available outside the organization. Moreover, even if producers are willing, acquiring accurate captured yield data from multiple producers requires directly interfacing each producer, performing complex data transfers of spatiotemporal captured yield data from each producer (which may have different, proprietary representations and/or may be maintained in different formats), combining captured yield data from multiple different sources, and so on. Importing captured yield data may comprise extracting, interpreting, and/or transforming yield measurements and corresponding time and/or location data having a respective format and/or encoding (e.g., absolute location coordinates, relative location coordinates, Geographic Information System (GIS) data, Global Positioning System (GPS) coordinates, and/or the like). Furthermore, in many cases, captured machine data may not be sufficiently accurate. The accuracy of captured yield data is predicated on operators adhering to calibration requirements (e.g., calibration of the harvester equipment, monitoring devices, and/or the like), which can be tedious and time-consuming. Since harvest operations often require long operator hours, and often must be completed within limited, potentially variable timeframes (e.g., before freeze conditions), operators may not follow proper calibration procedures, which can severely limit the availability of reliable, statistically sound captured yield data.

Effective HRLM techniques, such as Integrated Landscape Management (ILM), rely on accurate, widespread spatial yield modeling data. As used herein, ILM refers to techniques, models, and/or methodologies for incorporation of alternative cropping practices at a subfield level such as transitioning low-yielding areas to better-suited perennial bioenergy crops, resulting in reduced crop input expenses and soil erosion. What is needed, therefore, are systems and methods for developing accurate, high-resolution yield models from relatively limited amounts of machine yield data and/or leveraging other types of data in such models.

SUMMARY

Disclosed here are systems, methods, apparatus, and/or non-transitory computer-readable storage comprising machine-readable code for, inter alia, the development and application of accurate, high-resolution yield models from limited machine yield data. Embodiments of the disclosed high-resolution yield models may be capable of modeling yield variability in fields for which no machine yield data is available, thereby enabling more widespread application of HRLM techniques, such as VRT and/or ILM. Embodiments of the disclosed high-resolution yield models may be capable of modeling yield variability within regions which no machine yield data is available, thereby enabling the use of HRLM techniques, such as VRT and/or ILM, within such regions.

In some embodiments, remote sensing data may be used to model spatial yield variations. The remote sensing data may comprise electro-magnetic reflectance (EMR) data. The EMR data may correspond to selected wavelengths and/or bands that correspond to crop phenology attributes, such as chlorophyll absorption, leaf area biomass, canopy, canopy moisture content, and/or the like (e.g., visible, near-infrared (NIR), shortwave infrared (SWIR), and/or the like). As disclosed above, spatial variability in crop yield is driven by complex interactions of many different factors including, but not limited to: soil, topography, fertility, water and nutrient variability, pests, weed pressures, and/or the like. Ongoing interactions of biotic and abiotic stressors may change over time (e.g., may change during a production interval, such as a growing season or the like), resulting in complex patterns and intertwining relationships within corresponding EMR data. Disclosed herein are machine learning techniques configured to model and/or predict crop yields at respective subfield locations based on, inter alia, EMR data acquired from the respective subfield locations.

Disclosed herein are embodiments of a method for spatial crop yield modeling, comprising constructing training vectors for a yield model by, inter alia, deriving yield quantities from yield measurements of a specified crop produced at respective subfield locations within a first field during a first production interval, constructing a first set of feature vectors, the feature vectors of the first set derived from remote sensing data configured to capture respective subfield locations within the first field at each of a plurality of first acquisition times during the first production interval. Embodiments of the disclosed method may further comprise training the yield model to estimate yield quantities associated with respective feature vectors of the first set in response to the respective feature vectors, and predicting spatial yield characteristics of the specified crop produced during a second production interval. The predicting may comprise deriving a second set of feature vectors, the feature vectors of the second set derived from remote sensing data configured to capture respective subfield locations within a second field at each of a plurality of second acquisition times during the second production interval, and using the yield model to produce yield estimates for respective subfield locations within the second field in response to respective feature vectors of the second set. In some embodiments, the method further comprises mapping the yield measurements and remote sensing data configured to capture respective subfield locations within the first field to a feature scheme, and deriving the yield quantities for respective feature vectors of the first set in response to the mapping. The feature scheme may comprise a spatial scale different from a spatial scale of the remote sensing data. The feature vectors may be configured to cover respective geographical areas, and constructing a feature vector configured to cover a specified geographical area may comprise identifying remote sensing data that intersects with the specified area, and deriving the feature vector from the identified remote sensing data. In some embodiments, constructing a feature vector configured to cover a particular geographical region may comprise translating the imported remote sensing data to a spatial feature scheme comprising the particular geographical region, identifying remote sensing data of the imported remote sensing data that covers the particular geographical region in response to the translating, deriving a plurality of data elements from the selected remote sensing data, each data element corresponding to a respective acquisition time of the plurality of acquisition times. Deriving a data element corresponding to a particular acquisition time may comprise selecting remote sensing data of the identified remote sensing data that was captured at the particular acquisition time, and deriving the data element from the selected remote sensing data. Some embodiments of the disclosed method may further comprise configuring the plurality of first acquisition times to correspond with respective target regions defined within the first production interval, importing first remote sensing data for respective subfield locations within the first field, and constructing the first set of feature vectors from the first remote sensing data, each feature vector of the first set derived from remote sensing data elements configured to capture a respective subfield location within the first field at each of the plurality of first acquisition times. The method may further include configuring the plurality of second acquisition times to correspond with respective target regions defined within the second production interval, importing second remote sensing data for respective subfield locations within the second field, and constructing the second set of feature vectors from the second remote sensing data, each feature vector of the second set derived from remote sensing data elements configured to capture a respective subfield location within the second field at each of the plurality of second acquisition times. The target regions defined within the second production interval may be configured to correspond with the target regions defined within the first production interval. The first target acquisition times may be configured to correspond with respective developmental stages of the specified crop during the first production interval, and the second target acquisition times may be configured to correspond with the respective developmental stages of the specified crop during the second production interval.

Disclosed herein are embodiments of non-transitory computer-readable storage medium comprising instructions adapted to configure a computing device to implement operations for spatial crop yield modeling, the operations comprising acquiring yield measurements of a specified crop produced within first regions in first production intervals, importing remote sensing data, comprising first remote sensing data corresponding to the acquired yield measurements, and second remote sensing data corresponding to production of the specified crop within a second region in a second production interval, producing feature vectors from the remote sensing data, each feature vector comprising remote sensing data covering a respective spatial extent at a plurality of different acquisition times, generating a training dataset comprising feature vectors having spatial extents corresponding to the first regions, and yield values derived from yield measurements within spatial extents of respective feature vectors of the training dataset, training a yield model to produce yield estimates for respective spatial extents in response to feature vectors of the training dataset, and utilizing the trained yield model to produce yield estimates in response to feature vectors having spatial extents corresponding to the second region. Producing the feature vectors may further comprise overlaying the remote sensing data with a feature scheme having a resolution different from a resolution of the remote sensing data, identifying remote sensing data overlaid by respective elements of the feature scheme, and deriving the feature vector from the identified remote sensing data. In some embodiments, producing a feature vector configured to cover a particular spatial extent comprises identifying elements of the remote sensor data that intersect with the particular spatial extent, the identifying comprising determining correlation metrics configured to quantify a degree to which respective elements of the identified elements intersect with the particular spatial extent, and deriving the feature vector from the identified elements of the remote sensor data, the deriving comprising weighting respective elements of the identified elements in accordance with the determined correlation metrics. The disclosed operations may further include determining first target acquisition times, each target acquisition time of the first target acquisition times determined to fall within one or more of the first production intervals. Producing the feature vectors may further comprise producing first feature vectors, each feature vector of the first feature vectors derived from remote sensing data configured to cover a respective spatial extent within one or more of the first regions. Producing a feature vector of the first feature vectors may comprise identifying first remote sensing data that intersects with the spatial extent of the feature vector, selecting first subsets of the first remote sensing data, each comprising remote sensing data, of the first remote sensing data, acquired at a respective one of the first target acquisition times, and deriving feature elements of the feature vector from respective ones of the first subsets, such that each feature element of the feature vector is derived from remote sensing data that intersects with the spatial extent of the feature vector captured at a respective one of the first target acquisition times. The disclosed operations may further comprise determining second target acquisition times within the second production interval, the second target acquisition times different from the first target acquisition times. Producing the feature vectors may include producing second feature vectors, each feature vector of the second feature vectors configured to cover a respective spatial extent within the second region. Producing a feature vector of the second feature vectors may comprise identifying second remote sensing data that intersects with the spatial extent of the feature vector, selecting second subsets of the second remote sensing data, each comprising remote sensing data, of the second remote sensing data, acquired at a respective one of the second target acquisition times, and deriving feature elements of the feature vector from respective ones of the second subsets, such that each feature element of the feature vector is derived from remote sensing data that intersects with the spatial extent of the feature vector captured at a respective one of the second target acquisition times. The target acquisition times may be determined to correspond with designated developmental stages of the specified crop during respective production intervals, and the second target acquisition times may be configured to correspond with same developmental stages as the designated stages of the specified crop during the second production interval. In some embodiments, importing the first remote sensing data corresponding to the acquired yield measurements comprises determining N target spatial elements, each target spatial element of the N target spatial elements covering respective extents within the first regions, determining M target acquisition times, each target acquisition time of the M target acquisition times within one or more of the first production intervals, and importing N×M remote sensing data elements, each configured to capture a respective extent within the first regions at one of the M target acquisition times. Feature vectors covering the acquired yield measurements may be produced by mapping the first remote sensing data and the yield measurements to spatial extents of respective feature vectors of the first feature vectors, and deriving the first feature vectors and corresponding yield measurements in response to the mapping. In some embodiments, producing the first feature vectors further comprises determining M-X acquisition times for the first feature vectors, the determining comprising selecting acquisition times corresponding to respective ones of the M target acquisition times, wherein X is between 0 and M−1, constructing M-X feature elements for each feature vector of the first feature vectors. Constructing the M-X feature elements for a feature vector may comprise identifying remote sensing data that intersects with the spatial extent of the feature vector in response to the mapping, determining M-X subsets of the identified remote sensing data, each subset of the M-X subsets comprising remote sensing data, of the identified remote sensing data, acquired at one of the determined M-X acquisition times, and deriving each feature element of the M-X feature elements from remote sensing data of a respective one of the M-X subsets. The M-X acquisition times may be defined within first portions of the first production intervals, such that the yield model is configured to produce yield estimates for production of the specified crop within the second region prior to completion of the second interval.

Disclosed herein are embodiments of a yield modeling apparatus, comprising a computing device comprising a processor, memory, and non-transitory storage, an acquisition module configured for operation on the processor of the computing device, the acquisition module configured to import remote sensing data from one or more repositories, including first remote sensing data configured to cover yield measurements of a specified crop produced during a first season at specified locations within a first field. The yield modeling apparatus may further comprise a feature construction module configured to construct model training data, comprising a first set of feature vectors configured to cover respective subfield locations within the first field, the feature vectors of the first set derived from remote sensing data configured to capture respective subfield locations within the first field at each of a determined number of capture times. The feature construction module may be further configured to associate the first set of feature vectors with respective yield quantities, each derived from yield measurements captured at subfield locations covered by the respective feature vectors of the first set. A yield modeling module may be configured train a yield model to accurately reproduce yield quantities in response to corresponding feature vectors of the first set. The yield modeling module may be further configured to estimate spatial yield characteristics of the specified crop produced in a second field during a second season in response to a second set of feature vectors, the feature vectors of the second set derived from remote sensing data configured to capture respective subfield locations within the second field at each of the determined number of capture times. Constructing a feature vector configured to capture a particular spatial extent at each of the determined number of capture times may comprise feature construction module projecting remote sensing data onto a feature scheme comprising the particular spatial extent, wherein a scale of the particular spatial extent differs from a scale of the remote sensing data, identifying remote sensing data overlaid by the particular spatial extent in response to the projecting, selecting remote sensing data that was acquired at times corresponding to each capture time of the determined number of capture times from the identified remote sensing data, and constructing the feature vector from the selected remote sensing data, such that the feature vector comprises remote sensing data configured to capture same subfield locations at each of a plurality of different capture times. Importing the first remote sensing data may comprise the acquisition module determining first target spatial elements, the first target spatial elements configured to span a spatial extent of the first field, determining first target acquisition times, the first target acquisition times configured to correspond with respective production stages of the specified crop during the first season, and importing a first plurality of remote sensing data elements, each configured to capture a respective one of the first target spatial elements at a respective one of the first target acquisition times. The acquisition module may be further configured to import second remote sensing data corresponding to production of the specified crop within the second field during the second season. Importing the second remote sensing data may comprise the acquisition module determining second target spatial elements, the second target spatial elements configured to span a spatial extent of the second field, determining second target acquisition times, the second target acquisition times configured to correspond to the respective production stages of the specified crop during the second season, and importing a second plurality of remote sensing data elements, each configured to capture a respective one of the second target spatial elements at a respective one of the second target acquisition times.

BRIEF DESCRIPTION OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn are not intended to convey any information regarding the actual shape of the particular elements, and have been solely selected for ease of recognition in the drawings.

FIG. 2B depicts embodiments of an EMR curve, as disclosed herein.

DETAILED DESCRIPTION

Figure 1:
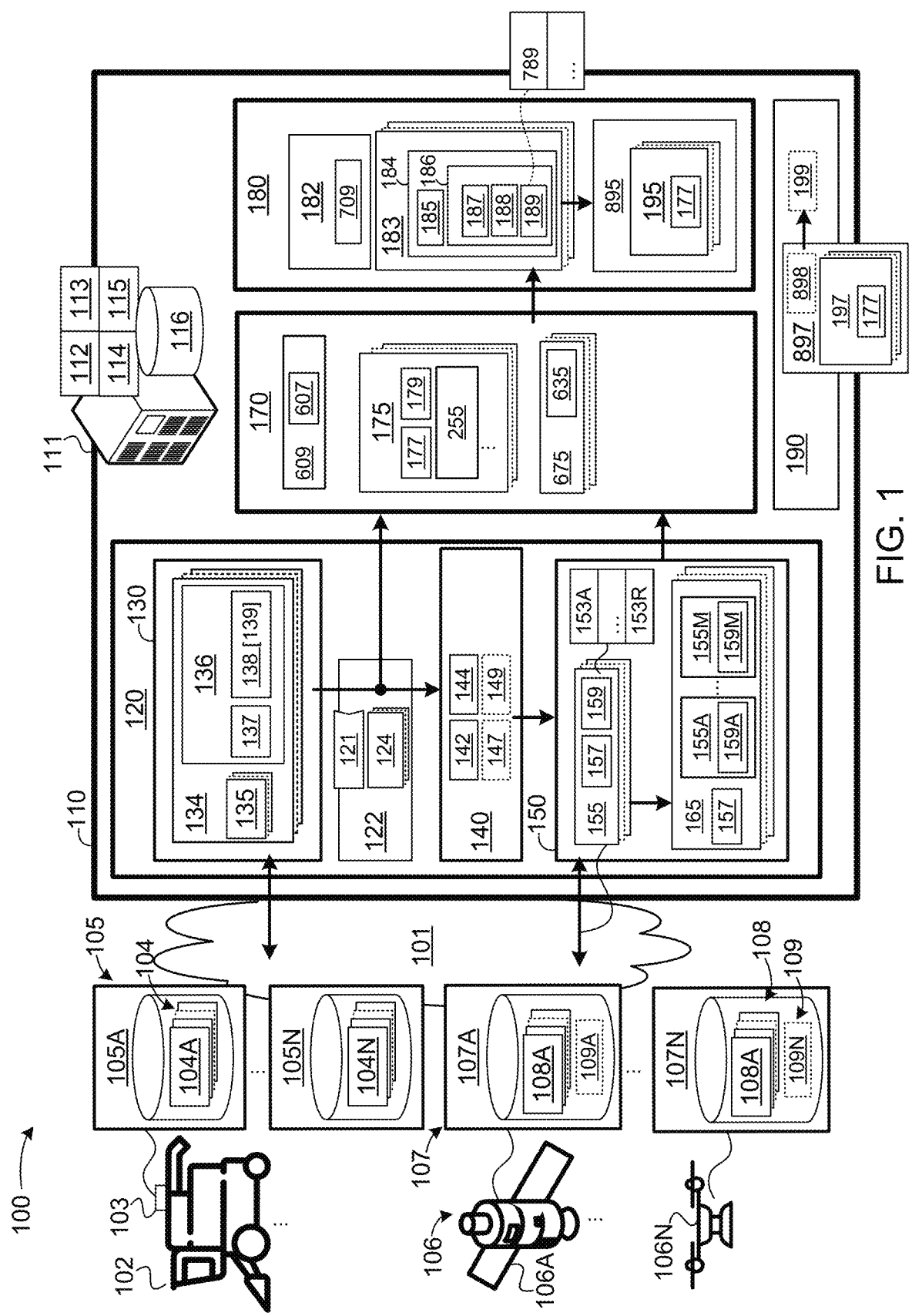
FIG. 1 is a schematic block diagram of embodiments of systems and methods for crop yield modeling, as disclosed herein.

FIG. 1 is a schematic block diagram of one embodiment of a system 100 comprising a yield modeling apparatus 110.

The yield modeling apparatus 110 may comprise and/or be embodied on one or more computing systems, such as a computing device 111. The computing device 111 may comprise a processor 112, memory 113, communication interface 114, human-machine interface (HMI) components 115, non-transitory storage 116, and/or the like. The processor 112 may comprise any suitable means for processing and/or executing computer-readable instructions (e.g., code, machine code, assembly code, source code, interpretable code, script, and/or the like), including, but not limited to: a circuit, a chip, a package, a microprocessor, a microcontroller, a central processing unit, a general-purpose processing unit, a special-purpose processing unit, processing circuity, logic circuitry, an integrated circuit (IC), a System on a Chip (SoC), a Programmable System on a Chip (PsoC), a System in Package (SiP), an Application-Specific Integrated Circuit (ASIC), configurable circuitry, programmable circuitry, a Field Programmable Gate Array (FPGA), a Complex Programmable Logic Device (CPLD), a Programmable Logic Array (PLA), and/or the like. The memory 113 may comprise any suitable means for storing and/or retrieving electronic data including, but not limited to: cache memory, volatile memory, non-volatile memory, Random-Access Memory (RAM), Dynamic RAM (DRAM), Static RAM (SRAM), Thyristor RAM (TRAM), Zero-capacitor RAM (ZRAM), and/or the like. The communication interface 114 may comprise any means for communicatively and/or operatively coupling the computing device 111 (and/or yield modeling apparatus 110) to one or more electronic communication networks, such as the electronic communication network 101 shown in FIG. 1, including, but not limited to: a network interface, a network link, a network card, a network driver, a network protocol, a network stack, and/or the like. The network 101 may comprise any suitable means for electronic communication, including one or more of: a wired communication network, a wireless communication network, the Internet, a virtual private network (VPN), a wide area network (WAN), a WiFi network, a public switched telephone network (PSTN), a cellular communication network, a cellular data network, an Internet Protocol (IP) network, a satellite network, a Near Field Communication (NFC) network, a Bluetooth network, a mesh network, a grid network, and/or the like. The HMI components 115 may comprise any suitable means interacting with the computing device 111, including, but not limited to: input/output devices, output devices, display devices, visual display devices (e.g., a monitor), touch display devices, audio output devices (e.g., speakers), haptic feedback devices, input devices, data input devices (e.g., a keyboard), gesture input devices (e.g., a mouse or touch pad), data capture devices, image capture devices (e.g., a camera or scanner), audio capture devices, and/or the like. The non-transitory storage 116 may comprise any means for persistently storing and/or retrieving electronic data and may include, but is not limited to: a non-transitory storage device, a non-transitory memory device, a solid-state memory, a hard drive, a magnetic disk storage device, an optical storage device, a tape storage device, a Flash memory, a NAND-type Flash memory, a NOR-type Flash memory, a Programmable Metallization Cell (PMC) memory, a Silicon-Oxide-Nitride-Oxide-Silicon (SONOS) memory, a Resistive RAM (RRAM) memory, a Floating Junction Gate RAM (FJG RAM), a ferroelectric memory (FeRAM), a magnetoresistive memory (MRAM), a phase change memory (PRAM), an Electrically Erasable Programmable Read-Only Memory (EEPROM), a cache storage device, a remote storage device, a network-attached storage (NAS) device, and/or the like.

In some embodiments, the yield modeling apparatus 110 (and/or portions thereof) may be embodied as hardware components, such as components of the computing device 111. Alternatively, or in addition, the yield modeling apparatus 110 (and/or portions thereof) may be embodied as computer-readable instructions stored within the non-transitory storage, such as the non-transitory storage 116 of the computing device 111. The computer-readable instructions may be configured for execution by the processor 112, which execution may configure the yield modeling apparatus 110 (and/or computing device 111) to implement operations for high-resolution spatial crop yield modeling, as disclosed herein.

The yield modeling apparatus 110 may comprise an acquisition module 120, which may be configured to acquire data for use in developing high-resolution yield models, as disclosed herein. The acquisition module 120 may be configured to import yield datasets 134, which may comprise and/or correspond to yield data captured during harvest operations (e.g., captured yield data 104, such as machine yield data, as disclosed herein). The acquisition module 120 may be further configured to import remote sensing (RS) data 108 corresponding to the yield datasets 134. As disclosed in further detail herein, the RS data 108 imported by the acquisition module 120 may comprise EMR data acquired by one or more remote sensing data acquisition (RSDA) platforms 106 (e.g., a satellite RSDA platform 106A, drone RSDA platform 106N, and/or the like).

The acquisition module 120 may be configured to acquire yield datasets 134 by use of a yield data import module (YDIM) 130. As used herein, a yield dataset 134 refers to location-based information pertaining to the agricultural output of one or more fields. A yield dataset 134 may comprise a plurality of yield values 135, each yield value 135 quantifying a crop yield measured at a specified location. A yield value 135 may further indicate the time at which the measurement was captured (e.g., a timestamp). The YDIM 130 may import yield datasets 134 from captured yield data 104. Captured yield data 104 may comprise yield data acquired during harvest operations (e.g., machine yield data captured by a harvester 102, yield monitoring device 103, and/or the like, as disclosed herein).

The YDIM 130 may be configured to import captured yield data 104 from one or more yield data (YD) repositories 105 (e.g., import captured yield data 104A-N from respective YD repositories 105A-N). As used herein, a YD repository 105 refers to any suitable means for gathering, maintaining, storing, providing access to, and/or otherwise managing captured yield data 104. A YD repository 105 may comprise a harvester 102, monitoring device 103, memory device, storage device, non-transitory storage device, removable storage device, computing device, network-accessible service (e.g., one or more network-accessible computing devices), and/or the like. The YDIM 130 may be configured to acquire captured yield data 104 by one or more of a direct connection to a YD repository 105 (e.g., a harvester 102, yield monitoring device 103, storage device, computing device, and/or the like), through the network 101, via a proprietary transfer mechanism and/or protocol, and/or the like.

Deriving a yield dataset 134 from captured yield data 104 may comprise defining a plurality of yield values 135 therefrom, each yield value 135 comprising and/or corresponding to a respective yield measurement of the captured yield data 104. In some embodiments, yield measurements of the captured yield data 104 may comprise location information, which may be configured to indicate locations at which the yield measurements were captured. Deriving a yield value 135 from a yield measurement may comprise importing location information of the yield measurement and/or associating the yield value 135 with the imported location information. The location information may comprise any suitable means for representing a location as electronic data, including, but not limited to: location coordinates, an absolute location, a relative location, GPS location data, GPS location coordinates, GIS data, and/or the like. In some embodiments, yield measurements of the captured yield data 104 may comprise timing information, which may be configured to indicate times at which the yield measurements were captured. Deriving a yield value 135 from a yield measurement may comprise importing timing information of the yield measurement and/or associating the yield value 135 with the imported timing information. The timing information may comprise any suitable means for representing a timing information as electronic data, including, but not limited to: a time, a timestamp, a time range, an absolute time, a relative time, a time offset, a date, a date range, and/or the like. Importing captured yield data 104 may comprise extracting, interpreting, transforming, normalizing, and/or otherwise converting yield measurements, location data, timing data, and/or other information of the captured yield data 104.

Importing captured yield data 104 may comprise converting yield measurements, location data, and/or timing data from a native format to a target format. The native format may correspond to a format, encoding, and/or representation of yield measurements, location data, timing data, and/or other information as captured, gathered, maintained, stored, accessed, and/or otherwise managed by respective harvester(s) 102, monitoring device(s) 103, YD repositories 105A-N, and/or the like. The target format may comprise a common format, encoding, and/or representation for yield measurements, locations, timing data, and/or other information within the yield modeling apparatus 110 (e.g., format, encoding, and/or representation of yield datasets 134). The YDIM 130 may be configured to extract, transform, normalize, and/or otherwise convert captured yield data 104 from each of a plurality of different native formats into the common, target format. As disclosed in further detail herein, importing a yield dataset 134 may further comprise validating respective yield values 135 thereof (e.g., validating yield measurements, locations, and/or timing information of respective yield values 135).

Importing a yield dataset 134 from captured yield data 104 may further comprise defining and/or associating the yield dataset 134 with metadata (yield dataset metadata 136). Yield dataset metadata (YDM) 136 may comprise any suitable information pertaining to a yield dataset 134, including, but not limited to, information pertaining to: the agricultural output measured by the yield dataset 134 (e.g., identify the crop, crop hybrid, crop variant, and/or other production output measured by the yield dataset 134); the source of the yield dataset 134 (e.g., identify the producer from which the yield dataset 134 was acquired, identify the operator involved in acquiring the captured yield data 104, identify the harvester and/or monitoring device 103 used to obtain the captured yield data 104); how the captured yield data 104 was acquired (e.g., specify configuration and/or calibration settings of the harvester 102 and/or monitoring device 103); a spatial extent 137 of the yield dataset 134 and/or respective yield values 135 thereof (e.g., geographic area, region, and/or locations at which the yield values 135 were captured, as disclosed in further detail herein); a production interval 138 of the yield dataset 134 (e.g., information pertaining to the production season, cycle, and/or period in which the crop was produced, as disclosed in further detail herein), and so on.

The YDIM 130 may be configured to acquire and/or derive YDM 136 for respective yield datasets 134 from the corresponding captured yield data 104. In some embodiments, the YDIM 130 may be further configured obtain and/or derive portions of the YDM 136 not available within the captured yield data 104 from one or more other sources, such as a harvester 102, a monitoring device 103, a YD repository 105, a producer, an operator, an interval profiler 144 (disclosed in further detail herein), and/or the like.

As disclosed above, the YDIM 130 may be configured to determine the spatial extent 137 of yield datasets 134. As used herein, the spatial extent 137 of a yield dataset 134 refers to geographic region, area, and/or location(s) at which respective yield values 135 of the yield dataset 134 were captured (e.g., may specify location(s) corresponding to respective yield values 135). Alternatively, or in addition, the spatial extent 137 may indicate an area and/or region encompassed by the yield dataset 134 (e.g., bounds of a field, and/or subfield(s), in which the yield values 135 were acquired). The YDIM 130 may be configured to determine the spatial extent 137 of a yield dataset 134 from location data of the captured yield data 104. In some embodiments, the spatial extent 137 may comprise an aggregation, fusion, union, and/or other combination the locations of respective yield values 135. Alternatively, or in addition, the YDIM 130 may be configured to determine the spatial extent 137 of a yield dataset 134 from one or more other sources, as disclosed herein (e.g., may determine a field name, location, and/or bounds from a harvester 102, monitoring device 103, repository 105, producer, operator, and/or other data source).

The acquisition module 120 may be further configured to determine production intervals 138 of yield datasets 134. As used herein, a production interval 138 refers to temporal extent(s) pertaining to the production of a crop or other output (e.g., a time frame in which the crop was grown, cultivated, and/or otherwise produced). A production interval 138 may comprise and/or correspond to specified time(s) (e.g., a specified harvest time or date), a time range, a date range, a year, a growing season, a growing cycle, a production season, a production cycle, and/or the like. The production interval 138 of a yield dataset 134 may comprise any suitable information pertaining to production of a crop. The YDIM 130 may be configured to acquire information pertaining to production intervals 138 of yield datasets 134 (and/or other portions of the YDM 136) from one or more of: the captured yield data 104 (e.g., times associated with respective yield measurements), a harvester 102, a monitoring device 103, a repository 105, a producer or operator associated with the captured yield data 104, and/or another data source.

In some embodiments, the production interval 138 of a yield dataset 134 may be configured to define an end time, which may correspond to a time at which the crop measured by the yield dataset 134 was harvested (or otherwise obtained and/or measured). The harvest time may be based on timing information of the captured yield data 104 (timestamps of respective yield measurements) and/or the yield values 135 derived therefrom. In some embodiments, the production interval 138 may further indicate a time at which production of the crop was initiated (e.g., application of one or more production inputs, such as planting, seeding, fertilization, cultivation, and/or the like).

In some embodiments, the production interval 138 may further comprise one or more production stages 139. As used herein, a production stage 139 may refer to any suitable stage in the development, cultivation, growth, phenological development, and/or production of a crop. A production stage 139 may be defined within the production interval 138 of a crop, and may indicate a temporal location, offset, and/or region within the production interval 138 at which the crop is predicted to correspond to the defined production stage 139. The production stages 139 defined within a production interval 138 may correspond to stages at which the crop is predicted to exhibit attributes capable of being detected and/or distinguished by RS data 108, as disclosed herein (e.g., leaf area, canopy, canopy moisture, and/or the like). As disclosed in further detail herein, the acquisition module 120 may be configured to import RS data 108 corresponding to a plurality of yield datasets 134, each yield dataset 134 covering a different production interval 138 (a different year, growing season, and/or the like). The acquisition module 120 may configure the import of the RS data 108 such that acquisition times of the RS data 108 imported for the respective yield datasets 134 (within the different production intervals 138 of the yield datasets 134) correspond to the same or similar production stages 139 of the crop within each different production interval 138.

In some embodiments, the yield modeling apparatus 110 may further comprise an interval profiler 144, which may be configured to determine and/or estimate characteristics of the production intervals 138 of imported yield datasets 134. As disclosed in further detail therein, the interval profiler 144 may be configured to estimate a start time and/or one or more production stages 139 of a production interval 138. Given the harvest time of a yield dataset 134, the interval profiler 144 may be configured to determine a time span covered by the production interval 138 of the crop (e.g., estimate the time at which production of the crop was initiated). The interval profiler 144 may be further configured to estimate temporal location(s), offsets, and/or regions corresponding to respective production stages 139 of the crop within the production interval 138. The interval profiler 144 may determine such estimates based on characteristics pertaining to the development of the crop (e.g., determined and/or observed phenological developmental characteristics of the crop, such as a length of growing seasons and/or production cycles of the crop, time intervals between respective production stages 139 of the crop, and/or the like). The interval profiler 144 may be further configured to refine the estimates based on other factors, such as environmental conditions, climate conditions, production inputs, and/or the like.

Figure 2A:
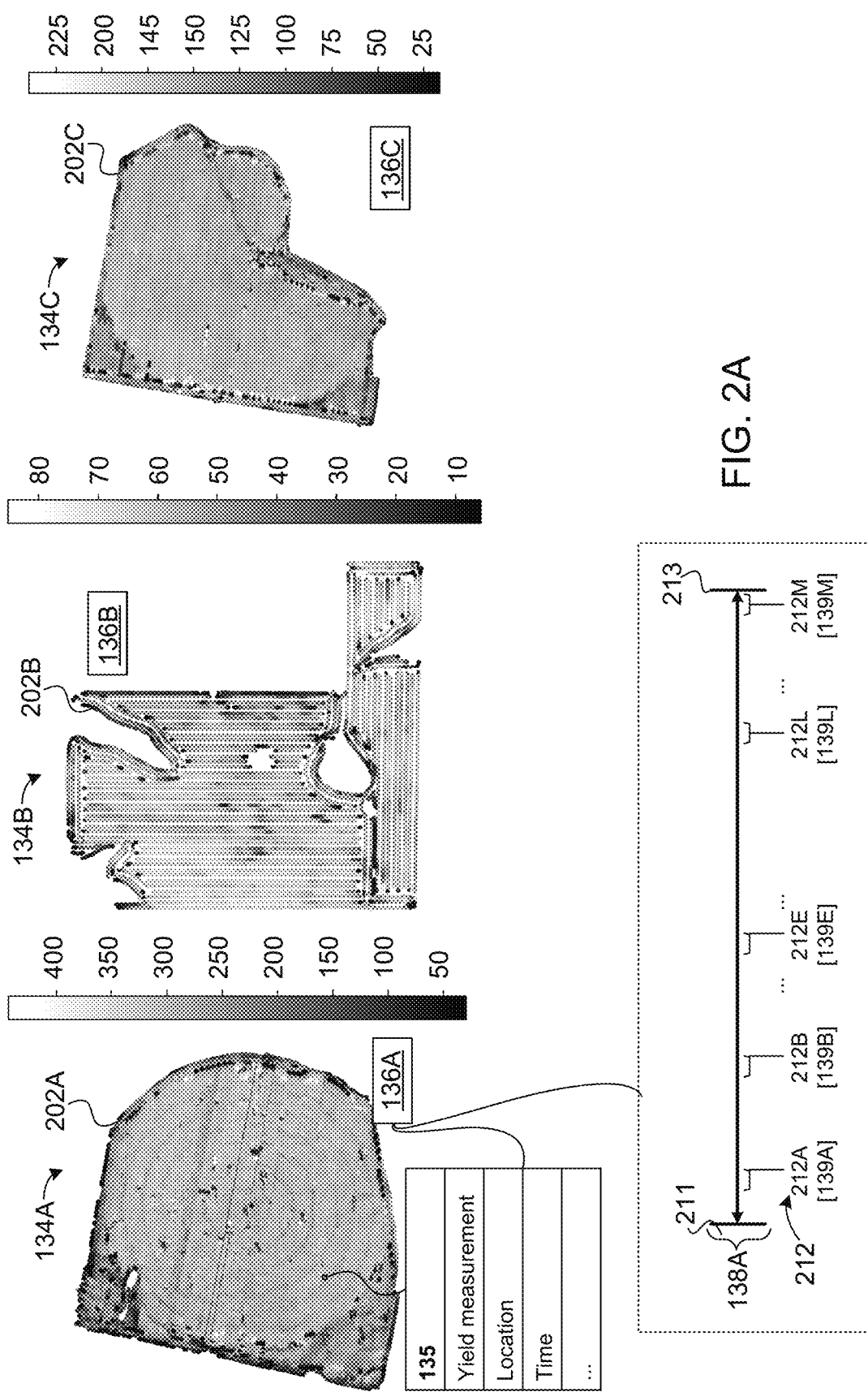
FIG. 2A depicts embodiments of yield datasets including corresponding to captured yield data, as disclosed herein.

FIG. 2A depicts graphical representations of exemplary yield datasets 134A-C, each yield dataset 134A-C having respective YDM 136A-C. Each point in the graphical depictions of the yield datasets 134A-C may correspond to a respective yield value 135, which may be configured to quantify a yield measured at a specified location (and/or at a specified time), as indicated by associated yield metadata 136. In the FIG. 2A embodiment, crop yield (measured in bushels per acre, bu/acre) are indicated by grayscale shading. The yield dataset 134A comprises measurements of corn grain yield at respective locations within a first field 202A (between about 400 and 150 bu/acre), the yield dataset 134B comprises measurements of soybean yield at respective locations within a second field 202B (between about 80 and 20 bu/acre), and the yield dataset 134C comprises measurements of the wheat yield at respective locations within a third field 202C (between about 225 and 50 bu/acre). FIG. 2A further illustrates one embodiment of production interval metadata 138A of yield dataset 134A. The production interval metadata 138A may specify an end time 213, which may correspond to the time at which the yield was harvested, and may be derived from timestamps and/or other timing information of the corresponding captured yield data 104 (and/or timestamps of respective yield values 135). The production interval metadata 138A may further indicate a start time, which may correspond to a time at which production was started, as disclosed herein. In some embodiments, the production interval metadata 138A further comprises one or more target regions 212. As disclosed in further detail herein, the target regions 212A-M may correspond to respective production stages 139A-M of the crop, which may comprise times (and/or time ranges) at which the crop is predicted to exhibit particular phenological characteristics during the production interval 138. The production stages 139A-M may correspond to respective developmental stages of the crop (e.g., emergence stages, vegetative stages, maturity stages, reproductive stages, and/or the like).

Referring back to FIG. 1, the YDIM 130 may be configured to import yield datasets 134 from captured yield data 104, as disclosed herein. The captured yield data 104 may be acquired from operators that adhere with calibration requirements of the harvester 102 and/or monitoring device 103. In some embodiments, the YDIM 130 may be configured to acquire a plurality of related yield datasets 134. As used herein, related yield datasets 134 refer to yield datasets 134 that pertain to a same and/or similar output (e.g., a same or similar crop, crop type, species, genus, hybrid, variant, and/or the like). Related yield datasets 134 may, therefore, refer to yield datasets 134 that pertain to related crops. As used herein, "related crops" refer to crops having same or similar characteristics (e.g., similar developmental and/or phenological characteristics over similar production intervals 138). In some embodiments, related yield datasets 134 may further refer to yield datasets 134 measuring related crops produced within related production regions. As used herein, a "production region" or "related production regions" refers to geographical regions, areas, and/or locations having same or similar production conditions (e.g., same or similar environmental conditions, climate, geological conditions, soil characteristics, and/or the like). By way of non-limiting example, a first production region may comprise fields located within portions of south-eastern Idaho, eastern Oregon, and northern Utah. A second production region may comprise fields located in the Central Valley area of California. Developing a yield model 183 for a specified crop may comprise importing a limited number of related yield datasets 134 from captured yield data 104 quantifying production of the specified crop within spatial extents 137 (e.g., fields) within a particular production region. As disclosed in further detail herein, the yield model 183 may be configured to produce yield estimates 195 for production of the specified crop within other fields within the production region for which captured yield data 104 have not been imported.

In some embodiments, the YDIM 130 may be further configured to validate imported yield datasets 134. Validating a yield dataset 134 may comprise cleaning and/or filtering the yield dataset 134 and/or respective yield values 135 thereof. In some embodiments, the YDIM 130 may perform outlier rejection in which yield measurements outside of upper and/or lower bounds are excluded. The upper bound may be set at N times the median yield measurement value (e.g., three times the median yield measurement value), and the lower bound may be set to a percentage of the median yield measurement value (e.g., 1 percent of the median yield measurement value). The median yield measurement value may comprise a median of the particular yield dataset 134, the median of a plurality of related yield datasets 134, and/or the like. Validating a yield dataset 134 may further comprise validating location and/or timing information of respective yield measurements, which may comprise identifying inconsistencies in such data and, in response, correcting and/or excluding corresponding yield measurements (e.g., location data that deviates from temporally neighboring location data by more than a threshold, location data that falls outside determined bounds of the field associated with the yield dataset 134, and/or the like). Although particular examples of techniques for validating machine yield data are described herein, the disclosure is not limited in this regard and may be adapted to utilize any suitable means for validating, cleaning, normalizing, and/or otherwise importing machine yield data into one or more yield datasets 134.

The acquisition module 120 may be further configured to obtain RS data 108 that covers and/or corresponds to one or more yield datasets 134. As used herein, RS data 108 that "covers" a yield dataset 134 refers to RS data 108 configured to capture at least a portion of the spatial extent 137 of the yield dataset 134 at a capture time during the production interval 138 of the yield dataset 134. As used herein, RS data 108 that "corresponds" to a yield dataset 134 refers to RS data 108 that spatially and/or temporally intersects with the yield data 134. As used herein, a spatial intersection refers to intersection(s) between the spatial extent 137 of a yield dataset 134 (and/or locations of respective yield values 135 thereof) and the RS data 108. A spatial intersection may, therefore, refer to an intersection between a geographical region, area, and/or location(s) covered by a yield dataset 134 (e.g., a location at which one or more yield values 135 thereof were captured) and a geographical region, area, and/or location(s) covered by the RS data 108. As used herein, a temporal intersection refers to an intersection between a time frame pertaining to the yield dataset 134 (e.g., as indicated by the production interval 138 thereof) and times at which the RS data 108 were captured and/or acquired by an RSDA platform 106. As disclosed in further detail herein, a temporal intersection may refer to intersection(s) between the production interval 138 of the yield dataset 134 and acquisition times of the imported RS data 108. The temporal intersection may comprise determining acquisition times at respective temporal locations, offsets, and/or target regions 212 defined within the production interval 138 of the yield dataset 134. RS data 108 that corresponds to a yield dataset 134 may comprise RS data 108 that intersects with the yield dataset 134 both spatially and temporally; e.g., RS data 108 that: a) covers the spatial extent 137 of the yield dataset 134 (and/or locations of respective yield values 135 thereof); and b) was acquired at determined locations, offsets, and/or target regions 212, during the production interval 138 of the yield dataset 134.

As disclosed in further detail herein, the acquisition module 120 may be configured to import RS data 108 for use with yield models 183 developed and/or maintained by the yield modeling apparatus 110. The acquisition module 120 may be configured to acquire RS data 108 capable of characterizing spatial yield characteristics. The acquisition module 120 may, therefore, be configured to acquire RS data 108 determined to correlate with yields produced by various crops. The acquisition module 120 may be further configured to acquire RS data 108 for use in constructing feature vectors 175. As used herein, a feature vector 175 refers to a data structure comprising and/or derived from RS data 108 configured to: a) span a specified geographical area (e.g., an area corresponding to production of a crop, such as a field or subfield); and b) span a specified timeframe (e.g., acquisition times within a production interval 138 of the crop, such as a growing season, as disclosed in further detail herein). A feature vector 175 may comprise and/or be derived from RS data 108 configured to characterize yield characteristics of the crop within a specified spatial extent and/or during the specified timeframe. As disclosed in further detail herein, the acquisition module 120 may be configured to acquire remote sensing data (RSD) elements 155, each RSD element 155 comprising and/or corresponding to RS data 108 captured over a specified area at a specified acquisition time.

The acquisition module 120 may be configured to acquire RSD elements 155 adapted to model and/or characterize crop yields produced at particular locations (fields and/or subfields) during particular production intervals 138 (e.g., a particular growing season). Acquiring RS data 108 configured to model and/or characterize yield of a particular location (subfield) during a particular production interval 138 may comprise acquiring a plurality of remote sensing data (RSD) elements 155, each comprising RS data 108 configured to capture the same area at each of a plurality of different acquisition times during the production interval 138.

As disclosed in further detail herein, in some embodiments, the acquisition module 120 may be further configured to organize RS data 108 acquired to model and/or characterize yield at the particular location during the particular production interval 138 into an RSD sequence 165. The yield modeling apparatus 110 may leverage RSD sequences 165 to produce feature vectors 175 configured to model and/or characterize yield characteristics of particular subfield locations. The yield modeling apparatus 110 may be further configured to correlate feature vectors 175 with yield datasets 134 to thereby construct training vectors 675, and may use the training vectors 675 to develop yield models 183 (e.g., train, refine, validate, and/or otherwise develop respective yield models 183). The yield modeling apparatus 110 may be configured to develop yield models 183 corresponding to particular crops (e.g., particular crop types, species, genus, variants, hybrids, and/or the like). Developing a yield model 183 for a particular crop may comprise acquiring a plurality of related yield datasets 134; acquiring RS data 108 corresponding to the related yield datasets 134; constructing feature vectors 175 comprising the acquired RS data 108; producing a set of training vectors 675 (a training set 775), each comprising a respective feature vector 175 and ground truth yield quantity 635 derived from the related yield datasets 134; and utilizing the training vectors 675 to train the yield model 183 to accurately model and/or predict spatial yield characteristics of the particular crop (e.g., to produce yield estimates 195 corresponding to the yield quantities 635 in response to the feature vectors 175 of the training vectors 675).

The acquisition module 120 may be configured to import RS data 108 from one or more RSDA platforms 106. An RSDA platform 106 may comprise any suitable means for obtaining RS data 108 covering specified geographical regions, including, but not limited to: a satellite platform 106A, an aircraft sensing platform, one or more fixed sensing platforms, a mobile platform, a vehicle-based platform, an autonomous vehicle platform, a drone platform 106N, and/or the like. As disclosed in further detail herein, an RSDA platform 106 may be configured to capture RS data 108 in accordance with a coverage scheme 109, and may maintain RS data 108 captured thereby in one or more remote sensing data (RSD) repositories 107. As used herein, an RSD repository 107 may comprise any suitable means for gathering, maintaining, storing, providing access to, and/or otherwise managing RS data 108 captured by one or more RSDA platforms 106. An RSD repository 107 may comprise and/or be communicatively coupled to an RSDA platform 106 (and/or RS data 108 acquired thereby), a memory device, a storage device, a non-transitory storage device, a removable storage device, a computing device, a network-accessible service (e.g., one or more network-accessible computing devices), and/or the like.

The acquisition module 120 may be configured to acquire RS data 108 determined to correlate with crop yield. The acquisition module 120 may be configured to acquire imagery data, such as EMR data comprising selected wavelengths and/or bands. The acquisition module 120 may the select wavelengths and/or bands in accordance with determined correlations between the respective wavelengths and/or bands and crop yield. The acquisition module 120 may select EMR wavelengths and/or bands configured to measure particular crop attributes and/or characteristics, which may include, but are not limited to: crop health, crop developmental stage at respective times during a production interval 138 (e.g., respective vegetative stages, reproductive stages, and/or the like), crop phenology attributes, chlorophyll absorption, leaf area biomass, canopy, canopy moisture content, and/or the like. FIG. 2B illustrates embodiments of an EMR curve 220 for a particular crop acquired at a designated capture time (e.g., EMR data captured over a subfield location at a specified time during the production interval 138 thereof). The EMR curve 220 may indicate the EMR of the particular crop as a function of wavelength (and/or band). In the FIG. 2B embodiment, the EMR at particular wavelengths may correspond to attributes and/or characteristics of the particular crop: the region 221 (between about 400 to 700 nm) may correspond to chlorophyll absorption, the region 222 (between about 750 and 1200 nm) may correspond to the canopy and/or leaf area biomass, the region 223 (between about 1400 and 2400 nm) may correspond to canopy and/or leaf area moisture content, and so on. During emergence and/or vegetative production stages 139, the EMR within region 222 (and/or in the transition from region 221 to 222) may indicate, inter alia, a nutrient stress and/or pest stress on the particular crop, the EMR within region 223 may indicate, inter alia, a hydration stress on the particular crop, and so on. Higher EMR in region 222 may indicate development of healthy leaf area biomass (due to adequate nutrient availability and/or low pest stress), whereas lower EMR in region 222 be indicative of poor canopy development (due to inadequate nutrient availability and/or higher pest stress). Similarly, higher EMR in region 223 may indicate healthy moisture content (due to adequate hydration inputs), whereas lower EMR in region 223 may be indicative of hydration stress (due to inadequate hydration inputs). The EMR curve 220 at subsequent production stages 139 may be indicative of whether the particular crop is progressing to appropriate maturity and/or reproductive stages 139 (exhibiting lower EMR in region 222 due to crop senescence).

The acquisition module 120 may be configured to import RS data 108 configured to capture information pertaining to a plurality of different crop characteristics (e.g., chlorophyll absorption, leaf area biomass, canopy, canopy moisture content, and/or the like), which may comprise importing RS data 108 configured to span a plurality of EMR wavelengths and/or bands (e.g., visible, near-infrared, and/or shortwave infrared and/or wavelengths between about 450 nm and 2200 nm). The acquisition module 120 may be configured to capture RS data 108 comprising a plurality of remote sensing data (RSD) components 153, each configured to cover a respective EMR wavelength and/or band. Respective RSD components 153 may, therefore, correspond to respective crop attributes and/or characteristics. In some embodiments, the acquisition module 120 is configured to acquire RS data 108 comprising RSD components 153 corresponding to each of a plurality of EMR wavelengths and/or bands, as follows:

| Band ID | Center Wavelength |
|---|---|
| Band 2 | 490 nm |
| Band 3 | 560 nm |
| Band 4 | 665 nm |
| Band 5 | 705 nm |
| Band 6 | 740 nm |
| Band 7 | 783 nm |
| Band 8a | 865 nm |
| Band 11 | 1,610 nm |
| Band 12 | 2,190 nm |

The RSD components 153 corresponding to bands 2-5 may indicate chlorophyll absorption of the particular crop, the RSD components 153 corresponding to bands 5-8a may indicate leaf area biomass of the particular crop, the RSD components 153 corresponding to bands 11-12 may indicate canopy moisture content, and so on, as disclosed herein.

RS data 108 imported by the yield modeling apparatus 110 may correspond to a coverage scheme 109. As used herein, a coverage scheme 109 refers to electronically encoded information pertaining to spatial, temporal, and/or other characteristics of RS data 108 accessible to the yield modeling apparatus 110 (e.g., RS data 108 captured by an RSDA platform 106 and/or maintained within an RSD repository 107). As used herein, "spatial coverage characteristics" or the "spatial coverage" of RS data 108 refers to information pertaining to geographic regions, areas, and/or location(s) (e.g., spatial extents) covered by respective portions and/or elements of the RS data 108. A coverage scheme 109 may further indicate a spatial resolution and/or scale of the RS data 108 (e.g., may indicate that elements of the RS data 108, such as pixels, pixel centroids, and/or the like, represent spatial extents comprising respective 20-meter geographic areas). Spatial coverage characteristics of a coverage scheme 109 may comprise and/or be embodied by any suitable data structure and/or data representation, including, but not limited to: an index, a tree, one or more spatial extents, location coordinates, geographical coordinates, a grid, a tiling grid, a spatial grid, a geographic grid, granules, fixed-size granules, and/or the like. As used herein, "temporal coverage characteristics" or the "temporal coverage" of RS data 108 refers to information pertaining to acquisition times of RS data 108 covering particular spatial extents. A coverage scheme 109 may indicate a temporal resolution of the RS data 108 (e.g., indicate the frequency at which RS data 108 are acquired). Temporal coverage characteristics of a coverage scheme 109 may comprise and/or be embodied by any suitable data structure and/or data representation, including, but not limited to: acquisition times and/or dates, absolute acquisition times and/or dates, relative acquisition times and/or dates, an acquisition interval, an acquisition period, an acquisition frequency, a schedule, and/or the like. In some embodiments, the temporal coverage characteristics of a coverage scheme 109 may comprise temporal coverage characteristics of respective spatial extents (e.g., indicate times, dates, intervals, periods, frequencies, and/or schedules at which RS data 108 covering specified spatial extents are acquired). A coverage scheme 109 may indicate other characteristics of the RS data 108, such as bands and/or wavelengths captured by the RS data 108, spatial coverage characteristics of respective bands, temporal coverage characteristics of respective bands, and/or the like.

As disclosed above, the acquisition module 120 may be configured to import RSD elements 155 comprising RS data 108. As used herein, an "element" of RS data 108, such as an RSD element 155, may refer to a quantum, portion, and/or other unit of electronic data comprising and/or derived from RS data 108, such as a pixel, pixel centroid, grid tile, granule, and/or the like. In some embodiments, an RSD element 155 refers to a particular level of granularity, such as a particular scale or resolution (e.g., a pixel or pixel centroid in accordance with the coverage scheme 109 of the RS data 108). An RSD element 155 may have a particular spatial coverage and/or temporal coverage. The spatial coverage of an RSD element 155 may correspond to the coverage scheme 109 of the RS data 108, as disclosed herein. An RSD element 155 may comprise and/or correspond to an RSD spatial extent 157, which may be configured to indicate a location, region, area, and/or locations covered thereby. An RSD element 155 may further comprise and/or correspond to an RSD acquisition time 159, which may indicate a time at which RS data 108 of the RSD element 155 were captured by the RSDA platform 106. An RSD element 155 may comprise one or more remote sensing data (RSD) components 153. In some embodiments, an RSD element 155 may comprise a plurality of RSD components 153, each RSD component 153 comprising an EMR value corresponding to one of a specified set of EM bands and/or wavelengths. The specified set of EM bands and/or wavelengths may be selected to, inter alia, capture respective attributes and/or characteristics of the specified crop, as disclosed herein. An RSD element 155 may, therefore, comprise a plurality of EMR values captured over a specified RSD spatial extent 157 at a specified RSD acquisition time 159.

In FIG. 1, the coverage scheme 109A of the satellite platform 106A may comprise a tiling grid specifying geographical areas covered by respective elements of the RS data 108A acquired thereby (spatial elements, such as the spatial elements 347 described below in conjunction with FIGS. 3A and 3B). The coverage scheme 109A may further define the interval at which RS data 108A covering respective spatial elements are acquired (e.g., RS data 108A for each spatial element acquired every N days or hours). Elements of the RS data 108A (and/or RSD elements 155 imported therefrom) may correspond to respective spatial elements of the coverage scheme 109A (e.g., respective tiles and/or granules of a tiling grid). The coverage scheme 109N of the drone platform 109N may indicate geographic regions over which one or more drones are configured to fly and/or may indicate a schedule and/or interval at which the drone platform 109N captures RS data 108N corresponding to the respective spatial elements. Elements of the RS data 108N (and/or RSD elements 155 imported therefrom) may comprise images and/or image pixels, each quantifying EMR captured over a specified geographic location and a specified acquisition time. Although particular examples of RSDA platforms 106, RSD repositories 107, RS data 108, and/or coverage schemes 109 are described herein, the disclosure is not limited in this regard and could be adapted to import remote sensing data acquired by any suitable RSDA platform 106 having any suitable coverage scheme 109 accessible from and/or through any suitable RSD repository 107.

In some embodiments, the acquisition module 120 is configured to import RS data 108 configured for use in developing one or more yield models 183. The acquisition module 120 may be configured to import RS data 108 for use the construction of for construction of remote sensing data (RSD) training vectors 675. Acquiring RS data 108 for construction of a training vector 675 may comprise acquiring RS data 108 corresponding to machine yield data (e.g., yield datasets 134 imported by the YDIM 120). As disclosed herein, RS data 108 may be correlated with yield quantities 635 derived from the yield datasets 134 to thereby construct one or more training vectors 675, each training vector 675 comprising a respective feature vector 175 and corresponding yield quantity 635. The yield quantity 635 may comprise and/or be derived from captured yield data 104 and, as such, may reflect the actual yield harvested over particular subfield location(s). The yield quantity 635 may, therefore, comprise a "ground truth" or "training quantity" by which a yield model 183 may be trained, refined, and/or validated. As disclosed in further detail herein, using a training vector 675 to develop a yield model 183 may comprise training the yield model 183 to produce yield quantities 635 of training vectors 675 in response to the feature vectors 175 thereof. Using a training vector 675 to validate a yield model 183 may comprise verifying that a yield estimate 195 produced by the yield model 183 in response to the feature vector 175 of the training vector 675 corresponds to the yield quantity 635 thereof (e.g., an error between the yield estimate 195 and the yield quantity 635 is less than a validation threshold).

In some embodiments, the acquisition module 120 may be further configured to acquire RS data 108 pertaining to unmeasured production locations (e.g., fields for which accurate machine yield data corresponding to one or more production intervals 138 have not been imported to the yield modeling apparatus 110). As disclosed in further detail herein, the yield modeling apparatus 110 may utilize yield models 183 developed thereby to model and/or estimate spatial yield characteristics of unmeasured production locations based on acquired RS data 108 configured to cover crop production within the unmeasured production locations (e.g., by use of feature vectors 175 derived from the RS data 108 corresponding to the unmeasured production locations, as disclosed in further detail herein).

As disclosed in further detail herein, in some embodiments, yield models 183 managed by the crop modeling apparatus 110 may comprise and/or be embodied by yield modeling (YM) data 184. YM data 184 may comprise any suitable information pertaining to a yield model 183, including, but not limited to: a configuration of the yield model 183 (e.g., a YM configuration 185), a coverage of the yield model 183 (e.g., a YM coverage 186), and/or the like. The YM configuration 185 of a yield model 183 may comprise and/or embody an implementation of the yield model 183, such as a structure, arrangement, and/or configuration of machine learning (ML) components comprising the yield model 183, a configuration of the ML components, and/or the like. The YM coverage 186 comprise and/or define coverage characteristics of the yield model 183, which may include, but are not limited to: a crop coverage 187, an RS coverage 188, a temporal coverage 189, and/or the like. The crop coverage 187 may be configured to specify crop(s) capable of being characterized by the yield model 183 (e.g., specify particular crops, crop types, crop species, crop genus, crop variants, crop hybrids, and/or the like). The crop coverage 187 may further indicate cultivation region(s) covered by the yield model 183, which may correspond to geographical areas having same and/or similar cultivation characteristics, as disclosed herein (e.g., same and/or similar environmental conditions, climate, geological conditions, soil characteristics, and/or the like). The RS coverage 188 of a yield model 183 may comprise and/or define information pertaining to RS data 108 used in the development of the yield model 183. The RS coverage 188 may specify RS data 108 suitable for characterizing phenological development of the specified crop, as disclosed herein (e.g., may specify particular EM bands, wavelengths, and/or the like). The RS coverage 188 may, therefore, correspond to the crop(s) specified by the crop coverage 187 of the yield model 183. Alternatively, or in addition, the RS coverage 188 may specify source(s) of suitable RS data 108, such as one or more RSDA platforms 106, RSD repositories 107, and/or the like.

The YM coverage 186 of a yield model 183 may further comprise and/or define a temporal coverage 189 of the yield model 183. As disclosed in further detail herein, the temporal coverage 189 of a yield model 183 may indicate, inter alia, the number of data acquisition times covered by the yield model 183. The temporal coverage 189 may indicate the number of distinct RSD acquisition times 159 covered in feature vector(s) 175 used in the development of the yield model 183. In some embodiments, the temporal coverage 189 may comprise and/or define one or more modeled acquisition times 789, each corresponding to a respective time during production of the specified crop. In some embodiments, the model acquisition times 789 may correspond to respective production stages 139 of the specified crop, as disclosed herein.

Developing a yield model 183 may comprise initializing the yield model 183, which may comprise, inter alia, determining a YM configuration 185 for the yield model 183, defining a YM coverage 186 for the yield model 183, and/or the like. As disclosed herein, the YM configuration 185 may be determined in accordance with one or more modeling schemes (e.g., YM schemes 709). Defining the YM coverage 186 for a yield model 183 may comprise defining one or more of a crop coverage 187, an RS coverage 188, and/or a temporal coverage 189 of the yield model 183. The crop coverage 187 of a yield model 183 may specify crop(s) characterized by the yield model 183. In some embodiments, the crop coverage 187 may further specify production region(s) covered by the yield model 183, as disclosed herein. The RS coverage 188 may specify characteristics of RS data 108 suitable for development of the yield model 183. The RS coverage 188 may be determined in accordance with the specified crop covered by the yield model 183 (per the crop coverage 187 thereof). The RS coverage 188 of a yield model 183 may specify EM wavelengths and/or bands capable of detecting phenological attributes of the specified crop during respective production stages 139 thereof, as disclosed herein. The RS coverage 188 may, therefore, specify a number of RSD components 153 included in each RSD element 155 (e.g., specify that each RSD element 155 imported for use with the yield model 183 is to include R RSD components 153, each comprising an EMR value for a respective one of a specified set of EM bands). The temporal coverage 189 of a yield model 183 may specify acquisition times for imported RS data 108 (and/or FV intervals 179 of compatible feature vectors 175, as disclosed in further detail herein). The temporal coverage 189 may indicate a number of RSD acquisition times 159 covered by the yield model 183 (and/or temporal locations, offsets, target regions 212, and/or crop production stages 139 corresponding to each RSD acquisition time 159). The temporal coverage 189 of a yield model 183 may be determined in accordance with one or more factors including, but not limited to: availability of suitable captured yield data 104; availability of suitable RS data 108 (e.g., spatial and/or temporal coverage characteristics of RS data 108 acquired by one or more RSDA platforms 106, as indicated by coverage scheme(s) 309 thereof, as disclosed herein); availability of suitable RS data 108 covering particular locations (e.g., availability of suitable RS data 108 covering spatial extents 137 of yield datasets 134, spatial extents 137 of one or more fields to be modeled by the yield model 183, and/or the like); characteristics of the specified crop (e.g., characteristics of production intervals 138 for the specified crop, which may indicate temporal locations, offsets, and/or target regions 212 at which the specified crop is predicted to exhibit particular, detectable characteristics); desired capabilities of the yield model 183 (e.g., enable the yield model 183 to predict spatial yield characteristics during production of the specified crop); and/or the like. Information pertaining to the initialization, design, configuration, and/or development of yield models 183 may be received at the yield modeling apparatus 110 through any suitable means, including user input through the computing device 111 (e.g., through one or more HMI components 115), through the network 101, and/or the like. Alternatively, or in addition, information pertaining to the initialization, design, configuration, and/or development of yield models 183 may be determined in accordance with an ML implementation of the yield modeling apparatus 110 (e.g., the architecture of ML components of the yield model 183 may be determined in accordance with one or more ML architectures, such as an artificial neural network architecture, multilayer perceptron architecture, and/or the like).

Developing a yield model 183 may further comprise importing one or more yield datasets 134 corresponding to the yield model 183. As used herein, a yield dataset 134 that "corresponds" to and/or with a particular yield model 183 refers to a yield dataset 134 that comprises yield values 135 corresponding to the crop coverage 187 of the yield model 183 (e.g., measurements of yield of specified crop(s) covered by the yield model 183 produced at specified locations over determined production intervals 138). Developing a yield model 183 may, therefore, comprise importing captured yield data 104 pertaining to crops covered by the crop coverage 187 of the yield model 183, as disclosed herein. Developing the yield model 183 may further comprise importing RS data 108 corresponding to the one or more crop yield datasets 134. Acquiring RS data 108 corresponding to one or more yield datasets 134 may comprise spatially and/or temporally intersecting the yield datasets 134 with RS data 108 maintained within one or more RSD repositories 107, such that the acquired RS data 108 spatially and/or temporally intersects with the yield datasets 134 (e.g., the acquired RS data 108 covers geographical areas covered by the yield datasets 134 and was acquired at acquisition times within production intervals of the yield datasets 134).

In the FIG. 1 embodiment, the acquisition module 120 comprises a correlator 140, which may be configured to map, translate, and/or otherwise correlate yield datasets 134 with RS data 108 available within one or more RSD repositories 107. The correlator 140 may be configured to determine spatial and/or temporal intersections between yield datasets 134 and RS data 108, as disclosed herein. The correlator 140 may be operatively coupled to a remote sensing data import module (RSDIM) 150, which may be configured to import remote sensing datasets 128 in accordance with the spatial and/or temporal intersections determined by the correlator 140.

The correlator 140 may comprise a spatial intersection engine (spatial profiler 142), which may be configured to determine spatial intersections between yield datasets 134 and coverage schemes 109 of the RS data 108. The spatial profiler 142 may be configured to determine target spatial elements 147 of a coverage scheme 109, the target spatial elements 147 configured to cover and/or encompass the spatial extent 137 of one or more yield datasets 134. The target spatial elements 147 may comprise an aggregation, fusion, union, and/or other combination of locations of the yield values 135 of the yield dataset 134. Each target spatial element 147 may correspond to a respective element of a coverage scheme 109 (e.g., a respective geographical location, region, area, boundary, grid tile, granule, image, pixel, pixel centroid, and/or the like). In some embodiments, determining spatial intersections for a yield dataset 134 comprises the spatial profiler 142 projecting, correlating, translating, and/or otherwise mapping the spatial extent 137 of the yield dataset 134 into the coverage scheme 109 of an RSDA platform 106 (or vice versa) and, in response, identifying target spatial elements 147 of the coverage scheme 109 that are overlaid by the spatial extent 137. The target spatial elements 147 may be used to identify, request, and/or otherwise acquire RS data 108 that corresponds to the yield datasets 134 from one or more RSD repositories 107.

The correlator 140 may further comprise a temporal intersection engine (interval profiler 144), which may be configured to determine temporal intersections between yield datasets 134 and RS data 108. As disclosed in further detail herein, determining temporal intersections for one or more yield datasets 134 may comprise determining a plurality of target acquisition times 149, each target acquisition time 149 corresponding to a respective position, offset, and/or region within the production interval 138 of one or more of the yield datasets 134 (as indicated by the YDM 136 thereof). The interval profiler 144 may be configured to determine a plurality of target acquisition times 149 for each yield dataset 134, which may comprise determining corresponding target acquisition times 149 for related yield datasets 134 having different production intervals, as disclosed in further detail herein (e.g., corresponding target acquisition times 149 for yield datasets 134 captured during different production intervals 138 corresponding to different years, growing seasons, production cycles, and/or the like).

The RSDIM 150 may be configured to acquire and/or import remote sensing datasets 128 corresponding to one or more yield datasets 134, which may comprise acquiring RS data 108 in accordance with the target elements 147 and/or target acquisition times 149 determined for the yield datasets 134, as disclosed herein (e.g., by the correlator 140). As disclosed above, the target spatial elements 147 determined for a yield dataset 134 may correspond to coverage scheme(s) 109A-N of one or more RSDA platforms 106A-N. The target spatial elements 147 may comprise identifiers by which RS data 108A-N are indexed within one or more RSD repositories 107A-N (e.g., tile identifiers, granule identifiers, and/or the like). Determining the target spatial elements 147 for a yield dataset 134 may comprise determining a set of N target spatial elements 147, the N target spatial elements 147 configured to cover and/or encompass the region, area, and/or geographical locations of the yield dataset 134 (e.g., may cover and/or encompass the field from which the yield dataset 134 was measured and/or locations of each yield value 135 thereof). The target acquisition times 149 determined for the yield dataset 134 may define respective target acquisition times for the RS data 108. Determining the target acquisition times 149 for the yield dataset 134 may comprise determining a set of M target acquisition times 149, each of the M target acquisition times configured to fall within the production interval metadata 138 of the yield dataset 134 (and/or within a respective target region 212 thereof, as disclosed herein). Acquiring RS data 108 for a yield dataset 134 may, therefore, comprise acquiring N*M elements of RS data 108 from one or more RSD repositories 108, each of the N*M elements corresponding to a respective one of the N target spatial elements 147 and a respective one of the M target acquisition times 149 (e.g., acquiring RS data 108 for each of the N target spatial elements 147 determined for the yield dataset 134 may comprise acquiring M elements of the RS data 108, each of the M elements having a spatial coverage corresponding to the target spatial element 147 and having an acquisition time corresponding to one of the M target acquisition times 149).

Figure 3A:
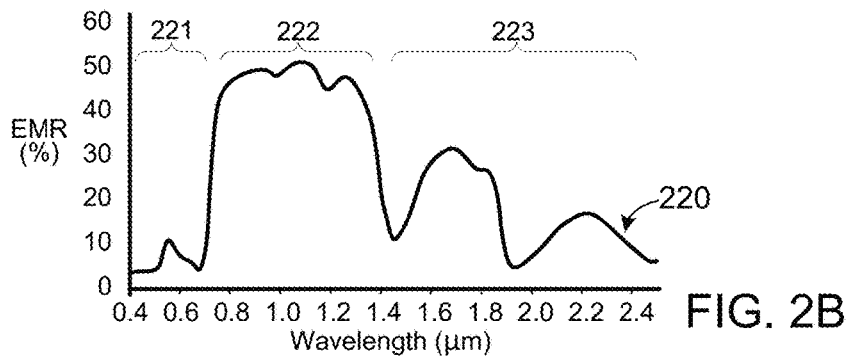
FIG. 3A depicts embodiments of systems and methods for determining spatial and/or temporal intersections for a yield dataset, as disclosed herein.
Figure 3A:
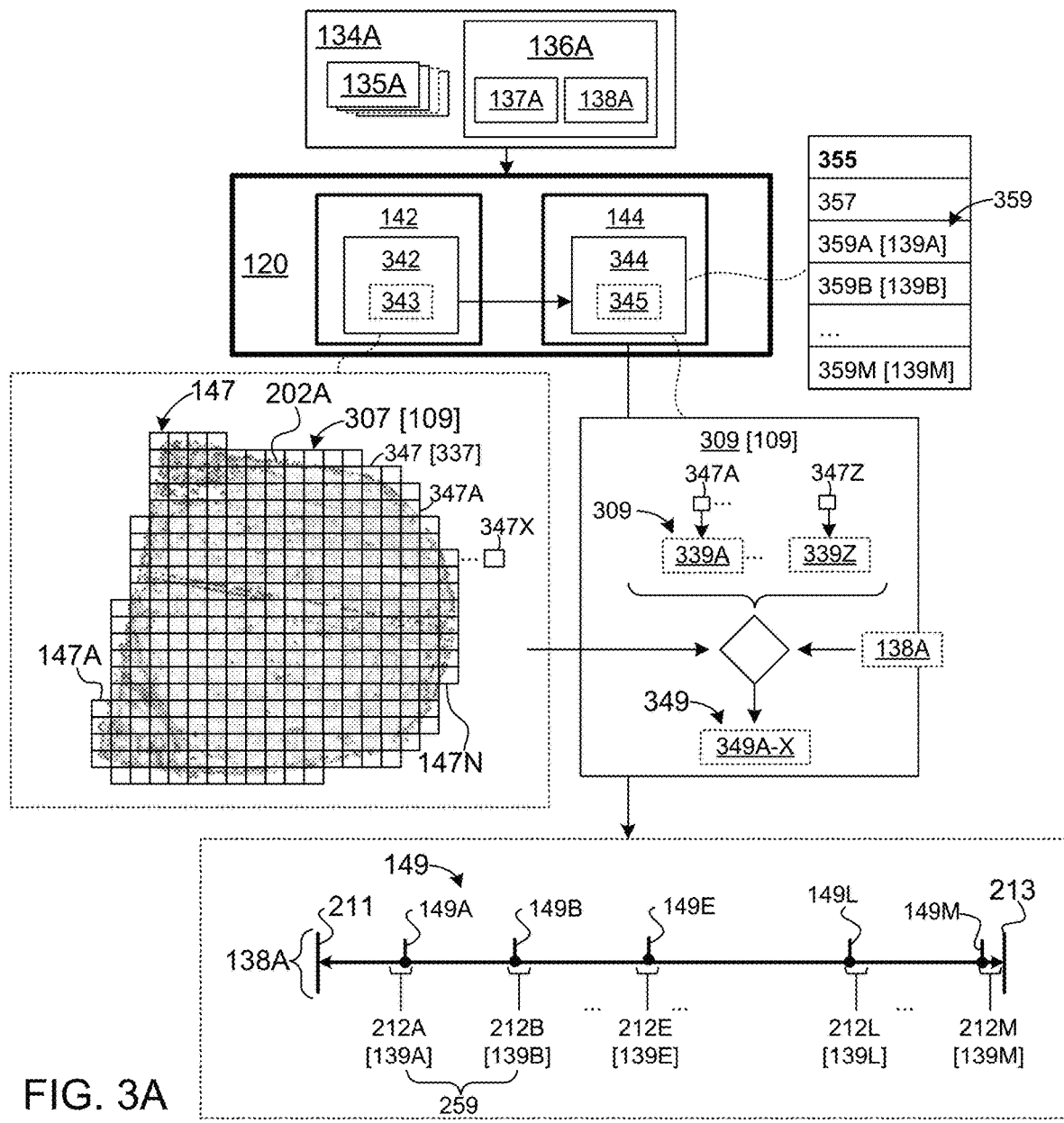

FIG. 3A illustrates non-limiting embodiments of systems and methods for determining spatial intersections and/or temporal intersections between yield datasets 134 and RS data 108 (e.g., between yield datasets 134 and coverage schemes 109 of the RS data 108A-N as captured by one or more RSDA platforms 106A-N and/or maintained within one or more RSD repositories 107A-N).

As disclosed above, the acquisition module 120 may comprise a spatial profiler 142 configured to determine spatial intersections for yield datasets 134. The spatial intersections may comprise intersections between spatial extents 137 of the yield datasets 134 and spatial elements of the coverage schemes 109 of one or more RSDA platforms 106. Determining the spatial intersections may comprise selecting a plurality of target spatial elements 147 from a coverage scheme 109, the target spatial elements 147 configured to cover, overlay, and/or otherwise encompass the spatial extent 137 of the yield dataset 134. Determining temporal intersections of a yield dataset 134 may comprise determining intersections between the production interval 138 of the yield dataset 134 and temporal coverage characteristics of one or more coverage schemes 109 (e.g., acquisition times of the RS data 108). Determining the temporal intersections may comprise selecting a plurality of target acquisition times 149, the target acquisition times 149 configured to fall within the production interval 138 of the yield dataset 134.

FIG. 3A depicts spatial intersections between a yield dataset 134A and a coverage scheme 109 of an RSDA platform 106, such as the satellite RSDA platform 106A described above in conjunction with FIG. 1. The yield dataset 134A may correspond to the yield dataset 134A described above in conjunction with FIG. 2A (the yield dataset 134A having a spatial extent 137A corresponding to geographic boundaries of a field 202A).

In the FIG. 3A embodiment, the coverage scheme 109 may comprise and/or reference spatial coverage characteristics of the RS data 108 captured by an RSDA platform 106 and/or maintained within one or more RSD repositories 107. As disclosed above, the spatial coverage characteristics may indicate a spatial scale and/or resolution of the RS data 108. In the FIG. 3A embodiment, the coverage scheme 109 may comprise and/or define a remote sensing data (RSD) spatial coverage scheme (a spatial scheme 307), which may be configured to indicate spatial coverage characteristics of respective elements of the RS data 108. The spatial scheme 307 may comprise any suitable means for specifying spatial coverage characteristics of a coverage scheme 109, as disclosed herein, including, but not limited to: an index, a tree, one or more extents, location coordinates, geographical coordinates, a grid, a tiling grid, a spatial grid, a geographic grid, granules, fixed-size granules, and/or the like. In the FIG. 3A embodiment, the spatial scheme 307 may comprise a grid comprising a plurality of spatial elements 347 (e.g., a tiling grid), each spatial element 347 representing coverage of a respective spatial extent by the RS data 108 (e.g., an RSD coverage 337 representing a respective geographical area, region, location(s), and/or the like). The spatial elements 347 may represent respective elements of the RS data 108 (e.g., respective values, pixels, tuples, and/or the like). The spatial scheme 307 may, therefore, indicate a spatial resolution and/or scale of the RS data 108. In the FIG. 3A embodiment, each spatial element 347 may have an RSD coverage 337 comprising a respective 20-meter geographical area. The RS data 108 corresponding to the coverage scheme 109 may, therefore, have a spatial resolution of 20 square meters (e.g., each element of the RS data 108 may comprise EMR values captured over a respective 20-meter geographic area). In some embodiments, each spatial element 347 may be assigned a respective identifier, which may be used to access RS data 108 corresponding to the spatial element 347 from one or more RSD repositories 107 (e.g., a tile identifier, a granule identifier, an index, location coordinates, and/or the like).

Determining spatial intersections between RS data 108 and the yield dataset 134A may comprise determining a plurality of target spatial elements 147. The target spatial elements 147 may be determined in accordance with the coverage scheme 109 of the RS data 108, as disclosed herein. In the FIG. 3A embodiments, determining the target spatial elements 147 may comprise determining spatial intersections between the spatial scheme 307 of the RS data 108 (e.g., respective spatial elements 347) and the spatial extent 137A of the yield dataset 134A. The target spatial elements 147 may comprise and/or correspond to one or more of the spatial elements 347 of the coverage scheme 109 (the target elements 147 may comprise a selected subset of the spatial elements 347). The target spatial elements 147 may be configured to cover, overlay, and/or otherwise encompass the spatial extent 137A of the yield dataset 134A (in accordance with the spatial scheme 307 of the RS data 108). Alternatively, or in addition, the target spatial elements 147 may be selected to encompass location(s) of the yield values 135A of the yield dataset 134A.

In some embodiments, the spatial profiler 142 comprises a spatial mapping engine (mapping engine 342), which may be configured to translate, convert, map, and/or otherwise correlate spatial extents 137 of yield datasets 134 (and/or locations of respective yield values 135 thereof) with coverage schemes 109A-N of respective RSDA platforms 106A-N (and/or spatial schemes 307 thereof). The mapping engine 342 may comprise information pertaining to spatial coverage characteristics of the respective coverage schemes 109A-N (mapping metadata 343), and may utilize the mapping metadata 343 to correlate spatial extents 137 and/or yield value 135 locations of respective yield datasets 134 with spatial coverages of the respective coverage schemes 109A-N. The mapping metadata 343 may comprise any suitable means for representing spatial coverage characteristics and/or mapping spatial extends 137 to and/or from such representations, as disclosed herein (e.g., an index, a grid, a tiling grid, granules, mapping rules, translation rules, correlation rules, and/or the like). The acquisition module 120 may be configured to retrieve information pertaining to the spatial coverage characteristics of respective coverage schemes 109A-N from one or more RSD repositories 107A-N (and/or RSDA platforms 106A-N), and may populate the mapping metadata 343 with the retrieved information.

As illustrated in FIG. 3A, determining spatial intersections between the yield dataset 134A and the coverage scheme 109 may comprise: a) mapping the spatial extent 137A of the yield dataset 134A onto the spatial scheme 307 (e.g., onto spatial elements 347 of the spatial scheme 307); and b) selecting target spatial elements 147A-N in accordance with the mapping. Selecting the target spatial elements 147A-N may comprise identifying spatial elements 347 that are covered, overlaid, and/or otherwise intersect with the spatial extent 137A of the yield dataset 134A. Alternatively, determining the spatial intersections may comprise: a) mapping yield values 135A of the yield dataset 134A into the spatial scheme 307 (e.g., mapping locations of the yield values 135A into respective spatial elements 347); and b) identifying spatial elements 347 that comprise more than a threshold number of mapped yield values 135A.

In some embodiments, selecting the target spatial elements 147A-N comprises determining spatial correlation metrics for respective spatial elements 347 (correlation metrics), each quantifying a degree of overlap, intersection and/or spatial correlation between respective spatial elements 347 and the spatial extent 137 of a yield dataset 134, such as the spatial intersections between spatial elements 347 and the spatial extent 137A of yield dataset 134A illustrated in FIG. 3A. Correlation metrics of spatial elements 347 that are substantially overlaid by the spatial extent 137A may be about 1 (or 100%), whereas the correlation metrics of spatial elements 347 that are only partially overlaid by the spatial extent 137A may be less than 1 (or less than 100%). By way of non-limiting example, the spatial element 347A near the boundary of field 202A may have an intersection ratio of about 0.75 (or 75%). The correlation metrics of spatial elements 347 that do not intersect with the spatial extent 137A (and/or have minimal overlap therebetween) may be about 0 (or about 0%). By way of further non-limiting example, the spatial element 347X outside of the spatial extent 137A of field 202A may be 0. In some embodiments, the spatial profiler 142 may be configured to select target spatial elements 147 based on correlation metrics determined for respective spatial elements 347; the spatial profiler 142 may be configured to select target spatial elements 147A-N from a set of spatial elements 347 determined to have correlation metrics that are greater than 0% (and/or that satisfy one or more determined intersection thresholds, e.g., between about 5% and 20%). Alternatively, or in addition, the correlation metrics may quantify a number of yield values 135A within respective spatial elements 347. The target spatial elements 147 may be selected from spatial elements 347 determined to comprise more than a threshold number of mapped yield values 135A. Although particular techniques for representing spatial coverage characteristics of RS data 108 (e.g., spatial elements 347) and/or determining intersections between RS data 108 and spatial extents 137 (e.g., mapping spatial extents 137 into respective spatial schemes 307) are described herein, the disclosure is not limited in this regard and could be adapted to utilize any suitable means for representing spatial coverage characteristics of RS data 108 and/or determining intersections between such RS data 108 and yield datasets 134, as disclosed herein.

FIG. 3A further illustrates embodiments of systems and methods for determining temporal intersections for yield datasets 134, as disclosed herein. Determining temporal intersections for a yield dataset 134 may comprise the interval profiler 144 determining a plurality of target acquisition times 149, each target acquisition time 149 configured to fall within the production interval 138 of the yield dataset 134. In some embodiments, the interval profiler 144 may be configured to determine the target acquisition times 149 in accordance with the coverage scheme 109 of the RS data 108. The coverage scheme 109 of an RSDA platform 106 may comprise and/or correspond to a temporal coverage scheme (temporal scheme 309), which may be configured to indicate temporal coverage characteristics of one or more RSDA platforms 106 and/or the RS data 108 captured thereby. The temporal scheme 309 may comprise any suitable means for representing temporal coverage characteristics of an RSDA platform 106, acquired RS data 108, RS data 108 maintained in one or more RSD repositories 107, and/or the like, including, but not limited to: an acquisition interval, acquisition interval offsets, an acquisition period, acquisition period offsets, an acquisition frequency, acquisition frequency offsets, a schedule, absolute time values, relative time values, timing correlations with respective coverage elements (e.g., information pertaining to acquisition times and/or schedules for particular spatial elements of the coverage scheme 109), and/or the like. The temporal scheme 309 may indicate temporal coverage characteristics of respective geographical regions, areas, extents, locations, and/or the like (e.g., respective spatial elements 347 of the coverage scheme 109). The temporal scheme 309 may comprise temporal coverage metadata 339, which may indicate temporal coverage characteristics of respective spatial elements 347 of the coverage scheme 109. In the FIG. 3A embodiment, the temporal coverage metadata 339A-Z may be configured to indicate temporal coverage characteristics of respective spatial elements 347A-Z. In some embodiments, the interval profiler 144 is configured to determine a set of RSD coverage times 349 that spatially and temporally intersect with coverage scheme(s) 109 of one or more RSDA platforms 106. The interval profiler 144 may determine a plurality of RSD coverage times 349A-X for one or more yield datasets 134, each corresponding to a time and/or date within production interval(s) 138 of the yield datasets 134 at which the one or more RSDA platforms 106 acquired RS data 108 covering target spatial elements 147 determined for the yield datasets 134. As illustrated in FIG. 3A, determining the RSD coverage times 349A-X for the yield dataset 134A may comprise comparing the production interval 138A of the yield dataset 134 to temporal coverage characteristics of the target spatial elements 147A-N (as indicated by temporal coverage metadata 339 pertaining to the corresponding spatial elements 347). The RSD coverage times 349A-X of FIG. 3A may represent substantially all of the acquisition times of RS data 108 covering the target spatial elements 147A-N that fall within the production interval 138A of the yield dataset 134A.

In one embodiment, the interval profiler 144 is configured to set target acquisition times 149 at each of the determined RSD coverage times 349A-X (at each time at which RS data 108 covering the target spatial elements 147A-N were acquired by the one or more RSDA platforms 106 per the RSD coverage scheme(s) 109 thereof). In another embodiment, the interval profiler 144 is configured to select a subset of the RSD coverage times 349A-X (may select every N of the RSD coverage times 349A-X). Alternatively, and as disclosed in further detail herein, the interval profiler 144 may determine target acquisition times 149 in accordance with determined offsets, locations, and/or target regions 212 defined within production intervals 138 of one or more yield datasets 134, and may be configured to adjust the determined target acquisition times 149 in accordance with temporal coverage characteristics of the RS data 108 as disclosed herein (e.g., may adjust the determined target acquisition times 149 to align with respective RSD coverage times 349 per the coverage scheme 109 of the RS data 108).

As disclosed above, in some embodiments, the interval profiler 144 is configured to select target acquisition times 149 for yield datasets 134 at determined locations, offsets, and/or target regions 212 defined within the production interval(s) 138 thereof. In the FIG. 3A embodiment, the interval profiler 144 may set a first target acquisition time 149A at about four weeks from the start time 211 of the production interval 138A of yield dataset 134A (or X weeks from the end time 213), and may set subsequent target acquisition times 149B-M at regular intervals thereafter (e.g., every Y days or weeks). Alternatively, or in addition, the interval profiler 144 may configure the target acquisition times 149A-M in accordance with target regions 212A-M defined within the production interval 138A. The target regions 212A-M may correspond to determined offsets and/or periods during the production interval 138A (e.g., determined locations and/or offsets, as disclosed above). The target regions 212A-M may be configured to segment the production interval 138A into a plurality of substantially equivalent subintervals (e.g., into M subintervals, each covering about the same temporal extent). In some embodiments, the target regions 212A-M may be configured to correspond with production stages 139A-M defined within the production interval 138A. Each target region 212A-M may be configured to cover a respective production stage 139A-M (each region 212A-M may span a portion of the production interval 138A comprising a respective production stage 139A-M). The production stages 139A-M may correspond to determined production, development, and/or cultivation stages of the crop measured by the yield dataset 134A. The interval profiler 144 may be configured to set target acquisition times 149A-M within each target region 212A-M, which may comprise adjusting one or more of the target acquisition times 149A-M in accordance with the temporal scheme 309 of one or more RSDA platforms 106, as disclosed herein.

In some embodiments, the interval profiler 144 is configured to define production stages 139A-M within production intervals 138 that correspond to respective phenological stages of particular crops (e.g., times and/or time frames in which the particular crops are predicted to exhibit distinguishable phenological attributes corresponding to one or more phenological stages thereof). In the FIG. 3A embodiment, the production stage 139A of target region 212A may indicate a time within production interval 138A at which the crop is predicted to begin exhibiting detectable phenological attributes (e.g., leaf area, canopy, canopy moisture content, and/or the like). The production stage 139A (and/or target region 212A) may, therefore, correspond to an emergence and/or early post-emergence stage of the crop (e.g., a vegetative stage VE, V1, or the like). The production stages 139B-E (and corresponding target regions 212B-E) defined within the production interval 138A may correspond to subsequent developmental stages of the crop (e.g., respective vegetative growth stages V1 through VN, or the like). The production stages 139L-N (and corresponding to target regions 212L-N) defined near the end of the production interval 138A may correspond to maturity and/or reproductive stages of the crop, with the production stage 139M corresponding to a stage at which the crop is predicted to be ready for harvest. In one non-limiting example, the yield dataset 134A may measure yield of a particular type of corn grain (e.g., a particular species, variant, hybrid, and/or the like). The interval profiler 144 may define the target regions 212A-M within the production interval 138A to correspond with respective production stages 139A of the particular corn grain crop: the production stage 139A may correspond to an emergence and/or first leaf collar vegetative stage (e.g., VE or V1); production stage 139B may correspond a second leaf collar vegetative stage (e.g., V2), and so on, with production stage 139E corresponding to an Nth leaf collar and/or tasseling vegetative stage (e.g., VN or VT); and the subsequent production stages 139L-M may correspond to respective maturity and/or reproductive stages of the corn grain crop, with region 212L corresponding to a silking reproductive stage (e.g., R1) and region 212N corresponding to a dent or maturity reproductive stage (e.g., RS or R6).

In some embodiments, the interval profiler 144 is configured to determine characteristics of production intervals 138 of yield datasets 134 pertaining to respective crops, which may comprise defining temporal locations, ranges, and/or extents corresponding to one or more production stages 139 of the respective crops (and/or corresponding target regions 212) within the production intervals 138, as disclosed herein. The interval profiler 144 may be configured to characterize temporal characteristics in the production, development, and/or cultivation of respective types of crops (and/or other outputs) by use of production metadata 345. As used herein, crop production metadata (production metadata 345) may refer to electronically encoded data pertaining to the production, development, and/or cultivation of a specified crop (e.g., a particular type of crop, plant, variant, hybrid, and/or the like), including, but not limited to: timeframes to reach specified stages in the production and/or developmental of the crop (time to reach respective production stages 139), time required to progress between particular stages in the production and/or developmental of the crop (time between the start time 211, end time 213, and/or respective production stages 139A-M), adaptations to the production and/or developmental stages corresponding to environmental factors (e.g., climatological characteristics, environmental characteristics, weather, soil characteristics, and/or the like), adaptations to the production and/or developmental stages corresponding to cultivation factors (e.g., application of various production inputs), and/or the like. The interval profiler 144 may determine production metadata 345 pertaining to respective crops based on information extracted from one or more yield datasets 134 (e.g., yield datasets 134 having YMD 136 comprising information pertaining to the production interval 138 of the crop measured thereby, such as an end time 213, a start time 211, and/or temporal location(s) corresponding to one or more production stages 139A-M). Alternatively, or in addition, the production metadata 345 may be derived from determined characteristics of respective crops (e.g., determined and/or observed developmental and/or phenological stages of the crop over one or more production intervals 138 thereof).

In some embodiments, the production metadata 345 comprises one or more production profiles 355, each production profile 355 configured to define characteristics pertaining to the production, development, and/or cultivation of a respective type of crop (e.g., a specified crop type, species, genus, variant, hybrid, and/or the like). The production profile 355 of a crop may comprise temporal characteristics of a nominal and/or healthy cultivation thereof (based on determined developmental characteristics of the crop). Alternatively, or in addition, a crop production profile 355 may be derived from a plurality of production profile(s) 355 pertaining to a crop (e.g., may comprise mean, median, and/or average temporal characteristics of a plurality of production intervals 138 in which the crop was cultivated). A crop production profile 355 may comprise one or more interval mapping rules 357, the interval mapping rules 357 configured to map characteristics of the crop production profile 355 into particular time frames (e.g., particular date ranges, growing seasons, production cycles, years, and/or the like). The interval mapping rules 357 may be configured to estimate characteristics of a production interval 138 for the crop. The interval mapping rules 357 may be configured to determine an estimate of the start time 211 of a production interval 138 based on, inter alia, the end time 213 of the production interval 138 (e.g., the interval mapping rules 357 may indicate a length and/or timespan for production of the crop). The interval mapping rules 357 may be further configured to adjust and/or revise the determined estimate(s) based on one or more other factors, such as one or more environmental factors, cultivation factors, and/or the like, as disclosed herein. In the some embodiments, the production profile 355 of a crop may further comprise one or more stage mapping rules 359, each stage mapping rule 359 corresponding to a respective production stage 139 of the crop. In the FIG. 3A embodiment, the crop production profile 355 may comprise a plurality of stage mapping rules 359A-M, each corresponding to a respective production stage 139A-M of the crop. The stage mapping rules 359A-M may be configured to map respective production stages 139A-M of the crop into production intervals 138 of yield datasets 134 pertaining to the crop. The stage mapping rules 359A-M may be configured to define temporal locations, offsets, and/or target regions 212A-M corresponding to respective production stages 139A-M within a production interval 138 (e.g., based on an end time 213, a start time 211, and/or other information pertaining to the production intervals 138). The stage mapping rules 359A-M may be further configured to refine the determined estimates in accordance with environmental and/or cultivation factors, as disclosed herein. In some embodiments, the stage mapping rules 359A-M are configured to define revisions for the estimates determined for particular production stages 139A-M within a production interval 138 based on environmental and/or cultivation factors at time(s) corresponding to temporal location(s) of the particular production stages 139A-M within the production interval 138. By way of non-limiting example, the stage mapping rule 359B may modify the time span 259 separating production stages 139A and 139B within the production interval 138A based on environmental and/or cultivation factors during the time span 259 (e.g., may extend the time span 259 in response to determining that the temperature was abnormally low during the time span 259, resulting in delayed development of the crop). Although particular examples of production metadata 345 and/or means for acquiring such production metadata 345 are described herein, the disclosure is not limited in this regard and could be adapted to utilize, import, and/or incorporate information pertaining to temporal characteristics of the production, development, and/or cultivation of respective types of crops using any suitable technique and/or in accordance with any suitable factors.

As disclosed above, determining temporal intersections for yield datasets 134 may comprise the interval profiler 144 selecting target acquisition times 149 at determined offsets, intervals, and/or temporal location(s) within production interval(s) 138 of the yield datasets 134. In some embodiments, determining the target acquisition times 149 may comprise: a) defining one or more production stages 139 within the production interval(s) 138 (by use of the interval mapping engine 344 and/or production metadata 345 pertaining to the particular crop measured by the yield datasets 134, as disclosed herein); b) determining one or more target regions 212 within the production interval(s) 138, each target region 212 corresponding to a respective one of the production stages 139, and c) selecting target acquisition times 149, each target acquisition time 149 corresponding to a respective one of the determined target regions 212. The interval profiler 144 may be further configured to adjust the target acquisition times 149 in accordance with the coverage scheme 109 of RS data 108, as disclosed herein.

Referring back to FIG. 1, the RSDIM 150 may acquire a RS data 108 corresponding to yield datasets 134, which may comprise: a) importing yield datasets 134 (by the YDIM 130); b) determining target spatial elements 147 configured to cover determined spatial extent(s) 137 of the yield datasets 134; c) determining target acquisition times 149 configured to intersect with determined production intervals 138 of the yield datasets 134; and d) retrieving RS data 108 corresponding to the determined target spatial elements 147 and/or target acquisition times 149A-M from one or more RSD repositories 107A-N. The target spatial elements 147 and/or target acquisition times 149 may be determined in accordance with coverage scheme(s) 109 of one or more RSDA platforms 106A-M. Determining the target spatial elements 147 may comprise determining spatial intersections between the yield datasets 134 (and/or respective yield values 135 thereof) and the coverage scheme(s) 109 (e.g., spatial schemes 307 comprising spatial elements 347). The target acquisition times 149 may be determined to correspond with respective temporal locations, offsets, and/or target regions 212 within the production intervals 138. Determining the target acquisition times 149 may further comprise defining production stages 139 and/or corresponding target regions 212 within the production intervals 138 (e.g., mapping production stages 139 of respective crops into production intervals 138 for the respective crops), and setting target acquisition times 149 within target regions 212 corresponding to the respective production stages 139. Determining the target acquisition times 149 may further include adjusting and/or aligning the target acquisition times 149 in accordance with the coverage scheme(s) 109 (e.g., to correspond with respective RSD coverage times 349).

In some embodiments, the RSDIM 150 may be further configured to adjust and/or modify target acquisition times 149 in accordance with the determined availability of suitable RS data 108. As used herein, "suitable" RS data 108 refers to RS data 108 comprising accurate imagery data captured over a specified spatial extent at a specified acquisition time (e.g., accurate EMR data capturing the specified spatial extent). As used herein, "unsuitable" RS data 108 refers to RS data 108 that does not comprise accurate imagery data captured over the specified spatial extent at the specified acquisition time. As disclosed above, RS data 108 imported by the RSDIM 150 may be captured by an RSDA platform 106, such as a satellite RSDA platform 106A, a drone RSDA platform 106N, and/or the like, which may be configured to capture RS data 108 in accordance with a coverage scheme 109 (e.g., capture RS data 108 covering specified regions in accordance with a determined coverage schedule). RS data 108 captured by the RSDA platforms 106 may be subject to interference and/or corruption due to environmental conditions, hardware faults, software faults, and/or the like. Adjusting and/or modifying target acquisition times 149 may comprise shifting one or more of the target acquisition times 149 in accordance with the availability of suitable remote sensing data. The RSDIM 150 may be configured to shift a first target acquisition time 149 to an alternative acquisition time in response to determining that RS data 108 corresponding to the first target acquisition time 149 is not suitable (e.g., is obscured by cloud cover, corrupt, unavailable, and/or otherwise unsuitable). Selection of the alternative acquisition time may be based on the coverage scheme 109 of the RSDA platform 106, as disclosed herein (e.g., based on temporal coverage characteristics, such as a temporal scheme 309 and/or RSD coverage times 349 determined for the target spatial elements 147, as disclosed herein).

Figure 3B:
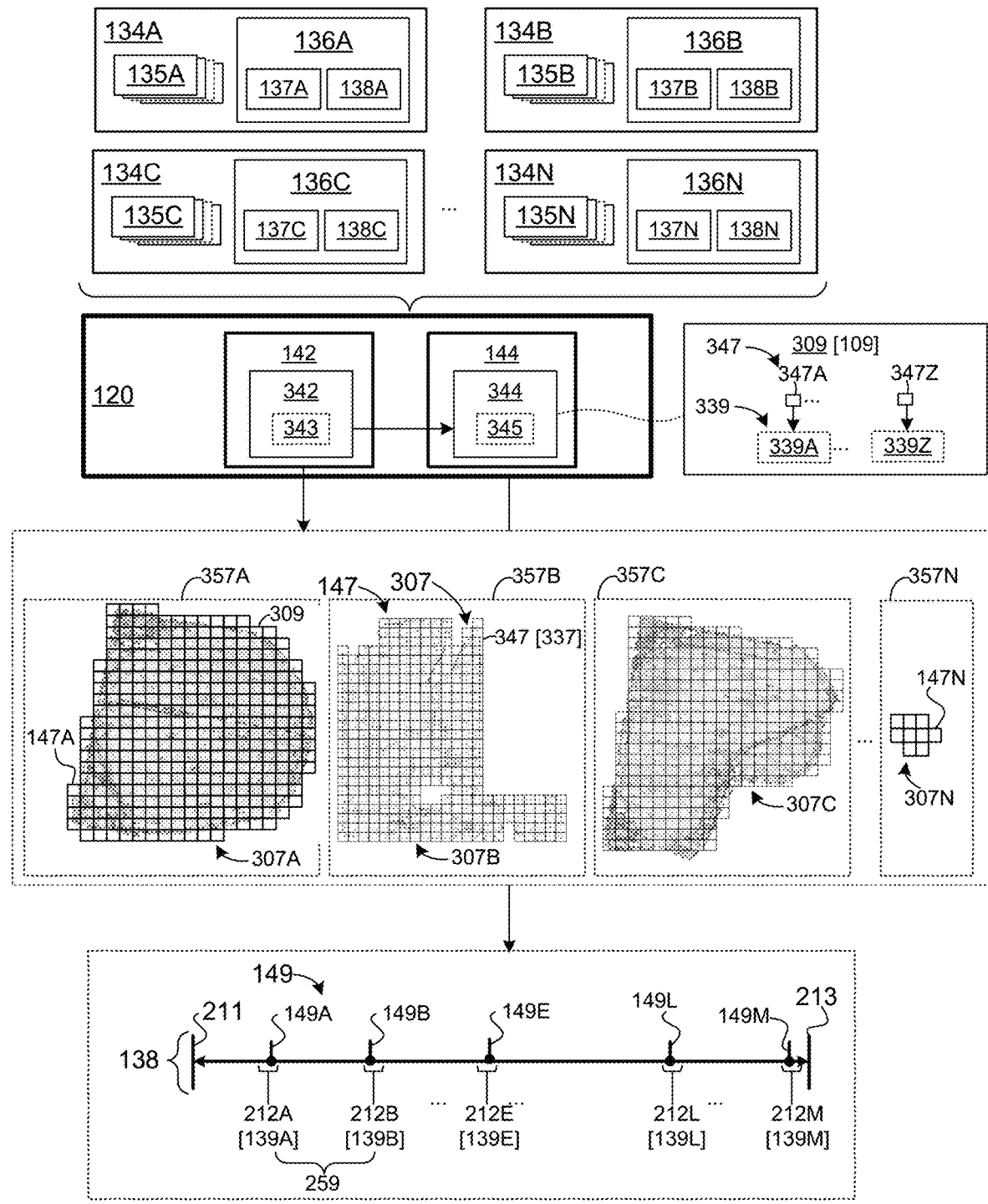
FIG. 3B depicts embodiments of systems and methods for determining spatial and/or temporal intersections for a plurality of related yield datasets, as disclosed herein.

FIG. 3B depicts embodiments of systems and methods for determining spatial and/or temporal intersections for a plurality of related yield datasets 134A-N. The yield datasets 134A-C may have spatial coverage characteristics (e.g., spatial coverages 138A-N) corresponding to the yield datasets 134A-C illustrated in FIG. 2A. Unlike the FIG. 2A embodiment, however, the yield datasets 134A-C illustrated in FIG. 3B may be related (e.g., may measure a same or similar crop).

Determining spatial intersections for the related datasets 134A-N may comprise identifying a plurality of target spatial elements 147A-N, the target spatial elements 147A-N configured to cover, overlay, and/or otherwise encompass the spatial extent 137A-N of each yield dataset 134A-N (and/or locations of yield values 135A-N thereof). As illustrated in FIG. 3B, determining the spatial intersections may comprise determining a plurality of disjoint sets of 357A-N of target spatial elements 147, each set 357A-N corresponding to a respective section 307A-N of the coverage schema 109 (e.g., a respective section 307A-N of the spatial schema 307 thereof).

FIG. 3B further illustrates systems and methods for determining temporal intersections for the plurality of related yield datasets 134A-N. In the FIG. 3B embodiment, the yield datasets 134A-N may comprise overlapping production intervals 138A-N. As used herein, overlapping production intervals 138 refer to production intervals 138 covering a same or similar timeframe (e.g., a same and/or overlapping timeframe during a same growing season, production cycle, and/or the like). Overlapping production intervals 138 may comprise production intervals 138 that overlap and/or intersect with respect to time (e.g., overlap between the start and/or end times 211/213 thereof). In some embodiments, overlapping production intervals 138 refer to production intervals 138 that have a same or similar end time 213 (e.g., have end times 213 that are within a temporal proximity threshold).

The interval profiler 144 may determine a production interval 138 to represent the overlapping production intervals 138A-N of the related yield datasets 134A-N. In some embodiments, the production interval 138 may comprise a selected one of the overlapping production intervals 138A-N (e.g., a production interval 138A-N having an end time 213 at a mean and/or median of the end times 213 of the production intervals 129A-N). Alternatively, the production interval 138 may comprise a combination, aggregation, average, mean, and/or median of the overlapping production intervals 138A-N. The end time 213 of the production interval 138 may correspond to an average, mean, and/or median of the end times 213 of the respective overlapping production intervals 138A-N. In some embodiments, the end time 213 may be set to an earliest end time 213 of the overlapping production intervals 138A-N (to ensure that none of the target acquisition times 149A-M fall after the end time 213 of any of the production intervals 138A-N).

Other characteristics of the production interval 138 may be based on combinations, aggregations, averages, means, and/or medians of corresponding characteristics of the overlapping production intervals 138A-N. Target regions 212A-M of the production interval 138 may be determined by aggregating, combining, averaging, and/or determining the median and/or mean of corresponding regions 212A-M within the overlapping production intervals 138A-N. In some embodiments, the start time 211 of the production interval 138 may be set to a latest start time 211 of the production intervals 138A-N.

Determining temporal intersections for related yield datasets 134A-N having overlapping production intervals 138A-N may comprise determining a plurality of target acquisition times 149A-M, as disclosed herein. In some embodiments, determining the plurality of target acquisition times 149A-M may comprise selecting target acquisition times 149A-M corresponding to each of a plurality of regions 212A-M defined within the production interval 138. The regions 212A-M may be configured to correspond with respective production stages 139A-M of the crop measured by the related yield datasets 134, as disclosed herein.

Figure 4A:
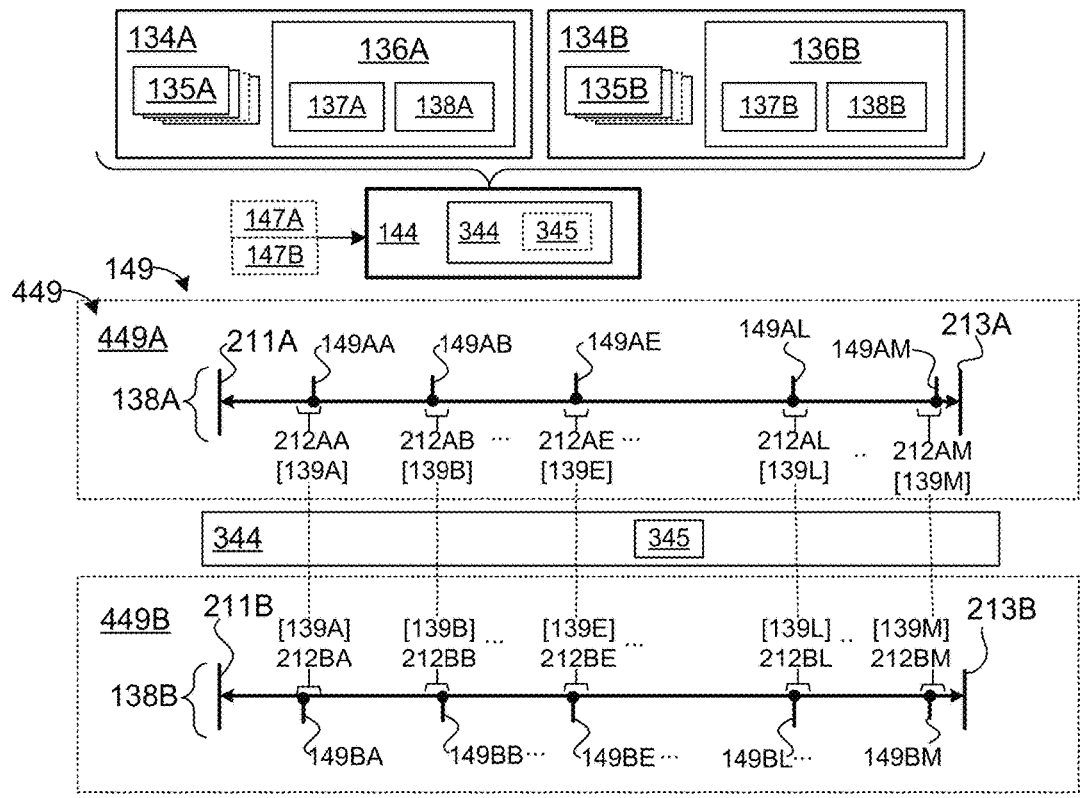
FIG. 4A depicts embodiments of systems and methods for determining temporal intersections for related yield datasets having non-overlapping production intervals, as disclosed herein.
Figure 4B:
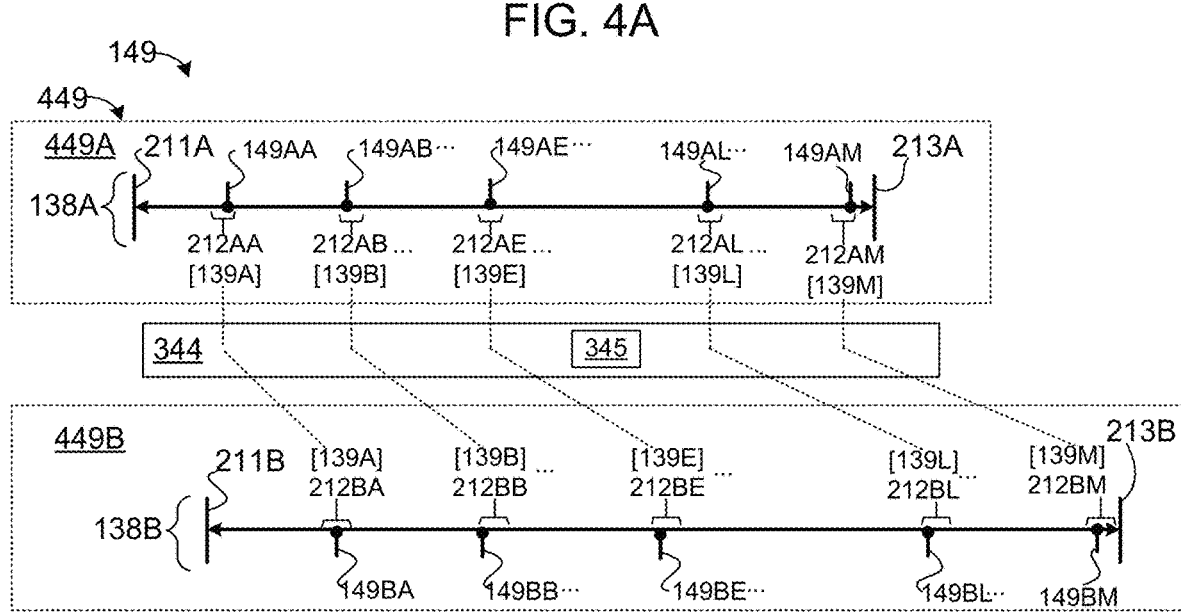
FIG. 4B depicts embodiments of systems and methods for determining temporal intersections for related yield datasets having non-corresponding production intervals, as disclosed herein.

In some embodiments, related yield datasets 134 may correspond to different, non-overlapping production intervals 138 (e.g., production intervals 138 in different years, growing seasons, production cycles, and/or the like). As illustrated in FIGS. 4A and 4B, determining temporal intersections for related yield datasets 134 having non-overlapping production intervals 138 may comprise determining a plurality of target acquisition time (TAT) sets 449, each TAT set 449 comprising target acquisition times 149 defined within a different respective production interval 138. The target acquisition times 149 defined within each production interval 138 may be configured to correspond with acquisition times 149 defined within other production interval(s) 138 (and vice versa). As used herein, "corresponding" target acquisition times 149 refer to target acquisition times 149 defined within a first production interval 138 that correspond with target acquisition times 149 defined within a second, different production interval 138. Corresponding target acquisition times 149 may refer to target acquisition times 149 within corresponding target regions 212 of the different production intervals 138. The corresponding target acquisition times 149 may, therefore, be configured to correspond to times at which crops are predicted to be at the same or similar production stages 139 within each production interval 138, respectively. Corresponding target acquisition times 149 and/or target regions 212 may, therefore, represent times at which crops are predicted to exhibit same and/or similar phenological characteristics (and/or other detectable attributes) within the different production intervals 138. Corresponding target acquisition times 149 for production intervals covering similar date ranges in different years may comprise same and/or similar target acquisition times 149 (within same or similar regions 212) in each of the respective production interval 138.

FIG. 4A illustrates embodiments of systems and methods for determining temporal intersections for related yield datasets 134A and 134B having different, non-overlapping production intervals 138A and 138B (e.g., production intervals 138A/138B in different years, growing seasons, production cycles, and/or the like). The yield dataset 134A may measure a crop produced during a first production interval 138A, and the yield dataset 134B may measure a same or similar crop produced during a second production interval 138B. The second production interval 138B may not overlap with the first production interval 138A (e.g., may correspond to a different growing season, production cycle, year, and/or the like).

In the FIG. 4A embodiment, the production intervals 138A and 138B may comprise corresponding production intervals 138. As used herein, "corresponding" production intervals 138 may refer to production intervals having corresponding end times 213 in different respective years and/or seasons (e.g., having end times 213 at same or similar dates in different years and/or seasons). In some embodiments, corresponding production intervals 138 further refer to production intervals 138 having corresponding start times 211, temporal extents, and/or the like. Corresponding production intervals 138 may, therefore, comprise production stages 139A-M defined at corresponding times and/or dates therein (e.g., production stages 139A-M may occur at same or similar dates in different years and/or seasons of the corresponding production intervals 138). The interval profiler 144 may determine that the production intervals 138A and 138B comprise non-overlapping, corresponding production intervals 138 in response to performing date-to-date comparisons therebetween (e.g., comparisons of times and/or dates in which years, growing seasons, and/or production cycles thereof are ignored, such as date comparisons based on month and/or day). The interval profiler 144 may determine that a particular time and/or date of the first production interval 138A corresponds to a time and/or date of the second production interval 138B in response to a date-to-date comparison therebetween satisfying a correspondence threshold (e.g., within N days). The interval profiler 144 may determine that the production intervals 138A and 138B correspond with one another in response to determining one or more of: the end time 213A of the first production interval 138A corresponds with the end time 213B of the second production interval 138B; the start time 211A of the first production interval 138A corresponds with the start time 211B of the second production interval 138B; and so on.

The interval profiler 144 may determine corresponding target acquisition times 149 within production interval 138A and 138B, respectively. The interval profiler 144 may determine a first TAT set 449A comprising target acquisition times 149AA-AM within production interval 138A and a second TAT set 449B comprising target acquisition times 149BA-BM within production interval 138B. The target acquisition times 149AA-AM of the first TAT set 449A may be configured to correspond to same or similar temporal locations, offsets, target regions 212 and/or crop production stages 139 within each non-overlapping production intervals 138A and 138B. Corresponding target acquisition times 149AA and 149BA may be configured to correspond to production stage 139A within production intervals 138A and 138B, respectively, corresponding target acquisition times 149AB and 149BB may be configured to correspond to production stage 139B within production intervals 138A and 138B, respectively, and so on, with corresponding target acquisition times 149AM and 149BM corresponding to production stage 139M within production intervals 138A and 138B, respectively.

In some embodiments, the interval profiler 144 is configured to determine the target acquisition times 149AA-AM of the first TAT set 449A within the first production interval 138A, as disclosed herein (e.g., by defining target regions 212AA-AM within the first production interval 138A, and determining target acquisition times 149AA-AM within respective target regions 212AA-AM). The interval profiler 144 may determine target acquisition times 149BA-BM of the second TAT set 449B based on the first TAT set 449A, such that each target acquisition time 149BA-BM of the second TAT set 449B is configured to correspond to a respective one of the target acquisition times 149AA-AM of the first TAT set 449A. Determining the second target acquisition times 149BA-BM may comprise translating, correlating, and/or otherwise mapping the target acquisition times 149AA-AM into the second production interval 138B. Due to the correspondence between the first and second production intervals 138A and 138B, determining the target acquisition times 149BA-BM of the second TAT set 449B may comprise shifting target acquisition times 149AA-AM to the appropriate year (and/or growing season or production cycle). Differences between respective target acquisition times 149AA-AM and 149BA-BM may be a result of adjustments thereto based on date-to-date differences within between the production intervals 138A/138B (differences within the correspondence threshold), temporal coverage characteristics of target spatial elements 147A and 147B determined for the respective yield datasets 134A and 134B, availability of suitable RS data 108, and so on, as disclosed herein. The adjustments and/or modifications may be configured such that the target acquisition times 149AA-AM of the first TAT set 449A and the target acquisition times 149BA-BM of the second TAT set 449B correspond to same or similar production stages 139 in each production interval 138A and 138B, as disclosed herein.

FIG. 4B illustrates further embodiments of systems and methods for determining temporal intersections for related yield datasets 134A and 134B. In the FIG. 4B embodiment, the production intervals 138A and 138B may be non-overlapping and non-corresponding. The interval profiler 144 may determine that the production intervals 138A and 138B of the FIG. 4B embodiment are non-corresponding in response to determining that the end times 213A/213B thereof are non-corresponding (e.g., a date-to-date comparison therebetween fails to satisfy a determined correspondence threshold). Alternatively, or in addition, the interval profiler 144 may determine that the production intervals 138A and 138B are non-corresponding in response to determining that the start times 211A/211B and/or production stages 139A-M of the production intervals 138A and 138B are non-corresponding, as disclosed herein.

In the FIG. 4B embodiment, the start time 211B of the second production interval 138B may be later in the year and/or growing season than the start time 211A of the first production interval 138A (per a date-to-date comparison). In addition, the timespan of the second production interval 138B may be greater than the timespan of the first interval 138A, resulting in the second end time 213B being further delayed relative to the first end time 213A. As further illustrated in FIG. 4B, differences between the start times 211A/211B and/or end times 213A/213B of the production intervals 138A/138B may result in differences in the temporal locations of the production stages 139A-M in the respective production intervals 138A/138B. Differences between the production intervals 138A/138B may be due to any number of factors including, but not limited to: climate and/or environmental conditions (e.g., cooler temperatures during the second production interval 138B, resulting in a delayed start to the growing season and slower development of the crop; more favorable temperatures during the first production interval 138A, resulting in a head start to the growing season and faster development of the crop; different amounts of precipitation between the production intervals 138A/138B; and so on), application of various production inputs, economic considerations, and/or the like.

The interval profiler 144 may be configured to determine corresponding target acquisition times 149 within each different production interval 138A and 138B. The interval profiler 144 may be configured to determine a first TAT set 449A comprising target acquisition times 149AA-AM within the first production interval 138A and a second TAT set 449B comprising corresponding target acquisition times 149BA-BM within the second production interval 138B. The interval profiler 144 may be configured to determine temporal intersections such that the target acquisition times 149AA-AM of the first TAT set 449A and the target acquisition times 149BA-BM of the second TAT set 449B correspond to same or similar production stages 139A-M within each different, non-corresponding production interval 138A and 138B. Determining the temporal intersections may comprise: 1) determining target acquisition times 149AA-AM of the first TAT set 449A to correspond with respective production stages 139A-M (and/or target regions 212AA-AM) defined within the first production interval 138A; and 2) mapping the target acquisition times 149AA-AM of the first TAT set 449A into the second production interval 138B to thereby produce a second TAT set 449B comprising target acquisition times 149BA-BM.

In some embodiments, determining corresponding target acquisition times 149 in the non-overlapping, non-corresponding production intervals 138A and 138B may comprise translating and/or mapping target regions 212AA-AM/212BA-BM and/or target acquisition times 149AA-AM/149BA-BM between the first and second production intervals 138A and 138B by use of the interval mapping engine 344 (and/or production metadata 345 thereof). As disclosed above, the interval mapping engine 344 may define rules, procedures, and/or other suitable computer-readable instructions for determining corresponding target acquisition times 149 between non-overlapping and/or non-corresponding production intervals 138. The interval mapping engine 344 may define rules for translating between corresponding production intervals 138 (e.g., production intervals 138 having same and/or similar end times, start times, and/or regions 212, as illustrated in FIG. 4A). The interval mapping engine 344 may further comprise rules for translating between non-corresponding production intervals 138, such as the production intervals 138A and 138B illustrated in FIG. 4B. Mapping target acquisition times 149AA-AM and/or target regions 212AA-AM from the first production interval 138A to the second production interval 138B may comprise shifting, expanding, translating, extrapolating, translating, and/or otherwise mapping temporal locations, offsets, regions 212, and/or target acquisition times 149 therebetween. The interval mapping engine 344 may comprise rules for defining regions 212 corresponding to respective production stages 139 of a crop within different, non-corresponding production intervals 138 such that the target regions 212 correspond to same and/or similar crop production stages 139 in the different production intervals 138. The interval mapping engine 344 may be configured to map target regions 212AA-AM from the first production interval 138A into the second production interval 138B, such that the target regions 212AA-AM and 212BA-BM within the different production intervals 138A and 138B correspond to same and/or similar crop production stages 139A-M (e.g., 212AA and 212BA both correspond to a same or similar early vegetative stage, and so on, with 212AM and 212BM corresponding to a same or similar reproductive or mature stage). Alternatively, or in addition, the interval mapping engine 344 may comprise rules for translating regions 212AA-AM and/or target acquisition times 149AA- AM from the first production interval 138A into the second production interval 138B (and/or vice versa). The translations may be configured such that the crop is predicted to be at the same and/or similar developmental stage at corresponding regions 212AA-AM/212BA-BM and/or target acquisition times 149AA-AM/149BA-BM (and/or have same and/or similar phenological characteristics). The interval mapping engine 344 may comprise one or more of linear mapping rules, non-linear mapping rules, one or more look-up tables, production metadata 345 describing characteristics of production intervals 138 of respective crops, and/or the like. As illustrated in FIG. 4B, determining second target regions 212BA-BM corresponding to first target regions 212AA-AM may comprise translating the first target regions 212AA-AM into the second production interval 138B (e.g., by shifting, expanding, and/or otherwise translating the first regions 212AA-AM to thereby produce corresponding second regions 212BA-BM). As further illustrated in FIG. 4B, determining target acquisition times 149BA-BM within production interval 138B that correspond with target acquisition times 149AA-AM defined within production interval 138A may comprise translating the target acquisition times 149AA-AM into the second production interval 138B (e.g., by shifting, expanding, and/or otherwise translating the first target acquisition times 149AA-AM to thereby produce corresponding second regions 212BA-BM). Alternatively, or in addition, determining corresponding target acquisition times 149 within the different production intervals 138A and 138B may comprise mapping production stages 139A-M into each of the production intervals 138A and 138B, respectively (by the interval mapping engine 344, as disclosed herein), determining target acquisition times 149AA-AM within target regions 212AA-AM defined within the first production interval 138A, and determining second target acquisition times 149BA-BM within target regions 212BA-BM defined within the second production interval 138B, as disclosed herein. The target acquisition times 149AA-AM and the target acquisition times 149BA-BM may, therefore, correspond to same production stages 139A-M of the crop within the different, non-overlapping, non-corresponding production intervals 138A and 138B. Although particular examples of techniques for determining corresponding target acquisition times 149 and/or target regions 212 within different, non-corresponding production intervals 138 are described herein, the disclosure is not limited in this regard and could be adapted to incorporate any suitable mapping, translation, and/or relational mechanism for correlating temporal locations, offsets, regions 212, and/or target acquisition times 149.

The following are exemplary target acquisition times 149 for related yield datasets 134 corresponding to respective crops, including corn grain, wheat, and soybeans, wherein the related yield datasets 134 for corn grain and soybeans span non-overlapping, corresponding production intervals 138, as disclosed herein (and as illustrated in FIG. 4A).

| Crop | Target Acquisition Times/Dates |
| --- | --- |
| Corn (2016) | May 29, 2016, Jun. 18, 2016, Jul. 8, 2016, Jul. 18, 2016, Aug. 7, 2016, Aug. 27, 2016, Sep. 16, 2016, Sep. 26, 2016 |
| Corn (2017) | May 24, 2017, Jun. 23, 2017, Jul. 3, 2017, Jul. 18, 2017, Aug. 12, 2017, Aug. 27, 2017, Sep. 16, 2017, Sep. 26, 2017 |
| Wheat (2016) | Jun. 5, 2016, Jun. 25, 2016, Jul. 15, 2016, Aug. 4, 2016 |
| Soybeans (2017) | Jul. 7, 2017, Jul. 17, 2017, Sep. 7, 2017, Sep. 12, 2017, Sep. 17, 2017 |
| Soybeans (2018) | Jul. 7, 2018, Jul. 17, 2018, Sep. 7, 2018, Sep. 12, 2018, Sep. 22, 2018 |

Referring back to FIG. 1, the RSDIM 150 may be configured to acquire RS data 108 corresponding to respective yield datasets 134, as disclosed herein. Acquiring RS data 108 corresponding to a yield dataset 134 may comprise: a) determining spatial intersections between a spatial extent 137 of the yield dataset 134 and RS data 108 maintained within one or more RSD repositories 107; b) determining temporal intersections between a production interval 138 of the yield dataset 134 and the RS data 108, and c) retrieving RS data 108 corresponding to determined spatial and/or temporal intersections. Determining the spatial intersections may comprise selecting a plurality of target spatial elements 147, the target spatial elements 147 configured to cover, overlay, and/or otherwise encompass the spatial extent 137 of the yield dataset 134. Determining the temporal intersections may comprise determining a plurality of target acquisition times 149 within the production interval 138 of the yield dataset 134. The target acquisition times 149 may be selected within respective target regions 212 of the production interval 138, each target region 212 corresponding to a respective production stage 139 of the crop measured by the yield dataset 134, as disclosed herein. Retrieving the RS data 108 may comprise requesting RS data 108 corresponding to the target spatial elements 145 determined for the yield dataset 134 from one or more RSD repositories 107. Retrieving the RS data 108 may further comprise requesting RS data 108 having acquisition times corresponding to each of the target acquisition times 149 determined for the yield dataset 134. Retrieving RS data 108 corresponding to a yield dataset 134 having a spatial extent 137 comprising N target spatial elements 147 and temporal intersections comprising M target acquisition times 149 may comprise importing N*M RSD elements 155, each RSD element 155 covering a specified RSD spatial extent 157 corresponding to one of the N target spatial elements 147, and having an RSD acquisition time 159 corresponding to one of the M target acquisition times 149.

Acquiring the RS data 108 may further comprise validating imported RSD elements 155, as disclosed herein (e.g., by one or more data validation, cleaning, filtering, and/or normalization operations). Validating RSD elements 155 may comprise determining whether the RSD elements 155 comprise suitable RS data 108 (e.g., whether the RS data 108 were obtained during adverse environmental conditions, such as cloud cover, or the like). Validating RSD elements 155 may comprise rejecting RSD elements 155 in response to determining that the RS data 108 of the RSD elements 155 are unsuitable. The validating may further comprise retrieving alternative RSD elements 155 comprising RS data 108 from a different RSD repository 107 (captured by a different RSDA platform 106), at a proximate acquisition time to the rejected RSD elements 155 (and/or acquisition time within a threshold thereof), and/or the like. The validating may further comprise normalizing and/or correcting RSD elements 155. In some embodiments, the RS data 108 comprising one or more RSD elements 155 may comprise EMR values having a top-of-atmosphere (TOA) correction. Validating the RSD elements 155 may comprise minimizing effects of atmospheric distortions that can occur during acquisition by correcting the RSD elements 155 to a bottom-of-atmosphere (BOA) product.

An RSD element 155 may comprise a plurality of RSD components 153, each corresponding to a respective band and/or wavelength of the RS data 108. Each RSD element 155 may comprise RSD components 153 corresponding to each of a plurality of bands and/or wavelengths, each corresponding to a respective attribute and/or characteristics of the crop. An RSD element 155 may comprise a plurality of EMR values, each captured over the same RSD spatial extent 157 at the same RSD acquisition time 159. In the FIG. 1 embodiment, an RSD element 155 may comprise a plurality of RSD components 153A-R, each comprising an EMR value for a specified EM band (or wavelength) captured over a specified RSD spatial extent 157 at a specified RSD acquisition time 159, as follows:

| RSD Element 155 RSD Spatial Extent 157 RSD Acquisition Time 159 RSD Components 153: | |
|---|---|
| Band ID | EMR Value |
| Band 2 | 153A |
| Band 3 | 153B |
| Band 4 | 153C |
| Band 5 | 153D |
| Band 6 | 153E |
| Band 7 | 153F |
| Band 8a | 153G |
| Band 11 | 153H |
| ... | ... |
| Band 12 | 153R |

As illustrated above, RSD component 153A may quantify reflectance of band 2 EM radiation measured over the specified RSD spatial extent 157 at the specified RSD acquisition time 159, RSD component 153B may quantify reflectance of band 3 EM radiation measured at 157/159, and so on, with RSD component 153R quantifying reflectance of band 12 EM radiation measured at 157/159. The EM bands of the RSD components 153A-R may be selected in accordance with determined relationships between respective EM wavelengths and/or bands and crop attributes and/or characteristics, as disclosed herein (e.g., leaf area index, crop canopy health, crop canopy moisture content, and/or the like).

In some embodiments, importing RS data 108 corresponding to a yield dataset 134 may further comprise forming a plurality of RSD sequences 165, each RSD sequence 165 having an RSD spatial extent 157 corresponding to a respective one of the target spatial elements 147 of the yield dataset 134. An RSD sequence 165 may comprise a set of RSD elements 155 covering the same RSD spatial extent 157 at each of a plurality of RSD acquisition times 159 (e.g., RSD acquisition times 159A-M), as follows:

| RSD Sequence 165 RSD Spatial Extent 157 RSD Element 155A RSD Acquisition Time 159A RSD Components 153A-R RSD Element 155B RSD Acquisition Time 159B RSD Components 153A-R ... RSD Element 155M RSD Acquisition Time 159M RSD Components 153A-R |
|---|

Figure 5:
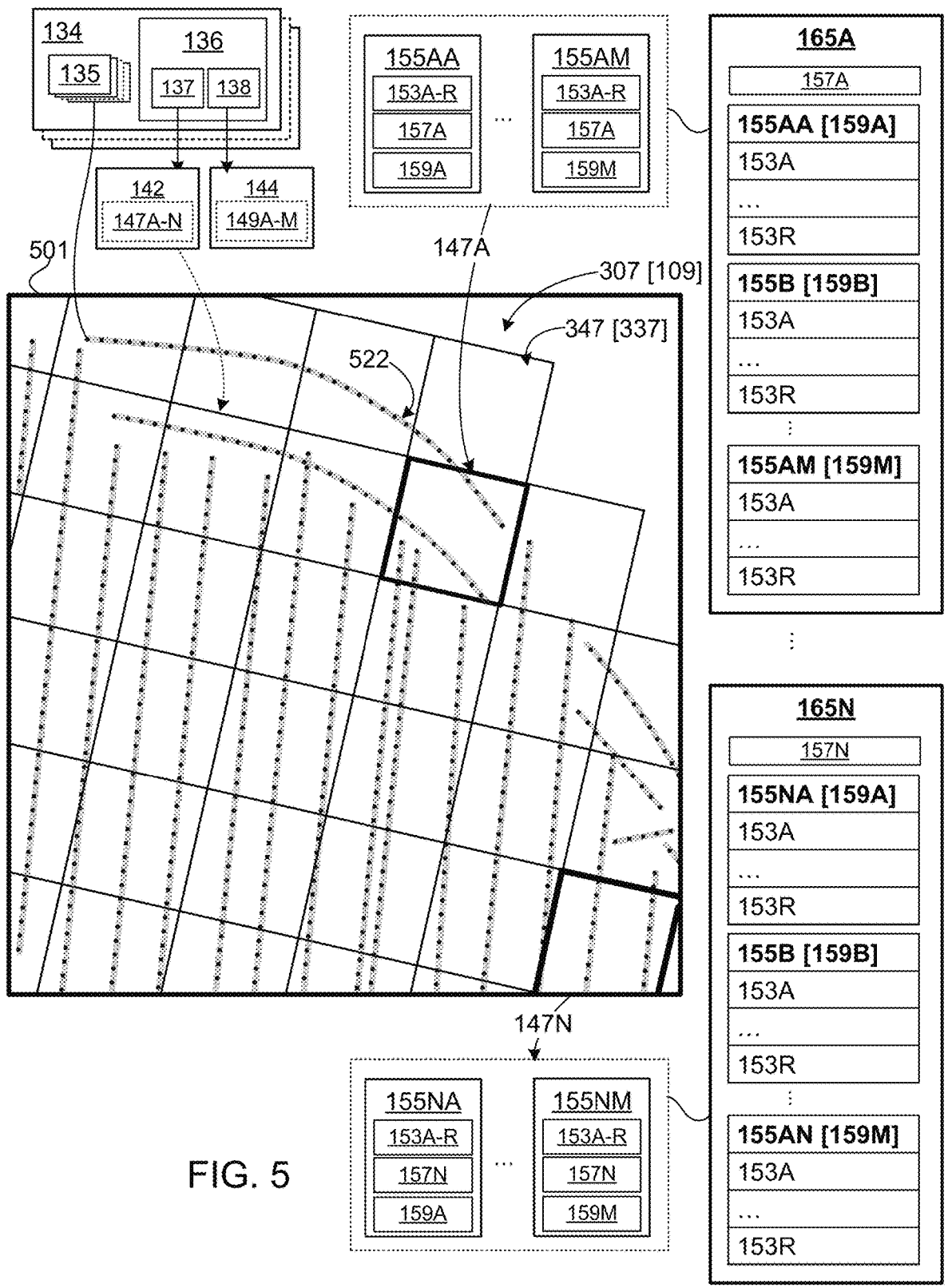
FIG. 5 depicts embodiments of remote sensing feature vectors corresponding to a yield dataset, as disclosed herein.

FIG. 5 depicts embodiments of systems and methods for importing RSD elements 155 and/or RSD sequences 165 for use in construction of feature vectors 175 and/or training vectors 675, as disclosed herein. FIG. 5 depicts a region 501 spanned by a yield dataset 134 (e.g., in accordance with the spatial extent 137 of the yield dataset 134). To avoid obscuring details of the illustrated embodiments, the region 501 may only depict a relatively small portion of the geographical area spanned by the yield dataset 134 (per the spatial extent 137 thereof). The region 501 may correspond to a field (and/or subfield location) in which captured yield data 104 comprising the yield dataset 134 were acquired. Yield values 135 of the yield dataset 134 are depicted as respective points within the region 501, each yield value 135 shown at a corresponding location within the region 501. In FIG. 5, the yield values 135 are shown within path(s) 522 taken by the harvester 102 during acquisition of the captured yield data 104. These path(s) 522 are for illustration only and do not necessarily correspond to data included in the yield dataset(s) 134 and/or acquired by the yield modeling apparatus 110.

As disclosed herein, acquiring RS data 108 corresponding to the yield dataset 134 may comprise determining a plurality of target spatial elements 147A-N and/or target acquisition times 149A-M in accordance with a coverage scheme 109 of the RS data 108. The coverage scheme 109 may comprise and/or define spatial coverage characteristics of the RS data 108 (e.g., may comprise a spatial scheme 307 comprising spatial elements 347, such as a tiling grid, each spatial element 347 having a specified RSD coverage 337, as disclosed herein.). The target acquisition times 149A-M may be determined in accordance with a temporal extent of the yield dataset 134 (e.g., the production interval 138 thereof). In some embodiments, the target acquisition times 149A-M are configured to correspond with respective production stages 139 of the crop measured by the yield dataset 134, as disclosed herein.

Acquiring RS data 108 corresponding to the yield dataset 134 may comprise importing M RSD elements 155 for each of the N target spatial elements 147A-N determined for the yield dataset 134 (each RSD element 155 comprising RS data 108 having a respective RSD acquisition time 159 corresponding to one of the M target acquisition times 149A-M). As illustrated in FIG. 5, acquiring the corresponding RS data 108 may comprise importing RSD elements 155AA-AM corresponding to target spatial element 147A, each RSD element 155AA-AM comprising RS data 108 components 153A-R covering the target spatial element 147A (RS spatial extent 157A) captured at a respective RSD acquisition time 159A-M, and so on, including importing RSD elements 155NA-NM corresponding to target spatial element 147N, each comprising RS data 108 components 153A-R covering the target spatial element 147N (RS spatial extent 157N) captured at a respective RSD acquisition time 159A-M. In some embodiments, the RSDIM 150 may be further configured to organize RSD elements 155 into groups and/or sequences. As illustrated in FIG. 5, the RSDIM 150 may be configured to construct RSD sequences 165 for respective target spatial elements 147 (RSD sequences 165A-N for target spatial elements 147A-N, respectively), each RSD sequence 165 comprising RSD elements 155 covering a respective target spatial element 147 (RSD spatial extent 157) captured at each target acquisition time 149 (RSD acquisition times 159A-M corresponding to target acquisition times 149A-M, respectively). In the FIG. 5 embodiment, the RSD sequence 165A may comprise RSD elements 155AA-AM, each having an RSD spatial extent 157A corresponding to the target spatial element 147A and comprising RS data 108 (components 153A-R) acquired at each of M RSD acquisition times 159A-M, and so on, with the RSD sequence 165N comprising RSD elements 155NA-NM, each having an RSD spatial extent 157N corresponding to the target spatial element 147N and comprising RS data 108 (components 153A-R) acquired at each of the M RSD acquisition times 159A-M. As disclosed above, the RS data 108 comprising the RSD sequences 165 (components 153A-R) may comprise measurements of EM bands and/or wavelengths determined to correlate with crop production (e.g., crop phenology attributes). Moreover, the RSD sequences 165 may comprise RS data 108 for particular subfield locations at times spanning the production interval 138 of the yield dataset 134. The RSD sequences 165 may, therefore, be configured for use in modeling and/or characterizing subfield yield characteristics, as disclosed herein (e.g., in the development, training, and/or refinement of yield models 183).

Referring back to FIG. 1, the yield modeling apparatus 110 may further comprise a feature construction module 170, which may be configured to construct feature vectors 175 comprising RS data 108 corresponding to one or more yield datasets 134. Construction of feature vectors 175 may be adapted to enable yield datasets 134 and RS data 108 captured at different spatial and/or temporal resolutions to be pooled, aggregated, and/or otherwise combined. The feature construction module 170 may be configured to map imported RS data 108 (e.g., RSD elements 155, RSD sequences 165, and/or the like) onto a determined feature scheme 609, which may correspond to a spatial resolution and/or scale different from a spatial resolution and/or scale of the RS data 108. The feature vectors 175 may be configured to: a) span specified spatial extents (e.g., incorporate RS data 108 pertaining to specified geographical regions, areas, and/or locations corresponding to production of a crop, as indicated by the feature vector (FV) spatial extents 177 thereof); and b) span a specified timeframe (e.g., incorporate RS data 108 having acquisition times 159 during production of the crop, as indicated by the FV interval 179 thereof). The FV spatial extent 177 may indicate subfield location(s) covered by the feature vector 175 (e.g., may identify subfield location(s) captured by RS data 108 comprising the feature vector 175). The FV interval 179 of a feature vector 175 may indicate acquisition time(s) 159 of the RS data 108 comprising the feature vector 175, which may correspond to respective target acquisition times 149 determined for the yield datasets 134 and, as such, may correspond to determined production stages 139 of the crop, as disclosed herein.

Figure 6A:
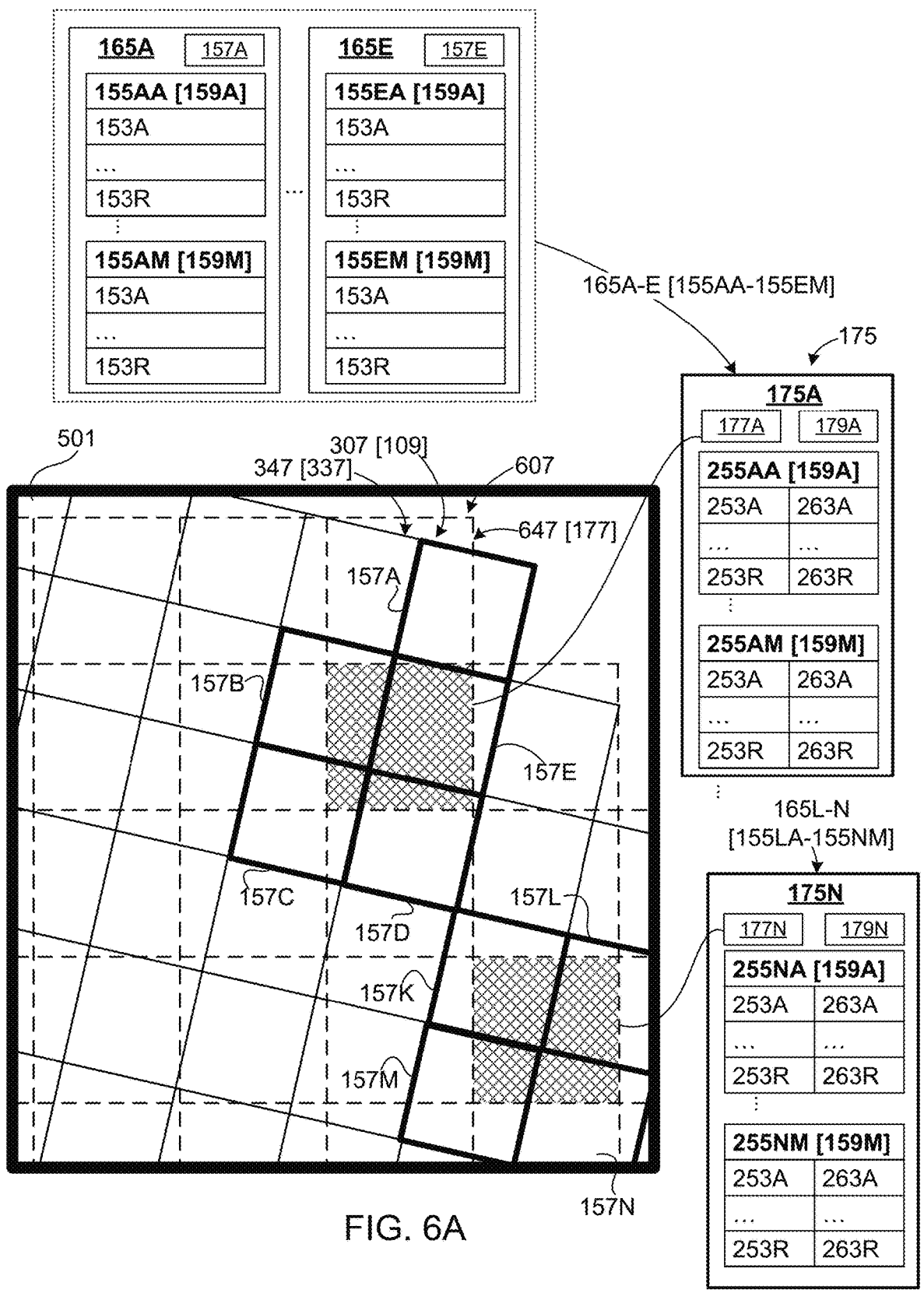
FIG. 6A depicts embodiments of systems and methods for constructing feature vectors, as disclosed herein.

FIG. 6A illustrates embodiments of systems and methods for constructing feature vectors 175, as disclosed herein. FIG. 6A may correspond to the region 501 illustrated in FIG. 5. In FIG. 6A, however, graphical representations of yield values 135 are omitted to avoid obscuring details of the illustrated embodiments. As disclosed above, the feature construction module 170 may be configured to construct feature vectors 175 in accordance with a feature scheme 609. Spatial characteristics of the feature vectors 175 may correspond to a spatial feature scheme 607. The spatial feature scheme 607 may be configured for pooling, aggregating, and/or otherwise combining RS data 108 and yield values 135 captured at different spatial resolutions and/or scales. As disclosed above, yield values 135 of the yield datasets 134 may be captured at a relatively high spatial resolution. The captured yield data 104 from which the yield datasets 134 are derived may comprise yield measurements captured at one-second intervals, each yield measurement having respective GPS coordinates. Respective yield values 135 may, therefore, correspond to a relatively small spatial scale (e.g., a few meters or less). By contrast, the imported RS data 108 may have a coarser spatial resolution in which each RSD element 155 (and/or component 153 thereof) spans a larger area (e.g., 20-meter region). Moreover, RS data 108 imported from one or more RSD repositories 107 may have different spatial resolutions. The resolution of RS data 108A imported from a first RSD repository 107A may differ from the resolution of RS data 108N imported from another RSD repository 107N. Additionally, the resolution of respective RSD components 153 may differ (e.g., band 2 EMR data may be acquired at a different spatial resolution than band 11, and so on). In some embodiments, the feature scheme 609 may define a spatial resolution and/or scale (spatial feature scheme 607) configured to enable yield values 135, RS data 108, and/or components 153 thereof having different spatial resolutions to be mapped thereto.

As illustrated in FIG. 6A, the spatial feature scheme 607 may comprise a spatial grid comprising a plurality of feature vector (FV) spatial elements 647 (e.g., grid tiles, granules, and/or the like), each FV spatial element 647 representing a spatial extent covered by a corresponding feature vector 175 (as indicated by the FV spatial extent 177 of the feature vector 175). In some embodiments, the spatial feature scheme 607 may define a spatial resolution and/or scale configured to ensure that respective feature vectors 175 cover at least one RSD element 155 and/or RSD sequence 165 (e.g., the FV spatial extent 657 thereof overlays at least one RSD spatial extent 157). As illustrated in FIG. 6A, the spatial feature scheme 607 may define a coarser spatial resolution than the RS data 108, such that the FV spatial extents 177 of respective feature vectors 175 are larger than the RSD spatial extents 157 of the imported RSD elements 155 (and/or components 153 thereof). In one embodiment, each feature vector 175 may be configured to span a respective 25-meter geographical region, as indicated by the FV spatial extent 177 thereof.

Constructing a feature vector 175 may comprise identifying RS data 108 that is covered, overlaid, and/or otherwise intersects with the FV spatial extent 177 thereof. Determining spatial intersections between feature vectors 175 and imported RS data 108 may comprise overlaying, mapping, translating, and/or otherwise correlating spatial extents of the RS data 108 (e.g., RSD spatial extents 157) with the spatial feature scheme 607. As illustrated in FIG. 6A, the feature construction module 170 may be configured to overlay the spatial feature scheme 607 (feature tiling grid) over RSD spatial extents 157 of the imported RS data 108. The overlaying may comprise adjusting an axis of the spatial feature scheme 607 to produce an angle between the axis of the spatial feature scheme 607 and a corresponding axis of the RSD spatial extents 157 (and/or corresponding coverage scheme 109). As illustrated in FIG. 6A, the feature construction module 170 may be configured to tilt the horizontal axis of the spatial feature scheme 607 relative to the horizontal axis of the spatial scheme 307 by about 20 degrees. The axis offset (and/or difference in spatial scale) may be configured to ensure that each feature vector 175 (extent 657) overlays a plurality of RSD elements 155 (e.g., intersects with a plurality of RSD spatial extents 157). Identifying RS data 108 corresponding to respective feature vectors 175 may comprise identifying RS data 108 corresponding to RSD spatial extents 157 overlaid by FV spatial extents 177 of the feature vectors 175. In the FIG. 6A embodiment, the feature vector 175A may comprise RS data 108 corresponding to RSD spatial extents 157A-E determined to spatially intersect with the FV spatial extent 177A (e.g., RSD sequences 165A-E comprising RSD elements 155AA-AM), and so on, with the feature vector 175N comprising RS data 108 corresponding to RSD spatial extents 157L-N determined to spatially intersect with FV spatial extent 177N (e.g., RSD sequences 165L-N comprising RSD elements 155LA-NM).

In some embodiments, a feature vector 175 may comprise one or more feature elements 255, each feature element 255 derived from a respective subset of the RS data 108 determined to intersect with the FV spatial extent 177 of the feature vector 175. The subset of each feature element 255 may comprise RSD elements 155 having a specified RSD acquisition time 159. In the FIG. 6A embodiment, each feature vector 175 may comprise M feature elements 255, each feature element 255 derived from a subset of the RS data 108 corresponding to one of M acquisition times 159A-M (which may correspond to respective target acquisition times 149A-M determined for the yield dataset 134, as disclosed herein). The disclosure is not limited in this regard, however; in other embodiments, feature vectors 175 may be configured to span a subset of the target acquisition times 149A-M. The subset may be selected in accordance with the availability of RS data 108 covering particular non-measured production locations, as disclosed herein. The FV interval 179 of each feature vector 175 may specify the particular acquisition times 159 spanned thereby (e.g., M acquisition times 159A-M). Alternatively, or in addition, the FV interval 179 may indicate production stages 139 corresponding to the RSD acquisition times 159 spanned by the feature vector 175, as disclosed herein (e.g., may indicate temporal location(s), offset(s), and/or target region(s) 212 corresponding to respective production stages 139 of the crop defined within production intervals 138 corresponding to the respective RSD acquisition times 159).

An feature element 255 may comprise one or more RSD feature components 253. In the FIG. 6A embodiment, each feature element 255 comprises a plurality of RSD feature components 253A-R, which may correspond to respective RSD components 153A-R of the RS data 108, as disclosed herein (e.g., may correspond to reflectance measurements of respective EM bands and/or wavelengths). The RSD feature components 253A-R may be derived from the RSD components 153A-R of RSD elements 155 that spatially and/or temporally intersect with the feature vector 175, as disclosed herein. Determining RSD feature components 253A-R for an feature element 255 corresponding to a specified FV spatial extent 177 and a specified RSD acquisition time 159 may comprise: a) identifying RSD elements 155 that have RSD spatial extents 157 covered by the FV spatial extent 177 and were captured at the specified RSD acquisition time 159; and b) deriving RSD feature components 253A-R from corresponding RSD components 153A-R of the identified RSD elements 155. Deriving the RSD feature components 253A-R may comprise combining, aggregating, and/or otherwise fusing RSD components 153A-R of a plurality of identified RSD elements 155. In some embodiments, the RSD feature components 253A-R may comprise a mean, median, average, weighted average, and/or other combination of the RSD components 153A-R of the identified RSD elements 155. In some embodiments, the feature construction module 170 may be configured to weight the contribution of respective RSD elements 155 to a feature vector 175 based on correlation metrics determined for the respective RSD elements 155. The correlation metrics may quantify a degree to which spatial elements overlap, intersect, and/or correlate spatially, as disclosed herein (e.g., overlap between an RSD spatial extent 157 and an FV spatial extent 177). In the FIG. 6A embodiment, the RSD spatial extent 157D may have a relatively high degree of overlap with the FV spatial extent 177A of feature vector 175A and, as such, the RSD elements 155EA-EM may be assigned higher weights and/or priorities in construction of the feature vector 175A (as compared to contributions of other RSD elements 155 having lower degrees of overlap with the FV spatial extent 117A). Conversely, the RSD spatial extent 157A may have a low degree of overlap with the FV spatial extent 177A and, as such, contributions of the corresponding RSD elements 155AA-AM to the feature vector 175 may be assigned lower weights (and/or may be ignored).

In some embodiments, feature elements 255 may further comprise one or more RSD spatial lag components 263 (e.g., RSD spatial lag components 263A-R). The RSD spatial lag components 263A-R may comprise a mean, media, average, and/or other aggregation of the RSD feature components 253A-R of neighboring feature vectors 175. As used herein, the "neighbors" of a particular feature vector 175 may comprise feature vectors 175 having FV spatial extents 177 that are spatially proximate to the FV spatial extent 177 of the particular feature vector 175.

Figure 6B:
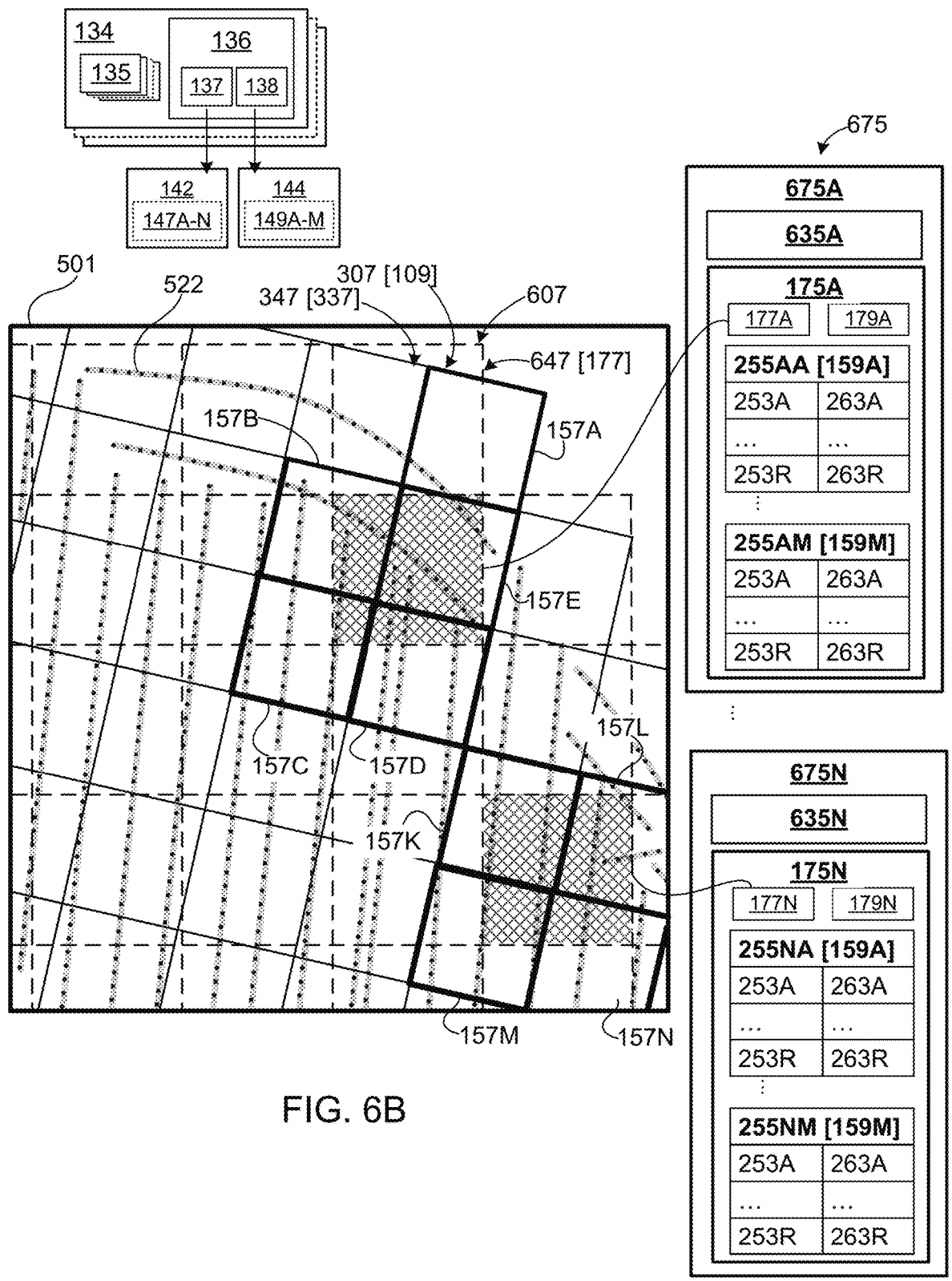
FIG. 6B depicts embodiments of systems and methods for constructing training datasets, as disclosed herein.

FIG. 6B illustrates embodiments of systems and methods for constructing training vectors 675 corresponding to a yield dataset 134, as disclosed herein. Each training vector 675 may comprise a feature vector 175, which may be constructed from RS data 108 corresponding to the yield dataset 134, as disclosed herein. Each training vector 675 may further comprise and/or be assigned a yield quantity 635. The yield quantity 635 may comprise a ground truth of the training vector 675 (e.g., may comprise a quantity to train and/or validate one or more yield models 183, as disclosed herein). The yield quantity 635 of a training vector 675 may be derived from identified yield values 135 of the yield dataset 134, the identified yield values 135 determined to spatially intersect the RSD spatial extent 177 of the feature vector 175 thereof (e.g., have location(s) within the RSD spatial extent 177). Determining the yield quantity 635 for a training vector 675 may comprise computing an average, mean, median, aggregation, and/or other combination of the identified yield values 135.

Referring back to FIG. 1, the yield modeling apparatus 110 may further comprise a yield modeling (YM) module 180, which may be configured to develop, train, validate, refine, update, and/or otherwise manage yield models 183 pertaining to the production of respective crops (and/or other production outputs). As disclosed above, each yield model 183 may be configured to model spatial yield characteristics of a specified crop (e.g., a specified crop type, species, genus, variant, hybrid, and/or the like). A yield model 183 for a particular crop may be trained by use of training vectors 675 derived from related yield datasets 134 pertaining to the particular crop and RS data 108 corresponding to the related yield datasets 134. Acquiring training vectors 675 to develop, train, validate, refine, and/or update the yield model 183 for a particular crop may comprise: a) acquiring a plurality of related yield datasets 134 (e.g., by the YDIM 130), each related yield dataset 134 corresponding to a determined production interval 138 of a same or similar crop as the particular crop at specified locations (spatial extents 137); b) importing RS data 108 corresponding to the related yield datasets 134 (e.g., by the RSDIM 150), the RS data 108 configured to span determined spatial extents 137 and production intervals 138 of each related yield dataset 134, respectively; and c) constructing training vectors 675 (e.g., by the feature construction module 170), comprising generating feature vectors 175, each comprising RS data 108 captured at specified FV acquisition times 179 and covering a specified FV spatial extent 177, and determining yield quantities 635 for each feature vector 175, each derived from yield values 135 within a respective FV spatial extent 177. Importing the RS data 108 corresponding to the plurality of related yield datasets 134 may comprise determining target acquisition times 149 within production interval(s) 138 determined for the related yield datasets 134. In some embodiments, the related yield datasets 134 may correspond to different production intervals 138 (e.g., non-overlapping and/or non-corresponding production intervals 138, as disclosed herein). Importing the RS data 108 corresponding to the related yield datasets 134 may comprise determining corresponding target acquisition times 149 within each different production interval 138, the target acquisition times 149 configured such that the target acquisition times 149 determined within each different production interval 138 correspond to same and/or similar production stages 139 of the crop within each of the different production intervals 138.

Figure 7A:
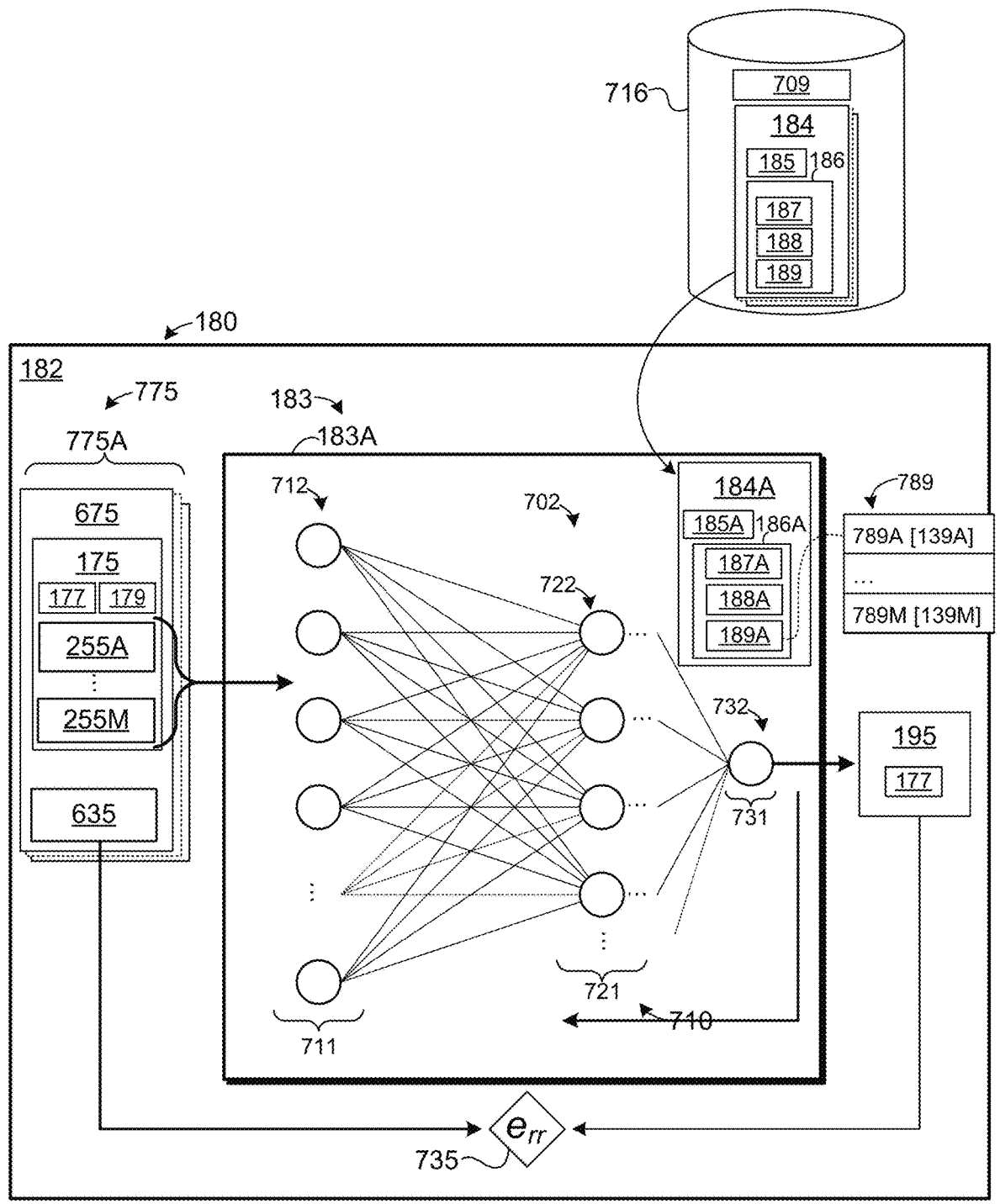
FIG. 7A depicts embodiments of systems and methods for developing crop yield models, as disclosed herein.

FIG. 7A is a schematic block diagram depicting embodiments of systems and methods for spatial yield modeling, as disclosed herein. In the FIG. 7A embodiment, the YM module 180 is configured to develop, train, refine, update, utilize, and/or otherwise manage yield models 183 in accordance with a yield modeling (YM) scheme 709. The YM scheme 709 may define an architecture, data structure(s), algorithms, and/or other characteristics of yield models 183 managed by the yield modeling apparatus 110. The YM scheme 709 may comprise, correspond to, and/or define one or more computer-implemented schemes for respective yield models 183, such as particular artificial intelligence (AI) schemes, machine learning (ML) schemes, pattern recognition schemes, and/or the like. In some embodiments, the YM scheme 709 may comprise, correspond to, and/or define an artificial neural network (ANN) architecture, in which a yield model 183 (e.g., yield model 183A) comprises a plurality of interconnected nodes 702, each node having a respective ML configuration (e.g., respective activation functions, weights, biases, interconnections, inputs, outputs, and/or the like).

The YM module 180 may comprise a modeling engine 182 configured to develop a plurality of yield models 183, each yield model 183 configured to model spatial yield characteristics of a specified crop (e.g., a specified crop type, species, genus, variant, hybrid, related crops, and/or the like, as disclosed herein). In some embodiments, the yield models 183 may further comprise yield models 183 configured to model spatial yield characteristics of crops produced in particular regions (e.g., related regions having similar environmental, climatological, and/or other characteristics, as disclosed herein). The modeling engine 182 may be further configured to develop yield models 183 configured to cover particular temporal extents 189 (e.g., particular portions of the production interval 138 of the crop). As disclosed in further detail herein, the temporal coverage 189 of a yield model 183 may specify temporal coverage characteristics of RS data 108 utilized by the yield model 183, such as the number of RSD acquisition times 159 included in respective feature vectors 175 and/or the particular temporal locations, offsets, and/or target regions 212 corresponding to the respective RSD acquisition times 159 (e.g., modeled acquisition times 789).

The modeling engine 182 may be configured to develop yield models 183 for particular crops by use of training datasets 775 corresponding to the particular crops. An training dataset 775 corresponding to a particular crop may comprise a plurality of training vectors 675, each training vector 675 comprising and/or derived from: a) related yield datasets 134 comprising yield values 135 measured over specified spatial extents 137 and/or during determined production intervals 138, and b) imported RS data 108 corresponding to the related yield datasets 134 (e.g., RS data 108 covering spatial extents 137 and/or production intervals 138 of the related yield datasets 134, as disclosed herein).

As disclosed above, a yield model 183 may comprise and/or be embodied by YM data 184. YM data 184 may be maintained as computer-readable data and/or instructions stored in non-transitory storage 716. In some embodiments, the non-transitory storage 716 may comprise and/or correspond to local storage resources of the yield modeling apparatus 110 (e.g., non-transitory storage 116 of the computing device 111, as illustrated in FIG. 1). Alternatively, or in addition, the non-transitory storage 716 may comprise an external storage device and/or service, such as network-attached storage, network-accessible storage, and/or the like. The non-transitory storage 716 may comprise YM data 184 for each of a plurality of yield models 183. As disclosed herein, YM data 184 may comprise any suitable information pertaining to a yield model 183, such as the yield model 183A illustrated in FIG. 7A. The YM configuration 185 of a yield model 183 may comprise and/or define information pertaining to the structure, arrangement, and/or configuration of an implementation of the yield model 183. The YM configuration 185 may comprise and/or define a structure, arrangement, and/or configuration of ML components comprising the yield model 183. The YM configuration 185 may comprise information pertaining to an ML implementation of the yield model 183, including, but not limited to: an ML scheme of the yield model 183 (e.g., an ML architecture of the yield model 183, such as an ANN, a multilayer perceptron (MLP), and/or the like); ML components of the yield model 183 (e.g., a configuration of respective nodes 702 and/or layers 710 of the yield model 183), interconnections between respective ML components, learned ML data (e.g., activation functions, weights, biases, interconnections, and/or other learned ML data of one or more nodes 702, layers 710, and/or other ML components of the yield model 183), ML training data (e.g., may comprise and/or reference training datasets 775 used to develop, train, refine, and/or validate the yield model 183), and so on. The YM configuration 185 may comprise information by which the modeling engine 182 may instantiate the yield model 183 within memory, storage, and/or processing resources of a computing device (e.g., the computing device 111). The YM configuration 185 may further comprise information by which the modeling engine 182 may train, refine, and/or validate the instantiated yield model 183. The YM configuration 185 may further comprise information by which the modeling engine 182 may instantiate a trained yield model 183 and/or may use the trained yield model 183 to determine yield estimates 195 for unmeasured production locations (e.g., fields for which accurate captured yield data 104 for particular fields have not been imported into the yield modeling apparatus 110).

The YM coverage 186 of a yield model 183 may comprise and/or define one or more of a crop coverage 187, RS coverage 188, and/or temporal coverage 189 of the yield model 183. The crop coverage 187 may be configured to specify the crop (and/or group of related crops) covered by the yield model 183. In some embodiments, the crop coverage 187 may further indicate region(s) covered by the yield model 183 and/or one or more characteristics of such region(s) (e.g., indicate that the yield model 183 is configured to model spatial yield characteristics of the specified crop in geographical region(s) and/or region(s) having particular environmental, climatological, and/or other characteristics, as disclosed herein). In some embodiments, the crop coverage 187 may further comprise and/or reference the yield datasets 134 used to develop the yield model 183, source(s) of such yield datasets 134, spatial extents 137 of the yield datasets 134, production intervals 138 of the yield datasets 134, and/or the like. The RS coverage 188 of the yield model 183 may comprise and/or define characteristics of suitable RS data 108. The RS coverage 188 may indicate EM wavelengths and/or bands capable of capturing information pertaining to characteristics of the specified crop (e.g., phenological attributes, such as canopy, canopy area, canopy moisture content, and/or the like). In some embodiments, the RS coverage 188 may further comprise information pertaining to the coverage scheme 109 of the RS data 108, as disclosed herein. The RS coverage 188 may further comprise information pertaining to the feature scheme 609 used to construct feature vectors 175 and/or corresponding yield quantities 635, as disclosed herein (e.g., construct training datasets 775 comprising training vectors 675, each comprising a respective feature vector 175 and yield quantity 635).

The temporal coverage 189 of a yield model 183 may comprise and/or define temporal characteristics of the RS data 108 used in the development thereof, such as the number of distinct RSD acquisition time(s) 159 included in respective feature vectors 175 utilized to train, refine, and/or validate the yield model 183. The temporal coverage 189 may comprise and/or define FV interval(s) 179 of the feature vectors 175. The temporal coverage 189 of a yield model 183 may indicate RSD acquisition times 159 spanned by the training feature vectors 175, which, in turn, may indicate the number of feature elements 255 included in each training feature vector 175. In some embodiments, the temporal coverage 189 may comprise and/or define one or more modeled acquisition times 789, which may correspond to respective temporal location(s), offset(s) during production of the specified crop (e.g., every N-days or weeks from planting to harvest). Alternatively, or in addition, the modeled acquisition times 789 may be configured to correspond with respective production stages 139 of the specified crop (e.g., may correspond to times at which the crop is predicted to exhibit particular phenological attributes during different production intervals 138).

The temporal coverage 189 of a yield model 183 may be used to select and/or construct feature vectors 175 that correspond to and/or are suitable for use with the yield model 183. As used herein, a feature vector 175 that "corresponds" to a yield model 183 or is "suitable" for use with the yield model 183 (a "corresponding" or "suitable" feature vector 175) may refer to a feature vector 175 having an FV interval 179 that comprises and/or corresponds with the temporal coverage 189 of the yield model 183. A suitable feature vector 175 may comprise a feature vector 175 that comprises feature elements 255 having RSD acquisition times 159 that correspond with the temporal coverage 189 of the yield model 183 (e.g., comprises feature elements 255 having RSD acquisition times 159 corresponding to each of the modeled acquisition times 789 of the temporal coverage 189). As disclosed herein, corresponding RSD acquisition times 159 may refer to RSD acquisition times 159 that correspond to a same or similar temporal locations, offsets, and/or target regions 212 within different production intervals 138. Corresponding RSD acquisition times 159 may, therefore, refer to RSD acquisition times 159 at which the specified crop is at same and/or similar production stages 139 during respective production intervals 138. In the FIG. 7A embodiment, the temporal coverage 189A may comprise M modeled acquisition times 789A-M, each configured to correspond to a respective production stage 139A-M of the particular crop (e.g., as defined within respective production intervals 138 of the related yield datasets 134 from which the yield quantities 635 of the training vectors 675 were derived).

The yield model 183A may be configured to produce yield estimates 195 in response to suitable feature vectors 175, the suitable feature vectors 175 comprising FV intervals 179 corresponding to the temporal coverage 189A of the yield model 183A, as disclosed herein. An feature vector 175 may be determined to be suitable for use with the yield model 183A in response to determining that the feature vector 175 comprises M feature elements 255A-M, the M feature elements 255A-M having RSD acquisition times 159A-M corresponding to the temporal coverage 189A of the yield model 183A (e.g., respective modeled acquisition times 789A-M). As illustrated in FIG. 7A, the yield model 183A may be configured to accept suitable feature vectors 175 comprising 2*M*R components, where M is the number of feature elements 255 specified by the temporal coverage 189A, and R is the number of components included in each feature element 255A-M (e.g., RSD feature components 253A-R and RSD spatial lag components 263A-R).

The yield model 183A may comprise an ANN configured for regression. In the FIG. 7A embodiment, the yield model 183A comprises an MLP, the MLP comprising a plurality of interconnected nodes 702, each node 702 having a respective activation function configured to produce one or more outputs in response to input(s) received thereby. The yield model 183A may comprise a plurality of layers 710, including, but not limited to: an input layer 711, one or more hidden layers 721, and an output layer 731. The input layer 711 may comprise a plurality of input nodes 712, each input node 712 configured to receive a respective RSD feature component 253 and/or RSD spatial lag component 263 of one of a plurality of RSD feature elements 255 of a suitable feature vector 175. The yield model 183A may comprise 2*M*R input nodes 712, as disclosed herein. The input nodes 712 and output node(s) 732 of the output layer 730 may be operably coupled to respective hidden layer nodes 722 of the one or more hidden layers 720. The nodes 702 may comprise ANN neurons comprising respective activation functions and/or interconnections having determined parameters, weights, biases, activation parameters, activation weights, activation biases, interconnection parameters, interconnection weights, interconnection biases, and/or the like. The nodes 702 may be configured to produce one or more outputs (and/or propagate the outputs to one or more nodes 702 coupled thereto) in response to one or more inputs, and in accordance with the activation function(s) and/or interconnection(s) thereof. In the FIG. 7A embodiment, the input nodes 712 may be configured to produce outputs in response to a suitable feature vector 175. The input nodes 712 may be configured to receive inputs corresponding to respective components of feature elements 255 of suitable feature vectors (e.g., respective RSD feature components 253 and/or RSD spatial lag components 263 of respective feature elements 255). In the FIG. 7A embodiment, each input node 712 may be configured to receive a designated one of the R RSD feature components 253 or R RSD spatial lag components 263 of a designated one of the M RSD feature elements 255 of a suitable RSD vector 175.

By way of non-limiting example, a first set of R input nodes 712 may be configured to receive respective RSD feature components 253A-R of RSD feature element 255A, a second set of R input nodes 712 may be configured to receive respective RSD spatial lag components 263A-R of RSD feature element 255A, and so on, with the M−1th set of R input nodes 712 being configured to receive RSD feature components 253A-R of RSD feature element 255M, and the Mth set of R input nodes 712 being configured to receive RSD spatial lag components 263A-R of RSD feature element 255M.

The yield model 183A may be configured to produce yield estimates 195 in response to suitable feature vectors 175. As disclosed above, a suitable feature vector 175 for the yield model 183A refers to a feature vector 175 pertaining to the particular crop modeled thereby (as indicated by the crop coverage 187A of the YM dataset 184A), and comprises feature elements 255 corresponding to the temporal coverage 189A thereof. The yield model 183A may be configured to receive an input vector comprising a suitable feature vector 175 at the input layer 711 (receive an input feature vector 175), as disclosed herein. The input nodes 712 may be configured to propagate outputs produced in response to the feature vector 175 to hidden layer nodes 722 coupled thereto (in accordance with respective activation functions, weights, biases, and/or interconnections of the input nodes 712). The hidden layer nodes 722 may be configured to produce outputs in response to inputs propagated from the input layer 711 (in accordance with respective activation functions thereof), and may be further configured to propagate corresponding outputs to other hidden layer nodes 722 and/or to the output layer 730. The output node 732 of the output layer 730 may receive inputs propagated from one or more hidden layer nodes 722 and, in response, may produce an output comprising the yield estimate 195 (e.g., in accordance with an activation function thereof). The yield estimate 195 may comprise an estimate of a yield of the particular crop produced within the geographical area, region, and/or location(s) specified by the input feature vector 175 (as indicated by the FV spatial extent 177 thereof).

Developing the yield model 183A may comprise constructing ML components capable of receiving feature vectors 175 corresponding thereto. As disclosed above, developing the yield model 183A may comprise generating an MLP structure comprising 2*M*R input nodes 712. Developing the yield model 183A may further comprise constructing other layers 720 and/or 730, which may comprise initializing a plurality of interconnected hidden layer nodes 722 and/or output layer nodes 732, the hidden layer nodes 722 having inputs coupled to one or more input nodes 712 and outputs coupled to inputs of one or more output nodes 732, and so on, as disclosed herein. Developing the yield model 183A may further comprise training the yield model 183A by use of a corresponding training dataset 775A comprising a plurality of training vectors 675, each comprising a respective feature vector 175 and yield quantity 635. The training dataset 775A may be derived from related yield datasets 134 pertaining to the crop specified by the crop coverage 187A thereof. The training may comprise determining an ML configuration of the yield model 183A capable of producing accurate yield estimates 195 in response to suitable feature vectors 175. The yield estimate 195 produced by the yield model 183A in response to an RSD vector 175 may be configured to estimate spatial yield characteristics of the specified crop within the geographical area, region, and/or location(s) covered by the FV spatial extent of the RSD vector 175 (e.g., specified subfield locations). The yield estimate 195 may, therefore, have a spatial resolution corresponding to the spatial resolution of the feature vectors 175 (e.g., 25-meter spatial resolution). Developing the yield model 183A may comprise determining and/or refining the YM configuration 185A thereof. As disclosed above, a YM configuration 185 may comprise any suitable information pertaining to implementation of a yield model 183. In the FIG. 7A embodiment, the YM configuration 185A may include, but is not limited to: information pertaining to respective nodes 702 comprising the yield model 183A, an arrangement of respective nodes 702, a configuration of respective nodes 702 (e.g., activations, weights, biases, settings, tuning parameters, activation functions, activation function inputs, activation function outputs, activation function parameters, activation function weights, and/or the like), inputs of respective nodes 702, outputs of respective nodes 702, interconnections between respective nodes 702 (e.g., interconnection parameters, weights, biases, and/or the like), a configuration of respective layers 710, interconnections between respective layers 710, and/or the like. The YM configuration 185 may comprise ML data learned during training, refinement, and/or validation of the yield model 183 (e.g., learned ML data).

Training a yield model 183 may comprise implementing one or more training procedures, which may include, but are not limited to: iterative training procedures (e.g., training epochs), k-fold cross validation procedures, dropout procedures, and/or the like. Implementing an iterative training procedure, such as a training epoch, may comprise: a) processing selected training vectors 675 by the yield model 183 to produce respective yield estimates 195, as disclosed herein; b) determining error metrics 735 in response to the yield estimates 195 (e.g., training error metrics 735, Tr_ERR), and c) tuning the yield model 183 to reduce the determined training error metrics 735 (Tr_ERR). The error metrics 735 (e.g., Tr_ERR) may be determined by comparing yield estimates 195 produced by the yield model 183 in response to the training RSD vectors 175 of respective training vectors 675 to the yield quantities 635 of the selected training vectors 675 (which may correspond to captured yield data 104 verified to accurately reflect the actual crop yield within the FV spatial extent 177 of the feature vector 175). Tuning the yield model 183 may comprise adjusting ML configuration data thereof (YM data 184) in accordance with one or more ML algorithms to minimize Tr_ERR. The turning may comprise any suitable modification and/or adaptation, including, but not limited to: adjusting parameters, activation functions, weights, biases, and/or other ML configuration data pertaining to the ML implementation of the yield model 183 (e.g., an ANN, MLP, one or more nodes 702, layers 710, node interconnections, layer interconnections, and/or the like). The tuning may comprise learning an YM configuration 185 (ML learning and/or tuning data) that results in the yield model 183 producing optimal error metrics 735 (e.g., minimal Tr_ERR). The tuning may comprise tuning configuration(s) of respective ML components (e.g., nodes 702, layers 710, and/or the like) in accordance with an ML algorithm, such as a supervised learning algorithm, an optimization algorithm, a gradient descent algorithm, a steepest descent algorithm, a quasi-Newton algorithm, a conjugate gradient algorithm, and/or the like.

In some embodiments, implementing a training epoch may comprise implementing a plurality of training iterations, each iteration comprising processing selected training vectors 675 through the yield model 183, determining error metrics 735, and/or tuning the yield model 183 to minimize the determined error metrics 735. Implementing a training epoch may further comprise performing training iterations until one or more completion criteria are satisfied. A training epoch may continue until completion criteria of the ML algorithm by which the ML configuration data are tuned are satisfied (e.g., the ML algorithm is unable to achieve further reductions in error metrics 735 (Tr_ERR) and/or has arrived at an optimal set of ML configuration data). Alternatively, or in addition, a training epoch may terminate in response to determining that ML configuration data tuned therein have stabilized (e.g., weights of respective nodes 702 are substantially unchanged across one or more training iterations), a maximum iteration count has been reached, and/or the like. The training may comprise verifying training of the yield model 183 in response to the average, root-mean-square (RSM), and/or other aggregation of the error metrics 735 (Tr_ERR) satisfying one or more verification thresholds.

In some embodiments, training a yield model 183 may comprise implementing a k-fold cross validation training procedure, which may comprise: a) splitting the training dataset 775 into a first subset and a second subset, the first subset comprising about 80% to 90% of the training dataset 775; b) selecting a training dataset (Tr) and a validation dataset (Va) from the first subset (the Tr dataset comprising about 90% of the first subset); c) implementing a training epoch using training vectors 675 of the selected Tr dataset, as disclosed herein; d) after completion of the training epoch, determining Va error metrics 735 (e.g., Va_ERR) corresponding to training vectors 675 of the Va dataset (the Va dataset comprising training vectors 675 not used during the preceding training epoch); e) repeating the training epoch in response to the Va error metrics 735 failing to satisfy a validation threshold; and f) in response to the Va error metrics 735 satisfying the validation threshold, using the second subset of training vectors 675, not used in the preceding training and/or validation operations, to quantify performance of the yield model 183 (e.g., based on error metrics 735 (Ver_ERR) corresponding to the second subset). The k-fold cross validation training procedure may comprise verifying the yield model 183 in response to error metrics 735 produced by the second subset of the training vectors 675 (Ver_ERR) satisfying one or more verification thresholds.

Alternatively, or in addition, training a yield model 183 may comprise implementing a dropout training procedure comprising: a) performing a plurality of iterations (a training phase), in which a random fraction p of the hidden layer nodes 722 (and corresponding activations) during processing of respective training feature vectors 175; and b) performing one or more testing iterations (validation operations), in which activations of all nodes 702 are utilized and reduced by a factor of p (to account for the missing activations during training). Verifying the yield model 183 may comprise determining whether the error metrics 735 satisfy one or more verification thresholds. Although particular examples of ML training and/or validation techniques are described herein, the disclosure is not limited in this regard and may be adapted to utilize any suitable means for developing, training, and/or validating ML components of a yield model 183 (ANN, MLP, respective nodes 702, layers 710, and/or the like).

Figure 7B:
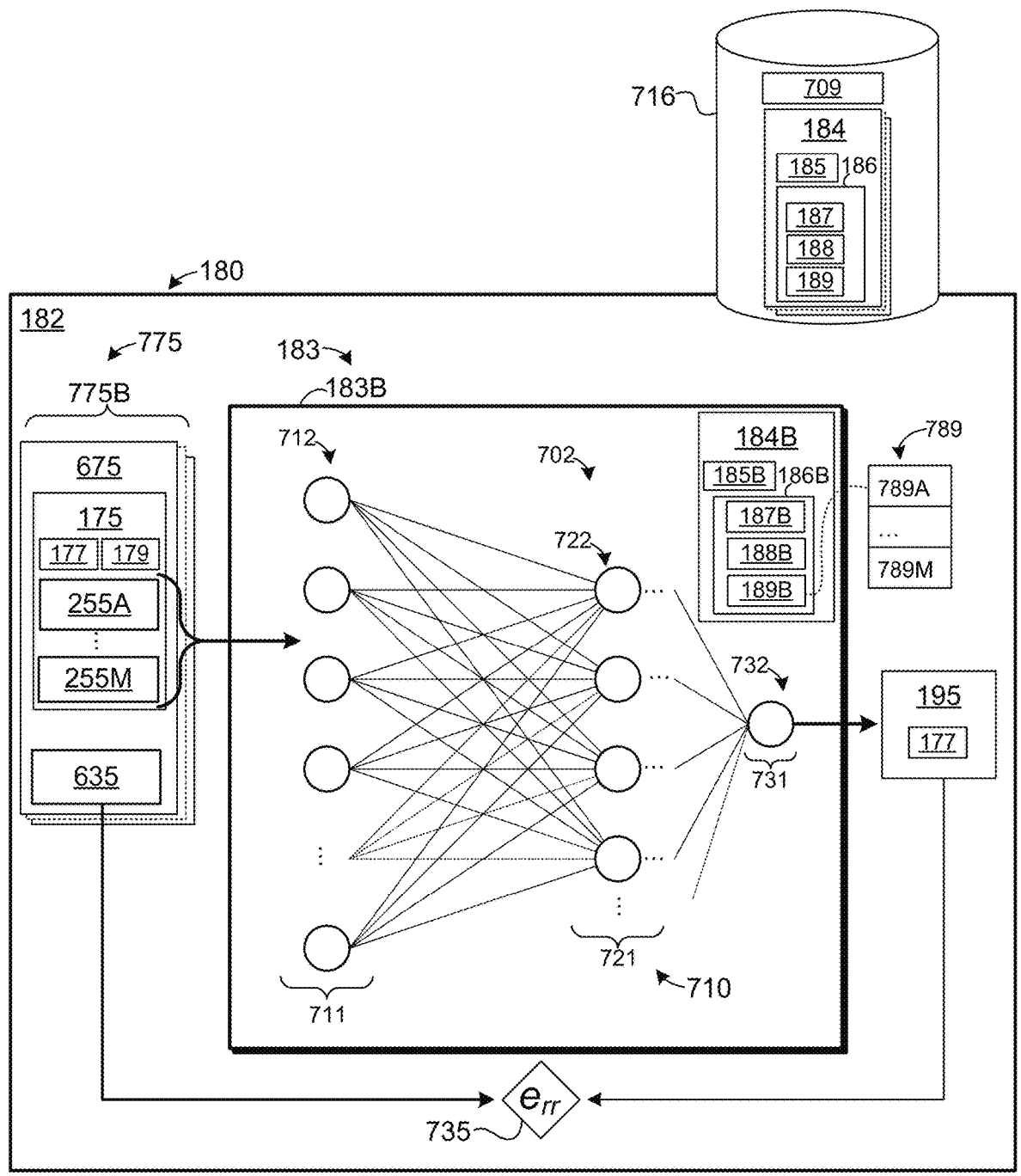
FIG. 7B depicts further embodiments of systems and methods for developing crop yield models, as disclosed herein.

FIG. 7B is a schematic block diagram illustrating further embodiments of systems and methods for developing yield models 183, as disclosed herein. In the FIG. 7B embodiment, the modeling engine 182 is configured to develop a yield model 183B. The YM dataset 184B comprising the yield model 183B may be maintained within non-transitory storage 716, as disclosed herein. The yield model 183B may be configured to model spatial yield characteristics of a different crop than the yield model 183A of FIG. 7A (as indicated by the crop coverage 187B thereof). The temporal coverage 189B may indicate that the yield model 183B covers M modeled acquisition times 789, which may correspond to respective temporal locations, offsets, target region(s) 212, and/or production stages 139 of the crop characterized by the yield model 183B, as disclosed herein. The modeling engine 182 may be configured to develop, train, refine, and/or validate the yield model 183B by use of a training dataset 775B derived from yield datasets 134 and corresponding RS data 108, as disclosed herein. The YM configuration 185B may comprise learned ML data configured to cause the yield model 183B to produce accurate yield estimates 195 in response to suitable feature vectors 175.

Referring back to FIG. 1, the yield modeling apparatus 110 may be configured to leverage the yield models 183 developed thereby to model spatial yield characteristics of specified production zones 124. As used herein, a "production zone" (PZ) 124 refers to production of a particular crop within a specified geographical area, region, location(s), field, and/or subfield location(s). A PZ 124 may, therefore, comprise and/or correspond to a spatial extent 137, as disclosed herein. In some embodiments, a PZ 124 may further comprise and/or correspond to a determined production interval 138 in which the crop was produced, as disclosed herein (e.g., a determined growing season, production cycle, year, date range, and/or the like). A PZ 124 may comprise unmeasured production locations. As used herein, an "unmeasured" production location refers to a location for which accurate, captured yield data 104 have not been imported (e.g., are unavailable to the yield modeling apparatus 110, are not sufficiently accurate, would be impractical to import, and/or the like). A production location for which accurate, captured yield data 104 are available and/or have been imported may be referred to as a "measured" production location. A same production location may be measured/unmeasured with respect to different production intervals 138, in accordance with the availability of accurate, captured yield data 104 for the production location corresponding to the respective production intervals 138. The yield modeling apparatus 110 may comprise a PZ manager 122 configured to manage information pertaining to respective PZ 124 in response to PZ data 121 pertaining thereto. The PZ manager 122 may be configured to maintain data pertaining to respective PZ 124 within non-transitory storage, such as the non-transitory storage 116 of the computing device 111.

The yield modeling apparatus 110 may be configured to model spatial yield characteristics of one or more PZ 124 by use of yield models 183 developed for crops produced within the PZ 124. As disclosed in further detail herein, modeling spatial yield characteristics of a PZ 124 may comprise: a) identifying a yield model 183 corresponding to the PZ 124; b) acquiring RS data 108 corresponding to the PZ 124 and identified yield model 183; c) constructing feature vectors 175 comprising the acquired RS data 108, each feature vector 175 covering a respective FV spatial extent 177 within the PZ 124; and d) using the identified yield model 183 to produce yield estimates 195 for each FV spatial extent 177. Identifying the yield model 183 corresponding to a PZ 124 may comprise identifying a yield model 183 configured to model spatial yield characteristics of a same or similar crop as produced within the spatial extent 137 of the PZ 124 during the production interval 138 thereof. Acquiring RS data 108 corresponding to the PZ 124 may comprise acquiring RS data 108 configured to cover the spatial extent 137 of the PZ 124. The acquiring may comprise identifying a plurality of target spatial extents 147 within a coverage scheme 109 of an RSDA platform 107, the target spatial extents 147 configured to cover, overlay, and/or otherwise encompass the spatial extent of the PZ 124, as disclosed herein. The acquiring may further comprise determining a plurality of target acquisition times 149 within the production interval 138 of the PZ 124, the target acquisition times 149 configured to correspond with the temporal coverage 189 of the identified yield model 183, as disclosed herein. Acquiring the RS data 108 may, therefore, comprise acquiring a plurality of RSD elements 155, each having an RSD spatial extent 157 covering a respective one of the target spatial elements 147 determined for the PZ 124 and having an acquisition time corresponding to one of the plurality of target acquisition times 149 determined for the PZ 124 (the target acquisition times 149 determined to correspond with respective modeled acquisition times 789, as disclosed herein). Constructing feature vectors 175 for the PZ 124 may comprise modifying a spatial resolution and/or scale of the acquired RSD data 108 in accordance with a feature scheme 609, as disclosed herein. The constructing may comprise producing a plurality of feature vectors 175 for the PZ 124, each feature vector 175 corresponding to a respective subfield location within the PZ 124 (e.g., a respective FV spatial extent 177) and comprising RS data 108 acquired at each of the plurality of RSD acquisition times 159 during the production interval 138 of the PZ 124 (e.g., per the FV interval 179 of the feature vectors 175). Producing yield estimates 195 over the PZ 124 may comprise processing feature vectors 175 of the PZ 124 by the identified yield model 183, the yield model 183 producing yield estimates 195 covering respective FV spatial extents 177 of the respective feature vectors 175 (e.g., each yield estimate 195 covering a respective subfield location within the PZ 124).

Figure 8:
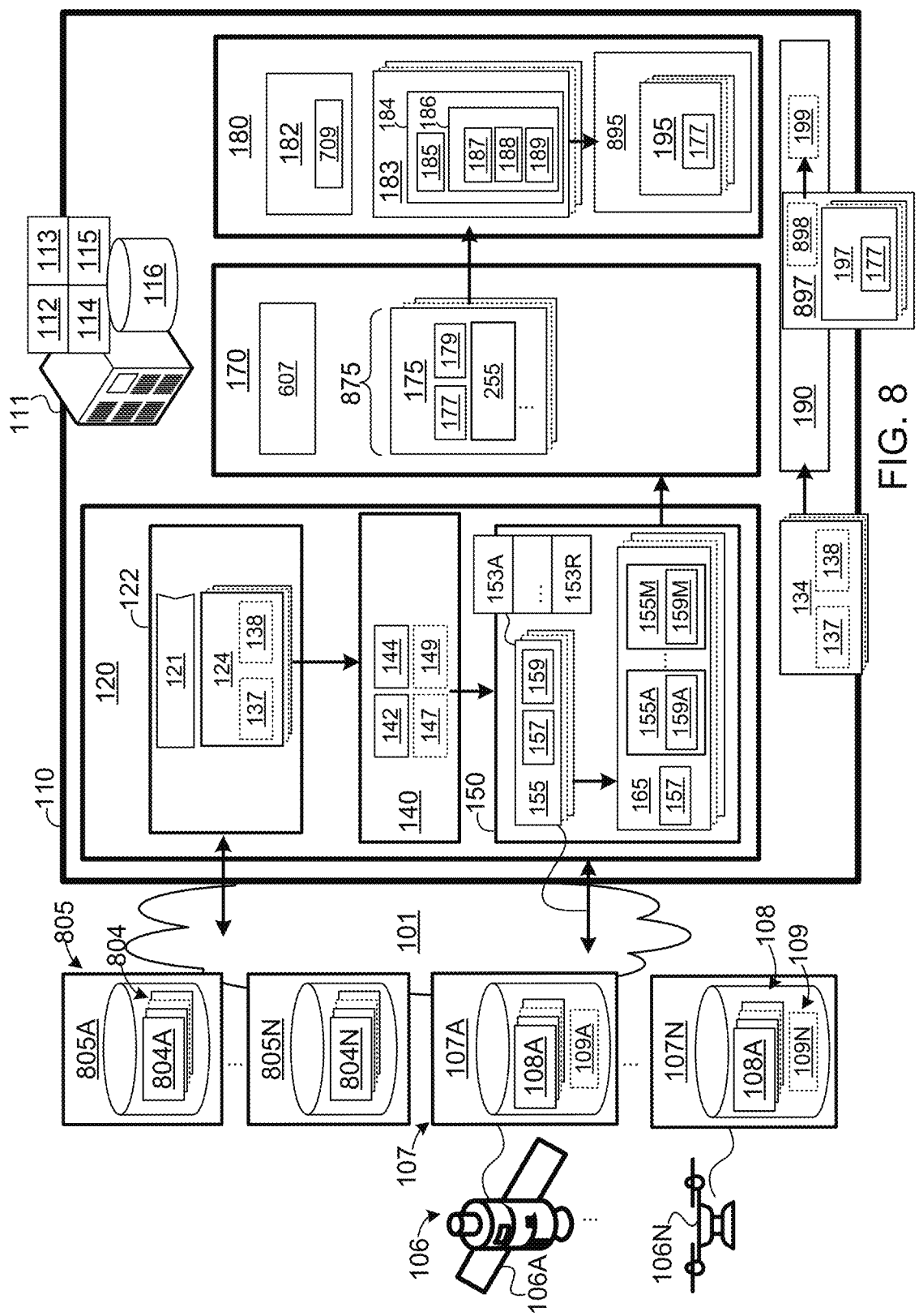
FIG. 8 is a schematic block diagram illustrating embodiments of systems and methods for modeling spatial crop yield characteristics, as disclosed herein.

FIG. 8 depicts further embodiments of systems and methods for modeling spatial yield characteristics as disclosed herein. The yield modeling apparatus 110 may comprise and/or be embodied by one or more computing devices, such as the computing device 111, as disclosed herein. The yield modeling apparatus 110 may further comprise an acquisition module 120, feature construction module 170, and YM module 180, as disclosed herein. In the FIG. 8 embodiment, the YM module 180 may comprise a plurality of yield models 183 (e.g., a plurality of YM datasets 184), each trained to produce spatial yield characteristics for specified crops, as disclosed herein. Accordingly, the yield modeling apparatus 110 of the FIG. 8 embodiment may omit the YDIM 130 used to acquire yield datasets 134 and/or construct training vectors 675 and/or training datasets 775 used to train the yield models 183. Alternatively, the yield modeling apparatus 110 may include the YDIM 130, and may be configured to acquire additional training vectors 675 and/or training datasets 775 for use in refining and/or updating existing yield models 183, developing additional yield models 183 (e.g., for other crop types), and/or the like.

The acquisition module 120 may comprise a PZ manager 122 configured to manage one or more PZ zones 124, as disclosed herein. The PZ manager 122 may be configured to create, update, modify, store, and/or otherwise manage one or more PZ 124 in response to PZ data 121. As disclosed herein, PZ data 121 may comprise any suitable information pertaining to a PZ 124 including, but not limited to: a spatial extent 137 of the PZ 124 (e.g., geographical area, region, location(s), fields, subfields location(s), and/or the like), a production interval 138 of the PZ 124 (e.g., end time 213, start time 212, temporal locations, offsets, target regions 212, and/or production stages 139 within the production interval 138, and/or the like), information pertaining to the particular crop produced within the PZ 124 (e.g., the crop type, species, genus, variant, hybrid, and/or the like), a producer of the crop, and/or the like. The PZ manager 122 may be configured to acquire PZ data 121 from any suitable source. In some embodiments, the PZ manager 122 is configured to receive PZ data 121 via user input (e.g., data input through one or more HMI components 115 of the computing device 111, via the network 101, or the like). Alternatively, or in addition, the PZ manager 122 may be configured to import PZ data 124 from one or more producers, organizations, PZ data records 804 maintained within one or more PZ repositories 805 (e.g., 805A-N comprising respective PZ data records 804A-N), and/or the like.

In some embodiments, the PZ manager 122 may be configured to acquire PZ data 121 indicating types of crops being cultivated in specified fields (specified spatial extents 137) during one or more production intervals 138. The PZ manager 122 may be configured to determine one or more PZ 124 by, inter alia, acquiring PZ data 121 pertaining to geographical areas covered by respective fields and/or crops cultivated in such fields. The PZ manager 122 may be configured to acquire PZ data 121 from any suitable source. The PZ manager 122 may be configured to acquire PZ data 121 from one or more PZ data repositories 805 comprising any suitable records 804 comprising information pertaining to one or more PZ 124 (e.g., PZ repositories 805A-N comprising respective records 804A-N, as illustrated in FIG. 8), which may include, but not limited to: a map PZ data repository 805 (comprising map records 804), a land ownership PZ data repository 805 (comprising land ownership records 804), a land use PZ data repository 805 (comprising land use records 804), a geographical survey PZ data repository 805 (comprising geographical survey data records 804), an environmental impact PZ repository 805 (comprising environmental impact data records 804), producer PZ data repository 805 (comprising producer data records 804), a SSURGO data repository 805 (comprising SSURGO data records 804, such as respective NCCPI values), and/or the like. The PZ manager 122 may define PZ 124 configured to indicate crops produced within respective fields during respective production intervals 138 by use of the PZ data 121 acquired from the one or more PZ data sources 805. The PZ manager 122 may, therefore, be configured to determine one or more PZ 124 independently of user input.

Alternatively, or in addition, the PZ manager 122 may be configured to determine spatial extents 137 of one or more PZ 124 (e.g., fields) by use of RS data 108 captured by one or more RSDA platforms 106. In one non-limiting example, the PZ manager 122 may be configured to acquire image data covering respective geographical regions and may employ ML techniques to identify fields in the acquired image data (e.g., identify areas having particular spatial configurations; areas bound by roads; areas having particular features, such as irrigation circles, and so on; areas exhibiting particular RS data 108 characteristics, and/or the like). In another non-limiting example, the PZ manager 122 may be configured to determine location(s) of one or more PZ 124 based on RS data 108 comprising RSD components 153 configured to characterize crop phenological characteristics, as disclosed herein. The PZ manager 122 may be configured to identify location(s) in which particular crops are being produced by matching the acquired RS data 108 to RS data 108 corresponding to yield datasets 134 pertaining to the particular crops.

In some embodiments, the PZ manager 122 may be further configured to determine and/or estimate information pertaining to production intervals 138 of one or more PZ 124. The PZ manager 122 may be configured to determine information pertaining to the production interval 138 of a PZ 124 from one or more related yield datasets 134 (e.g., harvest times of captured yield data 104 pertaining to the same or similar crop produced in a same or similar region as the PZ 124). The PZ manager 122 may be configured to estimate a start time 211, an end time 213, a target region(s) 212, and/or production stages 139 within the production interval 138 of a PZ 124, as disclosed herein (e.g., based on determined information pertaining to cultivation of the particular crop, and by use of the disclosed interval profiler 144 and/or interval mapping engine 344). Alternatively, or in addition, the PZ manager 122 may be configured to determine temporal locations, offsets, target regions 212, and/or production stages 139 within the production interval 138 of a PZ 124 based on RS data 108. In one non-limiting example, the PZ manager 122 is configured to determine an end time 213 of the production interval 138 in response to detecting a change(s) in RS data 108 captured over the spatial extent 137 of the PZ 124 that is indicative of harvest operations (e.g., sudden removal of the leaf canopy of the crop and/or the like). Although particular techniques for determining characteristics of a PZ 124 are described herein, the disclosure is not limited in this regard and could be adapted to utilize any suitable techniques, mechanisms, data, and/or algorithms for determining and/or estimating spatial and/or temporal characteristics of respective PZ 124.

As disclosed above, modeling spatial yield characteristics of a PZ 124 may comprise: a) identifying a yield model 183 corresponding to the PZ 124, b) constructing feature vectors 175 for the PZ 124 that are compatible with the identified yield model 183, and c) using the feature vectors 175 and identified yield model 183 to produce a plurality of yield estimates 195, each yield estimate covering a respective spatial extent of the PZ 124. The identifying may comprise matching the PZ 124 to the YM coverage 186 of a yield model 183. The identifying may comprise comparing the crop produced within the PZ 124 to crop coverages 187 of one or more yield models 183. The identifying may further comprise comparing RS coverage(s) 188 of the yield models 183 to RS data 108 covering the PZ 124 (e.g., the availability of respective EM wavelengths, bands, and/or the like). The identifying may further include evaluating temporal coverage characteristics of RS data 108 covering the PZ 124 to temporal coverage(s) 189 of the yield models 183, as disclosed herein. Constructing the feature vectors 175 for the PZ 124 may comprise acquiring RS data 108 for the PZ 124, which may comprise determining spatiotemporal intersections between the PZ 124 and a coverage scheme 109 of the RS data 108, as disclosed herein. Constructing the feature vectors 175 may comprise determining a plurality of target spatial elements 147 for the PZ 124, the target spatial elements 147 configured to cover, overlay, and/or otherwise encompass the spatial extent of the PZ 124. Constructing the feature vectors 175 may further comprise determining a plurality of target acquisition times 149 within the production interval 138 of the PZ 124. As disclosed in further detail herein, the target acquisition times 149 may be determined in accordance with temporal coverage characteristics of the RS data 108 and/or the temporal coverage 189 of the identified yield model 183.

Figure 9A:
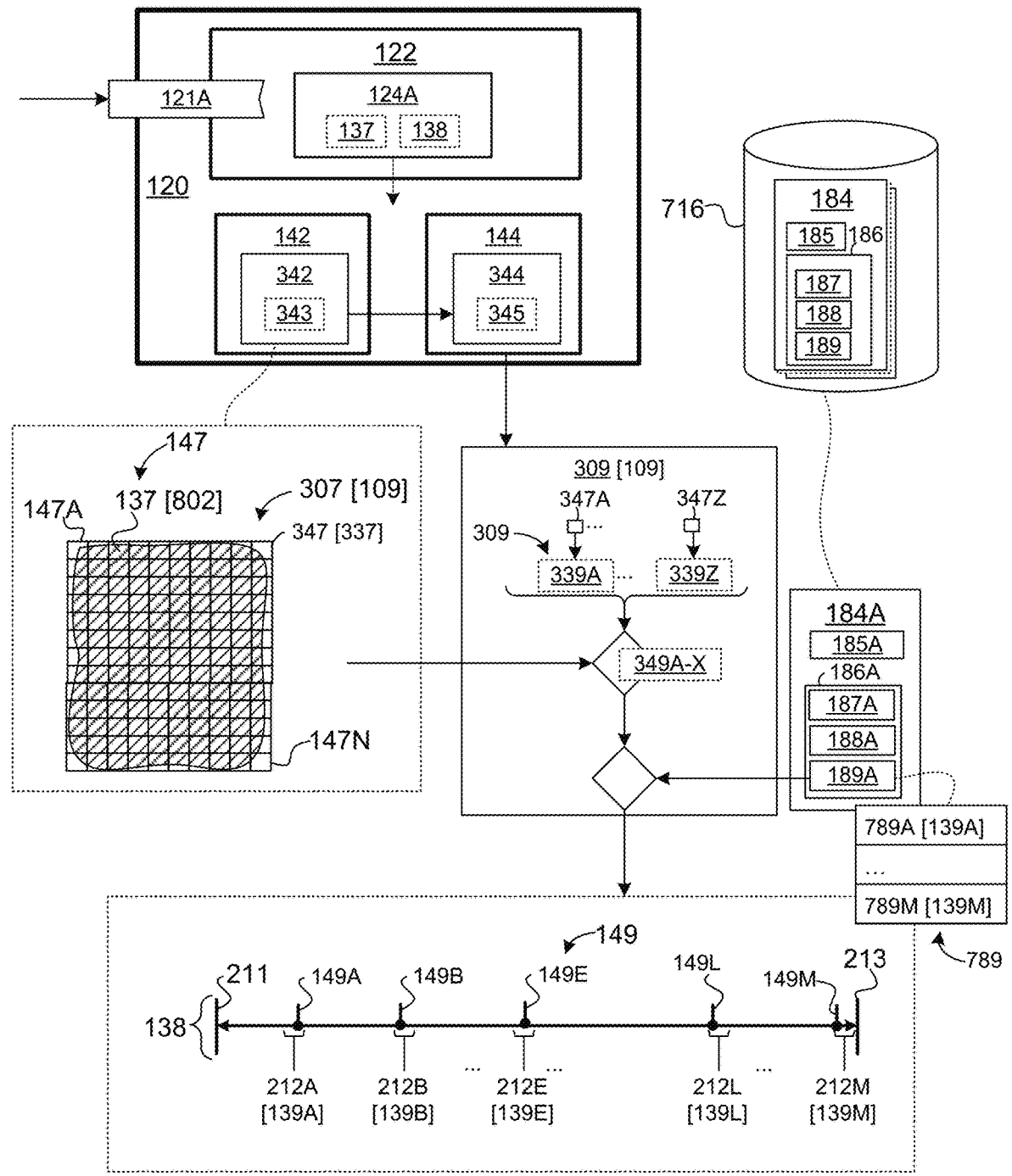
FIG. 9A depicts embodiments of systems and methods for acquiring remote sensing data pertaining to a production zone, as disclosed herein.

FIG. 9A is a schematic block diagram illustrating embodiments of systems and methods for acquiring RS data 108 for a PZ 124, as disclosed herein. In the FIG. 9A embodiment, the PZ manager 122 is configured to construct a PZ 124A in response to PZ data 121A. The PZ 124A may specify production of a particular crop within a specified field (e.g., spatial extent 137) during a particular time frame (e.g., determined production interval 138). The PZ manager 122 may be configured to determine and/or estimate spatial and/or temporal characteristics of the PZ 124A, as disclosed herein. In some embodiments, the PZ manager 122 is configured to determine temporal characteristics of the production interval 138 of the PZ 124A by use of an interval profiler 144, which may comprise mapping temporal location(s), offset(s), and/or target region(s) 212, corresponding to one or more production stages(s) 139 of the crop into the production interval 138 of the PZ 124A (e.g., by use of an interval profiler 144, interval mapping engine 344, and/or production metadata 345), as disclosed herein.

The PZ manager 122 may be configured to identify a yield model 183 corresponding to the PZ 124A, which may comprise comparing a crop produced within the PZ 124A to crop coverages 187 of YM datasets 184 maintained within non-transitory storage 716. As illustrated in FIG. 9A, the PZ 124A may correspond to yield model 183A (the PZ 124A may pertain to a crop covered by the yield model 183A per the crop coverage 187A thereof).

The PZ manager 122 may be configured to determine target spatial elements 147 for the PZ 124, which may comprise the spatial profiler 142 intersecting the spatial extent 137 of the PZ 124 (e.g., geographic area covered by a field 202 of the PZ 124), with a coverage scheme 109 of the RS data 108 to thereby identify a plurality of target spatial elements 147A-N overlaid thereby, as disclosed herein. Identifying the target spatial elements 147 may comprise mapping the spatial extent 137 of the PZ 124A onto a spatial scheme 307 comprising a plurality of spatial elements 347, each having a respective RSD coverage 337, as disclosed herein.

The PZ manager 122 may be further configured to determine target acquisition times 149 for the PZ 124, which may comprise the interval profiler 144 determining temporal coverage characteristics of the target spatial elements 147A-N. In some embodiments, the PZ manager 122 is configured to determine RSD coverage times 349 for respective target spatial elements 147 (determine available RSD coverage times 349A-X in accordance with temporal coverage metadata 339 corresponding to respective target spatial elements 147 of a temporal scheme 309 of the RS data 108, as disclosed herein).

The PZ manager 122 may be further configured to determine target acquisition times 149 for the PZ 124A in accordance with the temporal coverage 189A of the identified yield model 183A. As disclosed herein, the temporal coverage 189 of a yield model 183 may define temporal characteristics of feature vectors 175 suitable for use with the yield model 183, such as the number of RSD acquisition times 159 included in each feature vector 175 and/or temporal locations, offsets, target regions 212 of the RSD acquisition times 159 within respective production intervals 138. The temporal coverage 189 may comprise and/or define modeled acquisition times 789, which may correspond to respective production stages 139 of the crop, as disclosed herein. In the FIG. 9A embodiment, the temporal coverage 189A of yield model 183A may indicate that suitable RSD vectors 175 comprise M RSD feature elements 255, each comprising and/or derived from RSD elements 155 captured at a respective one of M RSD acquisition times 159. The temporal coverage 189A may further indicate temporal location(s), offset(s), and/or target region(s) 212 corresponding to each of the M RSD acquisition times 159A-M (modeled acquisition times 789A-M). In the FIG. 9A embodiment, the temporal coverage 189A comprises modeled acquisition times 789A-M, each corresponding to a respective production stage 139A-M of the crop. Determining the target acquisition times 149 for the PZ 124A may, therefore, comprise mapping production stages 139A-M into the production interval 138 of the PZ 124A (by the interval profiler 144 and/or interval mapping engine 344), and determining M target acquisition times 149A-M for the PZ 124A, the target acquisition times 149A-M within target regions 212A-M corresponding to the respective production stages 139A-M defined within the production interval 138, as disclosed herein. The determining may further comprise adjusting and/or modifying one or more of the target acquisition times 149A-M in accordance with the coverage scheme 109 of the RS data 109 (e.g., to align with respective RSD coverage times 349).

Referring back to FIG. 8, the RSDIM 150 may be configured to acquire RS data 108 corresponding to respective PZ 124 and/or yield models 183, which may comprise importing RSD elements 155 comprising RS data 108 covering determined target spatial elements 147 and/or target acquisition times 149, as disclosed herein. Importing the RSD elements 155 may further comprise adjusting and/or modifying one or more of the target acquisition times 149 in accordance with the availability of suitable RS data 108 (e.g., in response to determining that portion(s) of the RS data 108 are obscured by cloud cover and/or the like), as disclosed herein.

The feature construction module 170 may be configured to generate feature vectors 175 comprising RS data 108 acquired for respective PZ 124 (and/or yield models 183). In some embodiments, the feature construction module 170 is configured to construct RSD feature datasets 875 for respective PZ 124. An RSD feature dataset 875 may comprise a plurality of feature vectors 175 of a PZ 124, the feature vectors 175 having FV spatial extents configured to cover, overlay, and/or otherwise encompass the spatial extent 137 of the PZ 124. The feature vectors 175 of an RSD feature dataset 875 may be further configured to comprise RSD feature elements 255 having RSD acquisition times 159 within the production interval of the PZ 124. In some embodiments, the feature vectors 175 of an RSD feature dataset 875 may be configured to cover an FV interval 179 compatible with one or more yield models 183 (e.g., the FV interval 179 may define RSD acquisition times 159 for respective RSD feature elements 255 that correspond with respective modeled acquisition times 789 of the yield model 183).

Figure 9B:
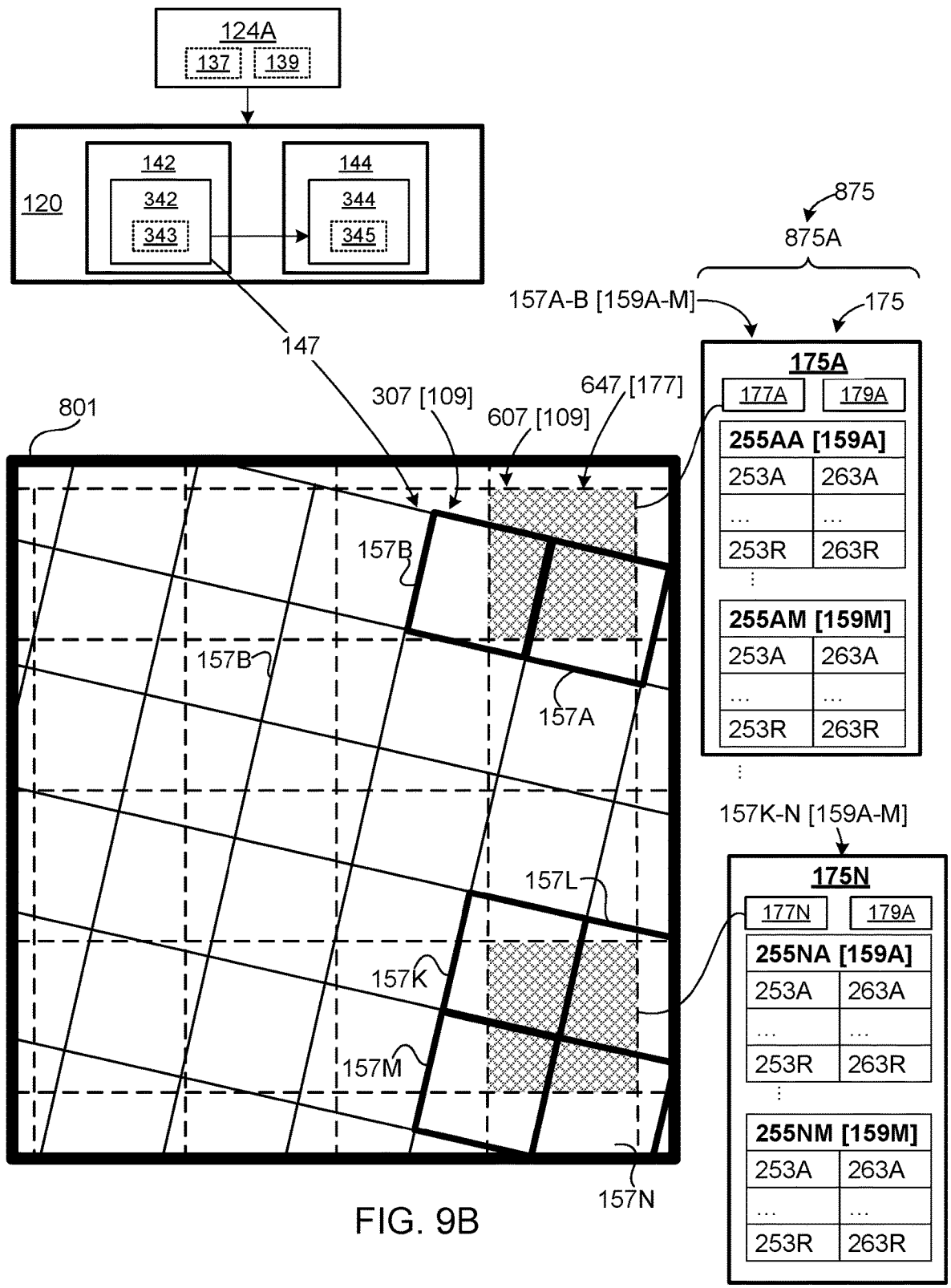
FIG. 9B depicts further embodiments of systems and methods for constructing feature vectors, as disclosed herein.

FIG. 9B is a schematic block diagram illustrating embodiments of systems and methods for constructing feature vectors 175 for a PZ 124 (e.g., PZ 124A as illustrated in FIG. 9A). FIG. 9B depicts a region 801, which may correspond to a portion of the spatial extent 137 of PZ 124A. Constructing the feature vectors 175 may comprise overlaying target spatial elements 147 of the PZ 124A with a feature scheme 609. In some embodiments, the spatial feature scheme 607 may be overlaid in accordance with a determined angle and/or angle offset relative to the coverage scheme 109 of the RS data 108. The feature scheme 609 may comprise a same feature scheme 609 used to construct feature vectors 175 of the training vectors 675 used to train the yield model 183A (e.g., may define a same or similar spatial resolution, scale, and/or the like). As illustrated in FIG. 9A, the feature construction module 170 may be configured to overlay RSD spatial extents 157 of RSD elements 155 corresponding to respective target spatial elements 147 (e.g., RSD spatial extents 157A-M) with a spatial feature scheme 607 comprising a plurality of FV spatial elements, each covering a respective FV spatial extent 177. The feature scheme 609 may be configured to modify a spatial resolution and/or scale of the RS data 108, as disclosed herein. In some embodiments, the scale of the spatial feature scheme 607 may be larger than the scale of the RSD spatial extents 157A-M (e.g., may define a 25-meter spatial scale whereas the RSD spatial extents 157A-M correspond to respective 20-meter geographical areas).

feature vectors 175A-N for PZ 124A may be constructed as disclosed herein. Each feature vector 175A-N may be derived from RSD elements 155 overlaid thereby. Each feature vector 175 may be derived from RSD elements 155 having RSD spatial extents 157 overlaid by the FV spatial extent 177 thereof. As illustrated in FIG. 9B, the feature vector 175A may be derived from RSD elements 155A-B overlaid by FV spatial extent 177A, and so on, with feature vector 175N being derived from RSD elements 155L-N overlaid by FV spatial extent 177N. An feature vector 175 may comprise an aggregation, average, median, mean, fusion, and/or other combination of a plurality of RSD elements 155. As disclosed herein, the contribution of respective RSD elements 155 to a feature vector 175 may be weighted in accordance with a degree of overlap between the FV spatial extent 177 of the feature vector 175 and the RSD spatial extent 157 of the RSD element 155.

The feature vectors 175 for PZ 124A may be constructed in accordance with a determined FV interval 179A. In the FIG. 9B embodiment, the FV interval 179A of the feature vectors 175 may be configured to correspond to the temporal coverage 189A of the yield model 183A (and/or the target acquisition times 149A-M determined for PZ 124A). In response to the temporal coverage 189A of the yield model 183A specifying M RSD acquisition times 159, the feature construction module 170 may configure the FV interval 179A such that each feature vector 175 constructed for use with the yield model 183A comprises M feature elements 255, each feature element 255A-M derived from RSD elements 155 corresponding to a respective one of the M RSD acquisition times 159A-M, as disclosed herein. The feature vectors 175 constructed for PZ 124A may comprise an RSD feature dataset 875A. The feature elements 255 of the feature dataset 875A may be configured to span the spatial extent 137 of the PZ 124A (e.g., FV spatial extents 177A-N may cover, overlay, and/or otherwise encompass the spatial extent 137 of PZ 124A). feature vector 175 of the RS feature dataset 875A may be further configured to comprise FV intervals 179A that correspond with the temporal coverage 189A of the yield model 183A, as disclosed herein. The feature vectors 175 of the feature dataset 875A may, therefore, be suitable for use with the yield model 183A. Although not shown in FIG. 9B to avoid obscuring details of the illustrated embodiments, the feature construction module 170 may be further configured to: construct RSD feature datasets 875 for the PZ 124A that are compatible with temporal extent(s) 189 of other crop yield model(s) 183, construct RSD feature datasets 875 for other PZ 124 that are suitable for use with the yield model 183A (compatible with the temporal coverage 189A), construct RSD feature datasets 875 for other PZ 124 that are compatible with other yield models 183, and/or the like.

Referring back to FIG. 8, the YM module 180 may generate production zone crop yield (PZCY) models 895 for respective PZ 124 by use of a) yield models 183 corresponding to the respective PZ 124, and b) RSD feature datasets 875 constructed for the respective PZ 124 and/or corresponding yield models 183, as disclosed herein. The PZCY model 895 determined for a PZ 124 may comprise a plurality of yield estimates 195 produced by a yield model 183 (and/or RS data 108 covering the PZ 124), each yield estimate 195 covering a respective portion of the spatial extent 137 of the PZ 124. Each yield estimate 195 may be produced by the yield model 183 in response to a respective one of the feature vectors 175 of the feature dataset 875. Accordingly, the yield estimates 195 of a PZCY model 895 may comprise estimates of crop yields within FV spatial extents 177 of the respective feature vectors 175. Each yield estimate 195 of the PZCY model 895 generated for a PZ 124 may, therefore, comprise an estimate of a crop yield at and/or within a particular subfield location of the PZ 124. The PZCY model 895 generated for a PZ 124 may, therefore, comprise high-resolution spatial yield characteristics for production of the specified crop within a specified field (within the specified spatial extent 137 and during the specified production interval 138 of the PZ 124).

Figure 9C:
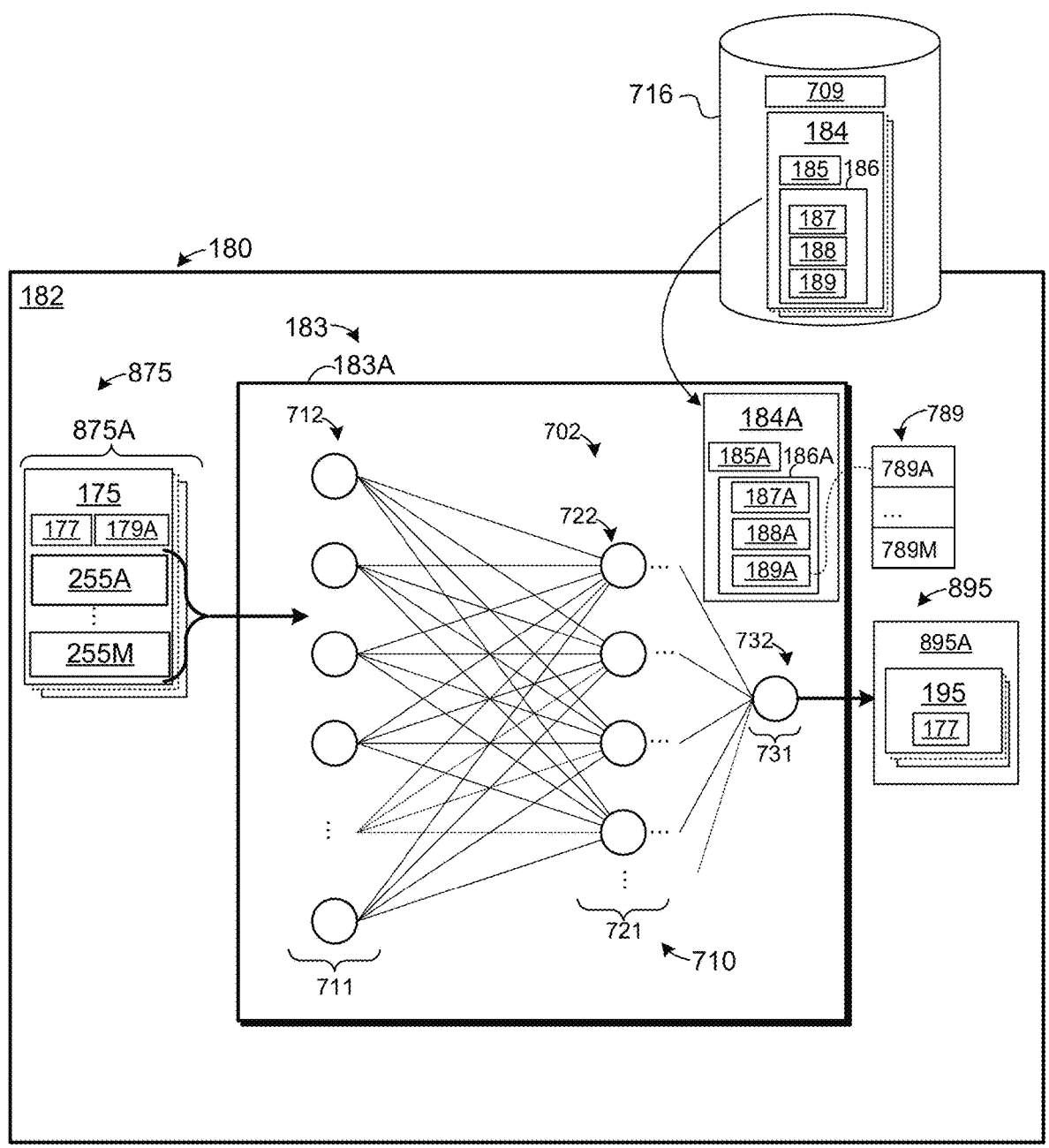
FIG. 9C is a schematic block diagram illustrating embodiments of systems and methods for modeling spatial yield characteristics, as disclosed herein.

FIG. 9C is a schematic block diagram illustrating embodiments of systems and methods for constructing PZCY models 895, as disclosed herein. In the FIG. 9C embodiment, the modeling engine 182 is configured to generate a PZCY model 895A for PZ 124A by use of the yield model 183A. Generating the PZCY model 895A may comprise instantiating the yield model 183A within processing, memory, and/or resources of a computing device (e.g., within a processor 112, memory 113, and/or non-transitory storage 116 of the computing device 111). The instantiating may comprise loading the corresponding PZCY model 895A from non-transitory storage 716, as disclosed herein. The instantiating may further comprise constructing an ANN, such as an MLP within memory 113 of the computing device 111, in accordance with the YM configuration 185A of the yield model 183A.

The PZCY model 895A for PZ 124A may be constructed by use of a PZCY model 895A, which may be produced by the feature construction module 170, as disclosed herein. The feature dataset 875A may comprise a plurality of feature vectors 175, each feature vector 175 having a respective FV spatial extent 177 covering a respective portion of PZ 124A. The feature vectors 175 of the RSD feature dataset 875 may be configured to cover, overlay, and/or otherwise encompass the spatial extent of PZ 124A, as disclosed herein. In the FIG. 9C embodiment, the feature vectors 175 of feature dataset 875A may correspond to a determined FV interval 179A, which may correspond to the temporal coverage 189A of the yield model 183A, as disclosed herein (e.g., each feature vector 175 may comprise M feature elements 255, each corresponding to one of M RSD acquisition times 159 defined by the temporal coverage 189A). The feature vectors 175 of feature dataset 875A may, therefore, be compatible with the yield model 183A, as disclosed herein.

Generating the PZCY model 895A may comprise processing each feature vector 175 of the feature dataset 875A by the yield model 183A to produce a plurality of yield estimates 195. The generating may further comprise collecting the yield estimates 195 produced for each feature vector 175 of the feature dataset 875A into the PZCY model 895A and/or associating each yield estimate 195 with geographical location, region, and/or area corresponding to the FV spatial extent 177 of respective feature vectors 175. The PZCY model 895A may, therefore, comprise a plurality of yield estimates 195, each yield estimate 195 covering a specified spatial extent within PZ 124A. The PZCY model 895A may, therefore, comprise a high-resolution model of spatial yield characteristics of the crop produced within a specified field during a specified timeframe (within a specified spatial extent 137 and/or production interval 138 of PZ 124A). Although not shown in FIG. 9C to avoid obscuring details of the illustrated embodiments, the modeling engine 182 may be further configured to generate: PZCY models 895 for PZ 124A corresponding to other yield models 183, PZCY models 895 for other PZ 124 corresponding to the yield model 183A, PZCY models 895 for other PZ 124 corresponding to other yield models 183, and/or the like.

Referring back to FIG. 1, in some embodiments, the yield modeling apparatus 110 may be configured to develop yield models 183 for same or similar crops having different temporal extents 189. The different temporal extents 189 may be adapted in accordance with any number of factors, including, but not limited to: costs associated with RS data 108, availability of RS data 108 (temporal coverage characteristics of RS data 108 covering respective geographical regions, areas, fields, subfield(s), and/or the like), computational efficiency, model capabilities, and so on.

As disclosed above, the yield model 183A illustrated in FIGS. 7A and 9C may define a temporal coverage 189A comprising M RSD acquisition times 159, each corresponding to a respective temporal location, offset, target region 212, and/or production stage 139 of the crop within a production interval 138 thereof. The YM module 180 may be configured to develop one or more related yield models 183 for the particular crop. As used herein, related yield models 183 refer to yield models 183 that are: a) configured to characterize spatial yield characteristics of related crops (e.g., same of similar crops), but b) have different temporal extents 189 (e.g., require feature vectors 175 to include different number(s) of RSD feature elements 255 and/or RSD feature elements 255 corresponding to different RSD acquisition times 159). In one non-limiting example, the YM module 180 may be configured to develop a yield model 183 that is related to the yield model 183A illustrated in FIG. 7A, but is capable of being used over geographical regions that are covered less frequently than other geographical regions (e.g., about half as frequently). The temporal coverage 189 of the related yield model 183 may require compatible feature vectors 175 to include M/2 RSD acquisition times 159, which may correspond to every other RSD acquisition time 159 of the temporal extent 159A of yield model 183A. Referring to FIG. 6B, constructing feature vectors 175 compatible with the related yield model 183 may comprise including M/2 feature elements 255 in each feature vector 175, each feature element 255 corresponding to one of M/2 RSD acquisition times of the temporal extent of the related yield model 183. Referring to FIG. 7A, the related yield model 183 may comprise an ML structure comprising M*R input nodes 712 (as opposed to 2*M*R input nodes 712 in the yield model 183A). The related yield model 183 may be trained by use of a training dataset 775 in which each feature vector 175 comprises M/2 RSD feature elements 255, in accordance with the M/2 RSD acquisition times 159 specified by the temporal coverage 189 of the related yield model 183. Similarly, producing a PZCY model 895 for a PZ 124 using the related yield model 183 may comprise: a) identifying target spatial elements 147 configured to span the spatial extent 137 of the PZ 124, b) determining M/2 target acquisition times 149 in accordance with the temporal coverage 189 of the related yield model 183, c) constructing feature vectors 175, each comprising M/2 RSD feature elements 255, and d) using the related yield model 183 to produce yield estimates 195 for each feature vector 175, as disclosed herein.

In some embodiments, the yield modeling apparatus 110 may be configured to develop yield models 183 to estimate spatial yield characteristics based on RS data 108 corresponding to selected portions of a production interval 138. The yield modeling apparatus 110 may be configured to develop partial yield models 183 capable of modeling spatial yield characteristics of a crop based on RS data 108 covering selected portion(s) of the production interval 138 of the crop (e.g., subsets of respective production intervals 138). The partial yield models 183 may be adapted for use in modeling spatial yield characteristics for PZ 124 that may not be covered by RS data 108 as frequently as other PZ 124 (e.g., may only be captured once every 2*N days whereas other areas are captured every N days). Alternatively, or in addition, the yield modeling apparatus 110 may be configured to develop partial yield models 183 capable of estimating yield forecasts based on RS data 108 covering designated sections or regions of the production interval 138. The yield modeling apparatus 110 may be configured to develop "forecast" yield models 183, which may be configured to estimate spatial yield characteristics based on RS data 108 covering only early portions of the production interval 138 (e.g., the first third or half of the production interval 138 covering only emergence and/or vegetative production stages 139 of the crop). A forecast yield model 183 may be used to estimate spatial yield characteristics of a field during the production interval 138 of the crop, prior to the harvest or end time 213 (produce forecast yield estimates 195). The forecast yield estimates 195 determined for a PZ 124 may be used to manage the PZ 124 during the remainder of the production interval 138 (e.g., perform VRT operations to increase yield, decrease costs, or the like). In some embodiments, forecast yield estimates 195 determined over a plurality of fields within a large production region may be used to develop yield forecasts for respective crops. The yield forecasts may comprise estimates of the quantities of the respective crops produced across the plurality of fields, which may be used to, inter alia, perform ILM operations within the production region, develop crop-specific market forecasts, determine appropriate crop storage decisions, and/or the like. A producer may determine whether to continue cultivation of a field based on the forecast yield estimates 195 determined by the yield modeling apparatus 110 (e.g., may discontinue cultivation if the forecast yield estimates 195 are below one or more yield thresholds, which may correspond to costs and/or impacts of continued cultivation relative to corresponding crop-specific market forecasts).

Figure 10A:
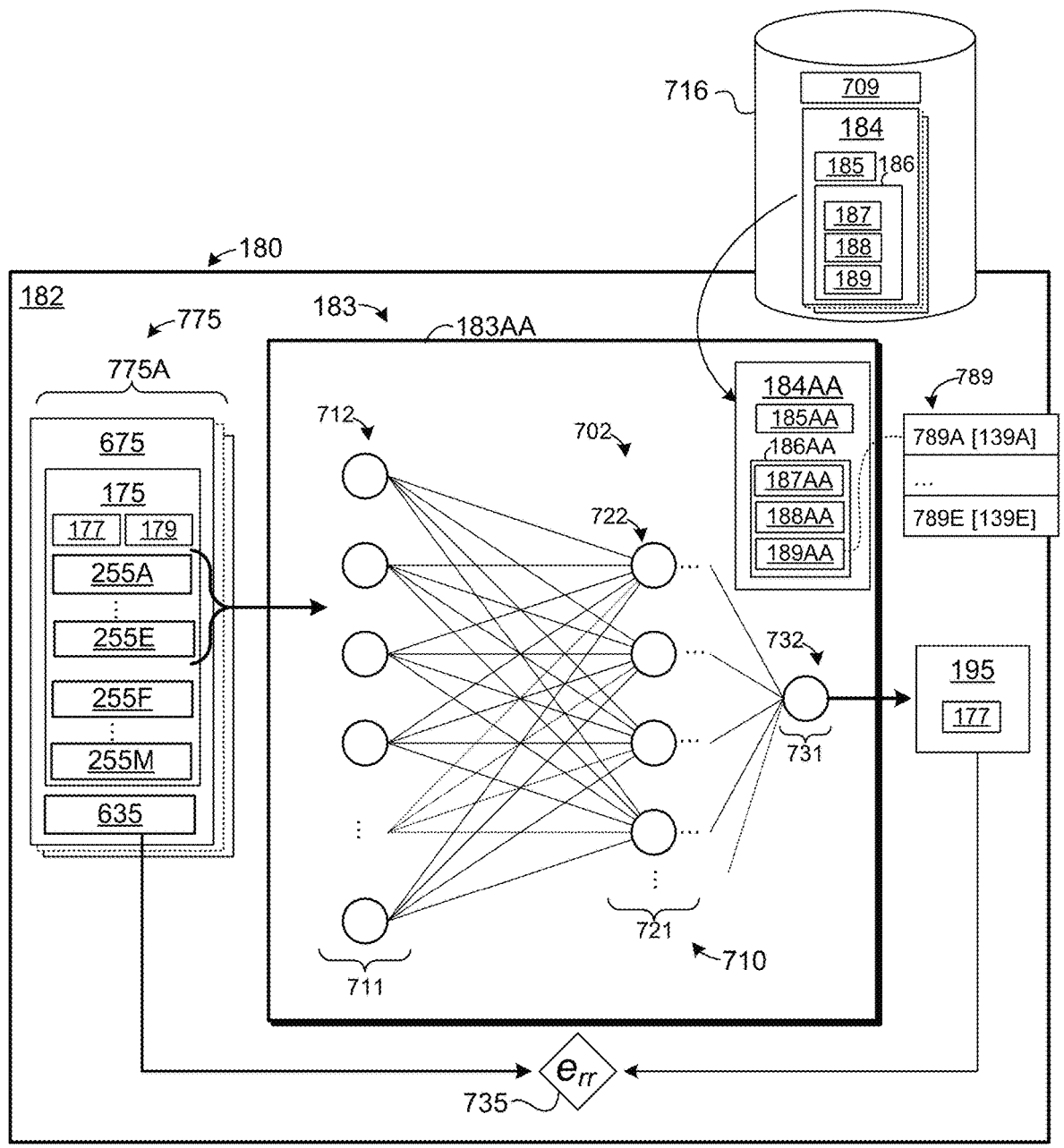
FIG. 10A is a schematic block diagram illustrating further embodiments of systems and methods for developing crop yield models, as disclosed herein.

FIG. 10A is a schematic block diagram illustrating systems and methods for developing a partial yield model 183, as disclosed herein. In the FIG. 10A embodiment, the modeling engine 182 may be configured to develop a forecast yield model 183AA, which may be configured to model spatial yield characteristics of a same crop as the yield model 183A as illustrated in FIG. 7A. The forecast yield model 183AA may, however, define a temporal coverage 189AA different from the temporal coverage 189A of the yield model 183A. The temporal coverage 189AA of the forecast yield model 183AA may define a fewer number of RSD acquisition times 159, which may be defined to fall within early portions of production interval(s) 138 of the crop. In the FIG. 10A embodiment, the temporal coverage 189AA of the forecast yield model 183AA may comprise E RSD acquisition times 159A-E (where E is less than M). The RSD acquisition times 159A-E may be defined to correspond to early production stages 139A-E of the crop (e.g., vegetative stages 139, such as V1-VE, and/or the like). The temporal coverage 189AA may, therefore, correspond to an early portion in production interval(s) 138 of the crop (e.g., a first third, half, two-thirds, or the like).

The yield model 183AA may be adapted in accordance with the temporal coverage 189AA thereof. The yield model 183AA may comprise 2*E*R input nodes 712 (fewer than then 2*M*R input nodes 712 of the yield model 183A). Since the yield model 183AA is configured to model spatial yield characteristics of the same crop as the yield model 183A, in some embodiments, the yield model 183AA may be trained using a same or similar training dataset 775A as model 183A (e.g., yield quantities 635 derived from same yield datasets 134 and feature vectors 175 configured to cover same FV spatial extents 177). The modeling engine 182 may be configured to adapt training feature vectors 175 for use with the yield model 183AA, which may comprise omitting selected portions of the feature vectors 175 of the training dataset 775A. As illustrated in FIG. 10A, the modeling engine 182 may train the yield model 183AA by use of training feature vectors 175 comprising E RSD feature elements 255 (e.g., RSD feature elements 255A-E), which may comprise using feature elements 255A-E and ignoring and/or omitting other feature elements 255 (e.g., feature elements 255F-M). Alternatively, the modeling engine 182 may be configured to train the yield model 183AA using training feature vectors 175 constructed to correspond to the temporal coverage 189AA thereof, as disclosed herein.

The yield model 183AA may be trained as disclosed herein. Training the yield model 183AA may comprise implementing a plurality of training iterations, each comprising using the yield model 183AA to produce a yield estimate 195 in response to a selected training feature vector 175, determining error metrics 735 (by comparing the yield estimate 195 to the yield quantity 635 associated with the selected training feature vector 175), and tuning the ML configuration 184AA of the yield model 183AA in accordance with the error metrics 735 (e.g., to reduce and/or minimize the error metrics). The training may comprise implementing one or more training epochs, one or more k-fold cross validation training procedures, one or more dropout training procedures, and/or the like.

Figure 10B:
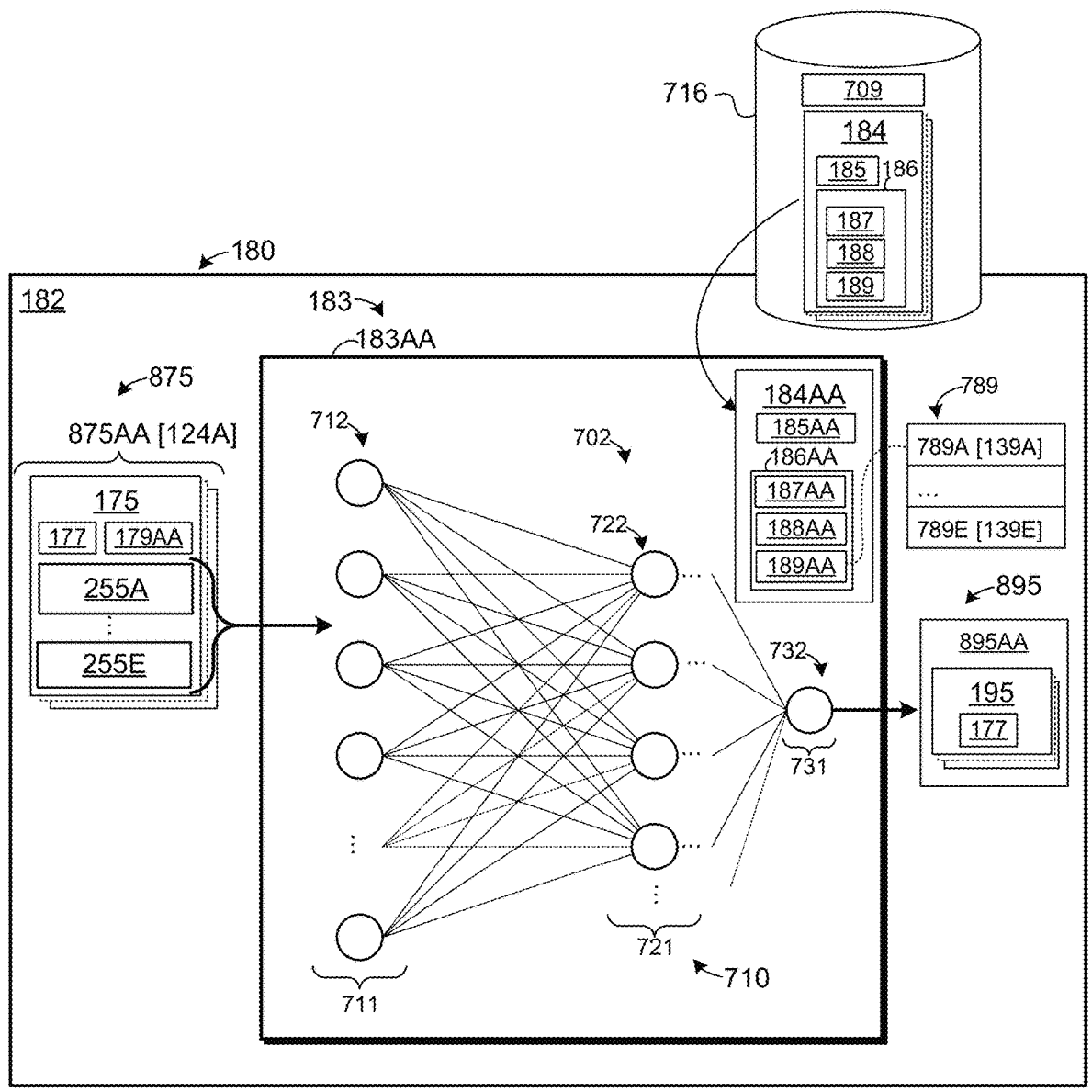
FIG. 10B is a schematic block diagram illustrating further embodiments of systems and methods for modeling spatial yield characteristics, as disclosed herein.

FIG. 10B is a schematic block diagram of further embodiments of systems and methods for modeling spatial yield characteristics, as disclosed herein. The modeling engine 182 may be configured to compute a PZCY model 895AA corresponding to PZ 124A. In the FIG. 10B embodiment, the production interval 138 of PZ 124A may be incomplete (e.g., the crop thereof may not have been harvested and, as such, may not include an end time 213). PZCY model 895AA may be determined at a time within the production interval 138 of PZ 124A (e.g., at about one-third to two-thirds through the production interval 138). In response to a request to produce the PZCY model 895AA (e.g., PZ data 121 pertaining to PZ 124A), the yield modeling apparatus 110 may be configured to: a) select a yield model 183 corresponding to PZ 124A, b) acquire RS data 108 corresponding to PZ 124A (and the identified yield model 183), c) construct feature vectors 175 comprising the acquired RS data 108, and d) leverage the selected yield model 183 to produce the PZCY model 895AA. The yield model 183AA may be selected by matching the crop of the PZ 124A to crop coverages 187 of the YM datasets 184. The matching may comprise identifying yield model 183A and yield model 183AA (since both correspond to same and/or similar crops). The selection may further comprise comparing the production intervals 138 of PZ 124 to temporal extents 189 of the yield models 183. In the FIG. 10B embodiment, comparison of the production interval 138 of PZ 124A may comprise selecting forecast yield model 183AA (and excluding yield model 183A) in response to determining that the production interval 138 covers the temporal coverage 189AA of the forecast yield model 183AA (and fails to cover the temporal coverage 189A of yield model 183A, e.g., does not include temporal regions corresponding to RSD acquisition times 159 later in the production interval 138). The RS data 108 corresponding to PZ 124A may be acquired as disclosed herein. The spatial profiler 142 may be configured to identify a plurality of target spatial elements 147 for PZ 124A (e.g., target spatial elements 147A-N as illustrated in FIG. 9A). The interval profiler 144 may be configured to identify a plurality of target acquisition times 149, which may comprise a subset of the target acquisition times 149 determined for PZ 124A in the FIG. 9A embodiment. The target acquisition times 149 may comprise a subset of M target acquisition times 149A-M. The target acquisition times 149 may comprise M-X target acquisition times, where X is between 0 and M−1. The target acquisition times 149 may be determined in accordance with the temporal coverage 189AA of the forecast yield model 183AA (e.g., may comprise target acquisition times 149A-E, which may correspond to early production stages 139A-E of the crop, as disclosed herein). The feature construction module 170 may be configured to generate a feature dataset 875AA comprising feature vectors 175 compatible with the forecast yield model 183AA; the FV interval 179AA of each feature vector 175 may comprise E feature elements 255, each corresponding to one of E RSD acquisition times 159. The PZCY model 895AA may be constructed from yield estimates 195 produced in response to respective feature vectors 175 of the feature dataset 875AA, each yield estimate 195 associated with a respective subfield location within PZ 124A (e.g., a respective FV spatial extent 177 of the corresponding feature vector 175). The PZCY model 895AA may, therefore, comprise projected crop yields within respective subfield locations within PZ 124A that will be obtained at the end of the production interval 138 thereof. The PZCY model 895AA may be used to adapt cultivation of respective subfield locations during the remainder of the production interval 138 (e.g., using VRT techniques). Alternatively, or in addition, the yield projections may be used to determine whether to continue cultivation and/or continue cultivation of particular subfield locations.

Referring to FIG. 1, in some embodiments, the yield modeling apparatus 110 may further comprise a management module 190. The management module 190 may be configured to determine management instructions 199 pertaining to respective production regions, fields, and/or subfield locations. The management instructions 199 may be based on, inter alia, the yield models 183 developed by the yield modeling apparatus 110, data used to develop the yield models 183, yield estimates 195 produced by the yield models 183, and/or the like. In some embodiments, the management module 190 may be configured to determine utility metrics 197 pertaining to crop production. As used herein, "utility metrics" 197 may refer to any suitable means for quantifying the utility crop production at specified times and/or locations. The utility metrics 197 determined by the management module 190 may include, but are not limited to: value metrics configured to quantify a value of specified crops produced at respective subfield locations (e.g., FV spatial extents 177) over specified production intervals 138, cost metrics configured to quantify costs associated with production of the specified crops, efficiency metrics configured to quantify crop production efficiency (e.g., ratios of value metrics to corresponding cost metrics), and/or the like. The management module 190 may be configured to determine utility datasets 897 for respective yield datasets 134, respective PZ 124, and/or the like. A utility dataset 897 determined for a yield dataset 134 (or PZ 124) may comprise a plurality of utility metrics 197, each utility metric 197 quantifying a utility of production of a specified crop within designated subfield location(s) within the spatial extent 137 thereof (e.g., respective FV spatial extent 177, as disclosed herein). A utility dataset 897 may further comprise field utility metrics 898, which may be configured to quantify a utility of crop production within the field as a whole. The field utility metrics 898 may be derived from the utility metrics 197 of the utility dataset 897. The field utility metrics 898 may comprise one or more of an average, mean, distribution, aggregation, and/or other combination of the utility metrics 197.

The utility metrics 197 determined by the management module 190 may comprise value metrics, which may comprise any suitable means for quantifying a value for production of specified crops within designated FV spatial extents 177 over determined production intervals 138, including, but not limited to: an economic value, an energy value, a carbon value, a conservation value, and/or the like. The utility metrics 197 may further comprise cost metrics, which may comprise any suitable means for quantifying costs associated with production of specified crops within designated FV spatial extents 177 over determined production intervals 138, including, but not limited to: an economic cost, an energy cost, a carbon cost, a conservation cost, and/or the like. The utility metrics 197 may further comprise efficiency metrics, which may include, but are not limited to: an economic efficiency (e.g., a ratio of economic value to economic cost), an energy efficiency, a carbon efficiency, a conservation efficiency, an aggregate utility (a combination of a plurality of efficiency metrics), and/or the like. The management module 190 may determine utility metrics 197 for production of a specified crop within a designated FV spatial extent 177 based on, inter alia, a determined yield value. The yield value may quantify an amount of the specified crop produced within the FV spatial extent 177 during the production interval 138. The yield value for an FV spatial extent 177 of a yield dataset 134 may comprise a yield quantity 635 determined for the FV spatial extent 177, as disclosed herein. Alternatively, or in addition, the yield value for an FV spatial extent 177 may comprise a yield estimate 195 determined by a suitable yield model 183, as disclosed herein (e.g., a yield estimate 195 produced by the yield model 183 in response to a feature vector 175 derived from RS data 108 configured to capture the FV spatial extent 177 at each of a plurality of RSD acquisition times 159 during the production interval 138 of the specified crop).

The management module 190 may be further configured to determine utility metrics 197 based on production metadata 345 pertaining to specified crops. The production metadata 345 may indicate, inter alia, values of specified crops, such as economic values, carbon values (e.g., carbon sequestered by respective crops), conservation values for production of respective crops (e.g., a conservation value of production of respective crops within respective production regions), and so on. The production metadata 345 may further comprise information pertaining to costs associated with production of respective crops, such as economic costs for production of respective crops (e.g., cost of production inputs for respective crops, such as land costs, seed costs, fertilization requirements and/or costs, irrigation requirements and/or costs, and so on), energy costs of respective crops (e.g., energy expended to produce respective crops), carbon costs of respective crops (e.g., carbon emitted during production of respective crops), conservation costs for production of respective crops (e.g., environmental impacts), and so on. In some embodiments, the management module 190 is further configured to determine and/or adjust utility metrics 197 based on, inter alia, production intervals 138 in which respective crops were produced (e.g., a yield time of the respective subfield locations). As used herein, the "yield time" of a crop or other production output (e.g., a yield measurement 135, yield quantity 635, and/or yield estimate 195) refers to time(s) at which the output was produced, harvested, and/or otherwise capable of being utilized (e.g., the end time 213 of the corresponding production interval 138 and/or a determined time period thereafter). The value metrics for a particular crop produced during a specified production interval 138 may be based on, inter alia, economic, energy, carbon, and/or conservation values of the particular crop at a determined yield time (e.g., a yield time determined in accordance with the specified production interval 138 and/or characteristics of the particular crop). The corresponding cost metrics may be based on, inter alia, economic, energy, carbon, and/or conservation costs for production of the particular crop during the specified production interval 138 (e.g., economic costs of production inputs required to produce the crop during the growing season).

As disclosed above, the management module 190 may be configured to determine utility datasets 897 for respective yield datasets 134, which may comprise determining utility metrics 197 for respective subfield locations within the spatial extent 137 of the yield dataset 134 (e.g., respective FV spatial extents 177). The management module 190 may be configured to determine utility metrics 197 for a set of FV spatial extents 177, each FV spatial extent 177 of the set covering a respective portion of the spatial extent 137 of the yield dataset 134. The set of FV spatial extents 177 may correspond to training vectors 675 of a training dataset 775 derived from the yield dataset 134 (and corresponding RS data 108), as disclosed herein. The FV spatial extents 177 may comprise FV spatial extents of feature vectors 175 of a first set of feature vectors 175 constructed to cover the yield dataset 134, as disclosed herein. The value metrics determined for respective subfield locations of the yield dataset 134 may be based on, inter alia, yield values 135 determined for the respective subfield locations. The yield values 135 may be derived from yield measurements of the yield dataset 134 (e.g., may comprise yield quantities 635 comprising actual, captured yield data 104 for the respective subfield locations). Alternatively, or in addition, the yield values for respective FV spatial extents 177 may comprise yield estimates 195 determined by a suitable yield model 183 (e.g., yield estimates 195 produced by the yield model 183 in response to a feature vector 175 corresponding to the FV spatial extent 177). The value metrics may be based on determined values of the specified crop (e.g., may be based on production metadata 345 pertaining to the specified crop). The management module 190 may be further configured to determine and/or adjust the values metrics in accordance with the production interval 138 of the yield dataset 134 (and/or corresponding yield time), as disclosed herein. The cost metrics determined for respective subfield locations may be determined and/or adjusted based on production metadata 345 pertaining to the specified crop, the production interval 138, and/or determined yield time, as disclosed herein. Efficiency metrics for respective FV spatial extents 177 may comprise ratios and/or other comparisons between respective value metrics and corresponding cost metrics. The utility dataset 897 determined for the yield dataset 134 may, therefore, comprise a plurality of utility metrics 197, each configured to quantity a utility for production within a respective FV spatial extent 177 within the spatial extent 137 of the yield dataset 134 (respective subfield locations) over the determined production interval 138 of the yield dataset 134. In some embodiments, the management module 190 may be further configured to determine field utility metrics 898, which may be configured to quantity the utility for production of specified crops within specified spatial extents 137 (fields) over determined production intervals 138. The field utility metric 898 for a field may be derived from utility metrics 197 determined for respective subfield locations within the field (e.g., may comprise an aggregation, average, and/or combination of the subfield utility metrics 197).

Referring to FIG. 8, the management module 190 may be further configured to determine utility datasets 897 for respective PZ 124. The utility dataset 897 for a PZ 124 may be determined in response to generating a PZCY model 895 for the PZ 124, as disclosed herein. Determining a utility dataset 897 for a PZ 124 may comprise determining a plurality of utility metrics 197, each configured to quantify a utility for production of a specified crop within a respective subfield location of the PZ 124 during the production interval 138 of the PZ 124. The utility metrics 197 may cover respective FV spatial extents 177 of the PZ 124, as disclosed herein. Value metrics determined for respective FV spatial extents 177 of the PZ 124 may be based on, inter alia, yield estimates 195 determined for the respective FV spatial extents 177 (e.g., yield estimates 195 of the PZCY model 895 determined for the PZ 124). The management module 190 may be configured to determine and/or adjust the value metrics (and/or corresponding cost metrics) in accordance with the yield estimates 195 determined for the respective FV spatial extents 177 of the PZ 124, production metadata 345 pertaining to the specified crop, the production interval 138 of the PZ 124 (and/or corresponding yield time), and so on, as disclosed herein.

The management module 190 may be further configured to determine management instructions 199 pertaining to respective fields, subfield locations, production regions, and/or the like. The management instructions 199 may pertain to crop production within specified fields and/or at respective subfield locations within the specified fields. The management instructions 199 may comprise and/or specify one or more VRT operations, ILM operations, and/or the like. An VRT operation may be configured to, inter alia, vary the application of production inputs within a specified field and/or at designated subfield locations therein. An ILM operation may be configured to, inter alia, control crop production within one or more fields (e.g., specify crops to produce within one or more fields). Producers may utilize management instructions 199 determined in response to a current production interval 138 (and/or one or more previous production intervals 138) to control crop production during one or more subsequent production intervals 138 (e.g., subsequent seasons). In some embodiments, the management instructions 199 may comprise machine-readable instructions configured for execution by processing resources of machines involved in crop production (e.g., combines, seeding machines, fertilization systems, irrigation systems, harvesters, and/or the like). In some embodiments, the yield modeling apparatus 110 is configured to transmit management instructions 199 to one or more producers the electronic communication network 101.

The management module 190 may be configured to determine management instructions 199 for a particular field based on, inter alia, utility metrics 197 pertaining to crop production within the field. The management module 190 may be configured to determine management instructions 199 pertaining to a measured field (e.g., a field associated with an imported yield dataset 134), an unmeasured field (e.g., a PZ 124), and/or the like. The management module 190 may determine management instructions 199 in accordance with utility metrics 197 determined for the field (e.g., in response to determining a utility dataset 897 for the field). As disclosed herein, determining a utility dataset 897 for a field may comprise determining a plurality of utility metrics 197, each configured to quantify a utility for production of a specified crop within a respective FV spatial extent 177 within the field over a determined production interval 138. The utility metrics 197 determined for a yield dataset 134 may be based on, inter alia, yield values 135 of the yield dataset 134 and/or yield estimates 195 produced by a suitable yield model 183, as disclosed herein. The utility metrics 197 determined for a PZ 124 may be based on, inter alia, yield estimates 195 determined for respective FV spatial extents 177 of the PZ 124 (e.g., may be determined in response to generating a PZCY model 895 for the PZ 124, as disclosed herein).

In some embodiments, determining VRT operations for a field may comprise identifying subfield locations having low utility metrics 197 relative to other subfield locations. The identifying may comprise classifying respective subfield locations (e.g., classifying respective FV spatial extents 177 within the field). The classifying may comprise assigning each FV spatial extent 177 respective utility metrics 197, as disclosed herein. The classifying may further comprise determining a distribution of the utility metrics 197, and identifying FV spatial extents 177 having utility metrics 197 in respective portions or sections of the distribution (e.g., identifying FV spatial extents 177 having utility metrics 197 lower than an average or mean by more than a threshold). The distribution may comprise a statistical distribution, such as a Gaussian distribution, and the classifying may comprise identifying FV spatial extents 177 having utility metrics 197 that are lower than a mean of the distribution may more than X times the standard deviation. Determining the VRT operations for the field may comprise configuring VRT operations to, inter alia, increase utility metrics 197 of the identified FV spatial extents 177. The determined VRT operations may be configured to modify the application of production inputs within respective FV spatial extents 177, which may include, but are not limited to operations configured to: modify seeding, modify nutrient inputs (e.g., modifying fertilization), modify pest control operations (e.g., modifying application of pest controls), modify irrigation, and/or the like. The modifying may be configured to increase the utility metrics 197 of the respective FV spatial extents 177 by one or more of: increasing value metrics of the FV spatial extents 177 (e.g., increasing one or more production inputs applied within the respective FV spatial extents 177, resulting in increased yield being produced therein), decreasing cost metrics for crop production within respective FV spatial extents 177 (e.g., decreasing application of one or more production inputs within the respective FV spatial extents 177, resulting in decreased production costs), and/or the like. In some embodiments, a VRT operation may be configured to exclude one or more FV spatial extents 177 from crop production, which may comprise blocking application of production inputs within the excluded FV spatial extents 177. The management module 190 may identify FV spatial extents 177 for exclusion in response to determining that utility metrics 197 thereof are below one or more exclusion thresholds.

In some embodiments, the VRT operations determined by the management module 190 may be embodied as VRT instructions, which may specify VRT operations pertaining to respective FV spatial extents 177 within the field, as disclosed herein. The VRT instructions may specify application rates for specified production inputs within respective FV spatial extents 177 of the field. The VRT instructions may, therefore, be used to modify the application of the specified production inputs within different subfield locations. The VRT instructions may be configured to increase a rate at which a particular production input is applied within first FV spatial extents 177, decrease the rate at which the particular production input is applied within second FV spatial extents 177, and/or exclude third spatial extents 177 from application of the particular production input. The disclosed VRT instructions may be embodied as management instructions 199, which may comprise machine-readable instructions configured for execution by processing resources of machines involved in crop production. A producer may utilize the disclosed VRT instructions to control the application of production inputs within respective FV spatial extents 177 of the field during one or more subsequent production intervals 138 (e.g., in subsequent seasons).

In some embodiments, the management module 190 may be configured to determine VRT operations pertaining to production of a specified crop within a designated field during a current or ongoing production interval 138. The management module 190 may be configured to produce a PZCY model 895 for the designated field by use of a forecast yield model 183, which may be configured to produce yield estimates 195 based on RS data 108 covering early portions of crop production intervals 138, as disclosed herein (e.g., first third or half of the production interval 138). The management module 190 may generate a "forecast" PZCY model 895 for the designated field by use of the forecast yield model 183 and feature vectors 175 covering the specified subset of the current production interval 138. As used herein, a "forecast" PZCY model 895 refers to a PZCY model 895 that comprises forecast yield estimates 195 generated by use of a forecast yield model 183 and feature vectors 175 covering only an initial section of the crop production interval 138. The management module 190 may be further configured to produce a utility dataset 897 in response to generating the forecast PZCY model 895 (a "forecast" utility dataset 897). The forecast utility dataset 897 may comprise utility metrics 197 configured to forecast a utility of production of the specified crop within respective FV spatial extents 177 based on, inter alia, the yield estimates 195 produced by the forecast yield model 183. The management module 190 may determine VRT operations in accordance with the determined utility metrics 197, which may comprise VRT operations configured to modify the application of specified production inputs within respective FV spatial extents 177 of the field, as disclosed herein. An operator may implement the VRT operations during the remainder of the current production interval 138 (as opposed to waiting to implement the VRT operations in a next production interval 138). In some embodiments, implementing the VRT operations may comprise excluding one or more subfield locations from production inputs.

In some embodiments, the management module 190 may be further configured to determine ILM operations based on utility datasets 897 determined for a plurality of different fields. The ILM operations may pertain to crop production within respective production regions (e.g., regions having same or similar environmental, climate, and/or other production characteristics). The management module 190 may be configured to determine utility datasets 897 for a production region, which may comprise: a) importing a limited number of yield datasets 134 pertaining to production of respective crops of a plurality of crops produced within the production region; b) developing a plurality of yield models 183 in response to the importing, the yield models 183 pertaining to specified crops of the plurality of crops; c) generating PZCY models 895 for respective PZ 124 within the production region by use of the yield models 183; and d) determining utility datasets 897 pertaining to crop production of specified crops within the production region. The utility datasets 897 may include first utility datasets 897 determined for measured fields within the production region (e.g., fields corresponding to the imported yield datasets 134) and second utility datasets 897 determined for unmeasured fields within the production region (e.g., respective PZ 124).

The management module 190 may be further configured to implement VRT operations pertaining to respective fields based on, inter alia, utility metrics 197 of the utility datasets 897 determined for the respective fields, as disclosed herein. The management module 190 may be configured to implement ILM operations based on, inter alia, field utility metrics 898 determined for respective fields of a plurality of fields within a production region. The ILM operations may comprise operations configured to modify crops produced within the respective fields. The management module 190 may identify fields for ILM operations in response to determining that field utility metrics 898 determined for the identified fields fail to satisfy one or more utility thresholds (e.g., in response to determining one or more of an economic efficiency, energy efficiency, carbon efficiency, conservation utility, and/or aggregate utility determined for the field fails to satisfy a corresponding threshold). In some embodiments the utility thresholds may be based on, inter alia, field utility metrics 898 of other fields within the production region (e.g., average, mean, or standard deviation of field utility metrics 898 determined for other fields). The ILM operation may comprise designating a second crop to replace a first crop produced within a specified field. The second crop may be selected to, inter alia, improve field utility metrics 898 for the specified field. The second crop may be selected from crops having a higher value than the first crop, lower production cost than the first crop, lower production requirements than the first crop, lower energy requirements, lower carbon output, lower conservation impact, and/or the like. In one embodiment, implementing an ILM operation pertaining to a field having a low economic utility metric may comprise selecting a second crop for production therein, the second crop configured to have lower economic cost metrics than the first crop currently being produced within the field (e.g., a biomass or perennial crop as opposed to a more resource intensive food crop). In another embodiment, implementing an ILM operation pertaining to a field having low energy or carbon utility metrics may comprise selecting a crop having lower energy and/or carbon costs (and/or higher energy and/or carbon values). In yet another embodiment, implementing an ILM operation pertaining to a field having low aggregate utility metrics may comprise designating the field for conservation (not producing any crop within the field).

In some embodiments, the management module 190 is further configured to determine an optimal production scheme for a production region. The optimal production scheme may be configured to result in optimal field utility metrics 898 across a plurality of fields within the production region. The management module 190 may be configured to formulate an optimization model for the production region, the optimization model comprising: a) a production objective function configured to quantify cost metrics for production of specified crops within respective fields of the production region, and b) production constraints specifying target yield amounts for the specified crops to be produced within the production region as a whole. Determining the optimal production scheme may comprise identifying a solution to the production objective function that: a) satisfies the crop production constraints at b) minimal cost metrics across the plurality of fields. The management module 190 may be configured to develop field production functions (f), which may be configured to estimate cost metrics (Z) for production of specified crop yield amounts ($y_c$) within respective fields, as follows: $Z_i = f_i(y_c)$, where $f_i$ is the field production function determined for the ith field of L fields within the production region, $Z_i$ represents the cost metrics for producing a specified yield amount of a specified crop within the ith field ($y_{c\_i}$). The field production functions for respective fields ($f_i$) may be based on, inter alia, field utility metrics 898 determined for the respective fields (e.g., efficiency metrics, as disclosed herein). Determining the optimal production scheme may comprise determining crops to produce within each field (at determined yield amounts), such that the yield amounts ($y_c$) for respective crops produced across the L fields satisfy production constraints specified for the respective crops (Pc) at minimal cost, as follows $$\min_z \{ Z = \sum_{i=1}^{L} f_i(y_{c\_i}) \},$$

where $P_c \leq \sum_{i=1}^{L} y_{c\_i}$ for each crop constraint

The optimal production scheme may be determined by use of a suitable optimization algorithm, such as a deterministic optimization algorithm, a stochastic optimization algorithm, a heuristic optimization algorithm, a gradient descent algorithm, a genetic algorithm, and/or the like. Alternatively, or in addition, determining an optimal production scheme may comprise assigning crops associated with higher cost metrics to fields having higher utility and/or efficiency metrics (per utility datasets 897 determined for the respective fields). The determining may further comprise assigning crops associated with lower cost metrics to fields having lower utility and/or efficiency metrics. The optimal production scheme determined by the management module 190 (and/or other ILM operations disclosed herein) may be embodied as management instructions 199, which may be communicated to producers via the network 101. The producers may implement ILM operations in accordance with the management instructions 199 during one or more subsequent production intervals 138, which may comprise modifying crops produced within specified fields (and/or implementing VRT operations within the specified fields), as disclosed herein.

In some embodiments, the management module 190 may be further configured to determine crop yield forecasts across a production region. Determining the crop yield forecasts may comprise developing forecast yield models 183 for respective crops produced within the production region, as disclosed herein (e.g., yield models 183 covering early portions of crop production intervals 138). The determining may further comprise using the forecast yield models 183 to determine forecast PZCY models 895 for fields producing the respective crops during a current production interval 138. The management module 190 may use the forecast PZCY models 895 determined for fields being used to produce specified crops to develop yield forecasts for the specified crops. The yield forecast for a specified crop may comprise an estimate of a total yield of the specified crop to be produced during the current production interval 138 (the yield to be produced across a plurality of fields within the production region). The management module 190 may communicate crop-specified yield forecasts to producers via the network 101 (as management instructions 199). In some embodiments, the management module 190 may implement ILM operations based on the yield forecasts. The management module 190 generate management instructions 199 configured to cease production within a designated field in response to determining that a yield forecast for the specified crop being produced therein exceeds a threshold. The designated field may be selected in accordance with field utility metrics 898 determined for the fields (e.g., in response to determining the forecast PZCY models 895 for the fields, as disclosed herein). In another embodiment, the management module 190 may be configured to generate management instructions 199 configured to increase production within designated fields (at increased cost) in response to determining that a yield forecast for the specified crop being produced within the designated fields is lower than a yield threshold. The management module 190 may be further configured to determine yield forecasts at and/or near an end of the production interval 138. The management module 190 may use the yield forecasts to determine management instructions 199 pertaining to utilization of respective crop yields (e.g., whether to delay utilization of specified crop yields, store specified crop yields, sell specified crop yields, and/or the like).

Figure 11:
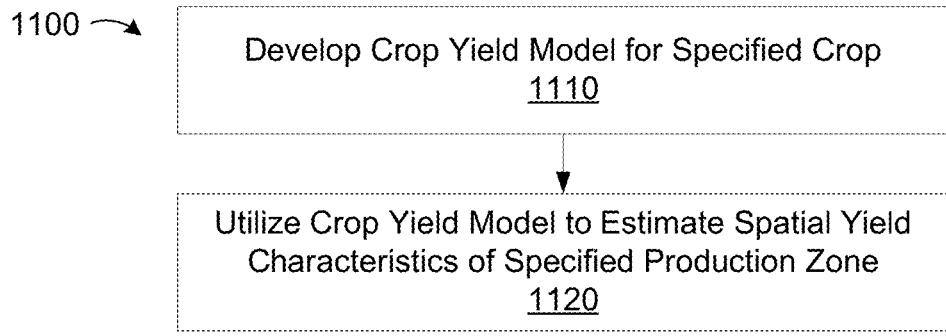
FIG. 11 is a flow diagram of one embodiment of a method for crop yield modeling, as disclosed herein.

FIG. 11 is a flow diagram illustrating embodiments of a method 1100 for crop yield modeling, as disclosed herein. The steps and/or operations of method 1100 and/or the other methods disclosed herein may be embodied and/or implemented by any suitable means including, but not limited to: embodiments of the yield modeling apparatus 110, as disclosed herein; hardware components, such as a computing device (e.g., computing device 111), a processor (e.g., processor 112), computing resources (e.g., processor 112, memory 113, communication interface 114, HMI components 115, non-transitory storage 116, and/or the like), computer-readable code, executable code, one or more libraries, computer-readable instructions stored on a non-transitory storage medium (e.g., non-transitory storage 116) configured to cause a computing device (e.g., computing device 111) and/or processor (e.g., processor 112) to implement functionality pertaining to crop yield modeling, as disclosed herein, and/or the like. The methods disclosed herein, may, therefore comprise computer-implemented methods. The disclosed methods may be embodied by computer-readable instructions stored within non-transitory storage.

Step 1110 may comprise developing a yield model 183 for a specified crop, as disclosed herein. Developing the yield model 183 may comprise acquiring ML training data comprising RS data 108 captured during production of the specified crop; and configuring the yield model 183 to produce accurate yield estimates 195 for the specified crop. Step 1110 may comprise: a) initializing the yield model 183; b) importing crop yield datasets 134 for use in training and/or validating the yield model 183; c) importing RS data 108 corresponding to the crop yield datasets 134 (e.g., importing first RSD elements 155); d) constructing a training dataset 775 from the crop yield datasets 134 and/or imported RS data 108; and e) developing the yield model 183 by use of the training dataset 775 (e.g., instantiating, training, refining, validating, and/or otherwise managing the yield model 183 and/or corresponding YM dataset 184).

Initializing the yield model 183 at step 1110 may comprise, inter alia, determining a YM configuration 185 for the yield model 183, designing a YM coverage 186 for the yield model 183, and/or the like. The YM configuration 185 of the yield model 183 may be determined in accordance with one or more modeling schemes (e.g., YM schemes 709), as disclosed herein. Designing the YM coverage 186 of the yield model 183 may comprise defining one or more of a crop coverage 187, an RS coverage 188, and/or a temporal coverage 189 of the yield model 183. The crop coverage 187 of a yield model 183 may comprise specifying the crop(s) and/or production regions modeled thereby. The RS coverage 188 may specify characteristics of RS data 108 suitable for use with the yield model 183. The RS coverage 188 of the yield model 183 may specify a set of EM wavelengths and/or bands to cover in imported RS data 108, which may comprise EM wavelengths and/or bands selected to distinguish respective attributes and/or characteristics of the specified crop, as disclosed herein. The temporal coverage 189 of the yield model 183 may specify acquisition times for imported RS data 108 (and/or FV intervals 179 of compatible feature vectors 175, as disclosed herein). The temporal coverage 189 may indicate a number of RSD acquisition times 159 covered by the yield model 183 (and/or temporal locations, offsets, target regions 212, and/or crop production stages 139 corresponding to each RSD acquisition time 159). The temporal coverage 189 may be determined in accordance with any suitable factor including, but not limited to: availability of suitable RS data 108, characteristics of the specified crop (e.g., temporal characteristics of production of the specified crop, such as times at which the specified crop is predicted to exhibit particular, detectable characteristics); desired capabilities of the yield model 183 (e.g., enable the yield model 183 to predict spatial yield characteristics during production); and/or the like. As disclosed above, the temporal coverage 189 may be determined in accordance with one or more factors including, but not limited to: availability of suitable captured yield data 104; availability of suitable RS data 108 (e.g., spatial and/or temporal coverage characteristics of RS data 108 acquired by one or more RSDA platforms 106, as indicated by coverage scheme(s) 109 thereof, as disclosed herein); availability of suitable RS data 108 covering particular locations (e.g., availability of suitable RS data 108 covering spatial extents 137 of yield datasets 134, spatial extents 137 of one or more PZ 124 to be modeled by the yield model 183, and/or the like); characteristics of the specified crop (e.g., characteristics of production intervals 138 for the specified crop, which may indicate temporal locations, offsets, and/or target regions 212 at which the specified crop is predicted to exhibit particular, detectable characteristics); desired capabilities of the yield model 183 (e.g., enable the yield model 183 to predict spatial yield characteristics during production of the specified crop); and/or the like. Determining the temporal coverage 189 of the yield model 183 may determine, inter alia, a structure of ML components comprising the yield model 183. In some embodiments, the temporal coverage 189 may determine the number of input nodes 712 included in an input layer 711 of the yield model 183, each input node 712 configured to receive a component of a respective feature vector 175 (e.g., receive an RSD feature component 253 and/or RSD spatial lag component 263 of an feature element 255 of the feature vector 175).

Step 1110 may comprise importing crop yield datasets 134 for use in training yield model 183 (e.g., by a YDIM 130, as disclosed herein). Importing the crop yield datasets 134 may comprise importing captured yield data 104 pertaining to the specified crop (in accordance with the crop coverage 187 of the yield model 183). Step 1110 may further comprise importing a plurality of related crop yield datasets 134, each related crop yield dataset 134 comprising yield values 135 of the specified crop. Importing the crop yield datasets 134 may comprise acquiring captured yield data 104 pertaining to production of the specified crop within designated spatial extents 137 (e.g., fields and/or subfield locations) during respective production intervals 138, as disclosed herein. The crop yield datasets 134 may be imported by the acquisition module 120 and/or YDIM 130 of the disclosed yield modeling apparatus 110.

Step 1110 may further comprise the disclosed acquisition module 120 importing RS data 108 corresponding to the crop yield datasets 134. Step 1110 may comprise importing RS data 108 configured to cover and/or span spatial extents 137 and/or production intervals 138 of respective yield datasets 134. Importing the RS data 108 may comprise determining spatial and/or temporal intersections between the yield datasets 134 and one or more coverage scheme(s) 309 (by a correlator 140 of the yield modeling apparatus 110, as disclosed herein). The importing of step 1110 may comprise determining a plurality of target spatial elements 147, the target spatial elements 147 configured to cover, overlay, and/or otherwise encompass spatial extent(s) 137 of the yield datasets 134 (e.g., by a spatial profiler 142 of the yield modeling apparatus 110, as disclosed herein). The importing may further comprise determining a plurality of target acquisition times 149 for the RS data 108, the target acquisition times 149 configured to correspond to respective production interval(s) of the yield datasets 134 (e.g., by an interval profiler 144, as disclosed herein). The target acquisition times 149 may be determined with respect to each of a plurality of different production intervals 138 (e.g., non-overlapping and/or non-corresponding production intervals 138). The target acquisition times 149 may be determined such that target acquisition times 149 determined with respect to respective production interval(s) 138 of the yield datasets 134 correspond with target acquisition times 149 determined with respect to other production interval(s) 138 of other(s) of the yield datasets 134. The target acquisition times 149 may be determined to correspond to same and/or similar temporal locations, offsets, target regions 212, and/or production stages 139 of the specified crop. The target acquisition times 149 defined within each related yield dataset 134 may, therefore, be configured to correspond to same and/or similar developmental stages of the specified crop within each of a plurality of different production intervals 138. Importing RS data 108 to cover a target spatial element 147 may comprise importing a plurality of RSD elements 155, each covering the target spatial element 147 (having a same and/or similar RSD spatial extent 157) and being acquired at one of a plurality of different capture times (e.g., different respective RSD acquisition times 159, each corresponding to a respective target acquisition time 149). Importing RS data 108 to cover N target spatial elements 147 determined for the crop yield datasets 134 may, therefore, comprise importing N*M RSD elements 155 from one or more RSD repositories 107.

Step 1110 may further comprise the disclosed feature construction module 170 constructing a training dataset 775 for the yield model 183. The training dataset 775 may be derived from the crop yield datasets 134 and/or corresponding imported RS data 108, as disclosed herein. Constructing the training dataset 775 may comprise deriving a plurality of feature vectors 175, each feature vector 175 configured to cover a respective portion of the spatial extent 137 of one or more of the yield datasets 134 (e.g., each feature vector 175 covering a specified FV spatial extent 177). The constructing may further comprise determining a plurality of training vectors 675, each comprising a respective one of the feature vectors 175 and a corresponding yield quantity 635. The yield quantity 635 may comprise and/or be derived from yield values 135 having location(s) within the FV spatial extent 177 of the feature vector 175, as disclosed herein.

In some embodiments, constructing the training vectors 675 may comprise the disclosed feature construction module 170 mapping yield values 135 of the yield datasets 134 and/or the corresponding RS data 108 onto a feature scheme 609, as disclosed herein. The feature scheme 609 may define a spatial resolution and/or scale different from a spatial resolution and/or scale of the related yield datasets 134 and/or the imported RSD elements 155. The feature scheme 609 may define a larger spatial scale (and/or coarser spatial resolution) than the crop yield datasets 134 and/or imported RSD elements 155. The feature scheme 609 may comprise and/or define a plurality of spatial elements (e.g., FV spatial elements 647), which may be configured such that each spatial element comprises, overlays, intersects, and/or otherwise corresponds to the RSD spatial extents 157 of one or more RSD elements 155. The FV spatial elements 647 may be larger than the RSD spatial extents 157 of the RSD elements 155 (e.g., may cover 25-meter areas as opposed to 20-meter areas covered by respective RSD elements 155). In some embodiments, a layout of the FV spatial elements 647 may be adapted to differ from a layout of the RSD elements 155 (e.g., an axis of the FV spatial elements 647 may be offset from a corresponding axis of the RSD elements 155, as illustrated in FIGS. 6A and 6B). Step 1110 may comprise overlaying yield values 135 of the yield datasets 134 and/or RSD spatial extents 137 of the imported RSD elements 155 with the feature scheme 609 (e.g., mapping and/or overlaying by a spatial feature scheme 607 comprising FV spatial elements 647, as disclosed herein). The feature vectors 175 of the training vectors 675 may be configured to cover respective locations within the spatial extent(s) 137 of the crop yield datasets 134 (e.g., respective FV spatial extents 177). The feature vectors 175 of the training dataset 775 constructed at step 1110 may be configured to span, cover, intersect with and/or otherwise encompass spatial extents 137 of the related yield datasets 134. Constructing a feature vector 175 configured to cover a particular FV spatial extent 177 may comprise: a) identifying RSD elements 155 having RSD spatial extents 137 that cover, overlay, intersect and/or otherwise correlate with the particular FV spatial extent 177; and b) deriving the feature vector 175 from the identified RSD elements 155. In some embodiments, constructing the feature vector 175 may further comprise determining correlation metrics for the identified RSD elements 155, the correlation metrics configured to quantify a degree of overlap, intersection and/or spatial correlation between the RSD spatial extent 157 of RSD element 155 and the FV spatial extent 177 of the feature vector 175. Deriving the feature vector 175 may further comprise weighting contributions of respective RSD elements 155 of the identified RSD elements 155 in accordance with the determined correlation metrics. The deriving may comprise increasing weights assigned to RSD elements 155 having higher correlation metrics and/or decreasing weights assigned to RSD elements 155 having lower correlation metrics. The deriving may further comprise filtering the identified RSD elements 155, which may comprise excluding RSD elements 155 having correlation metrics that do not satisfy one or more spatial correlation thresholds. Constructing the feature vector 175 may further comprise determining a plurality of feature elements 255, each comprising and/or derived from RSD elements 155, of the identified RSD elements 155, determined to have a same and/or corresponding RSD acquisition time 159. The feature vector 175 may be configured to cover a plurality of acquisition times (e.g., FV acquisition times 179). Constructing a feature vector 175 configured to cover M FV acquisition times 179 may comprise selecting M sets of RSD elements 155, each set comprising RSD elements 155 having acquisition times 159 corresponding to one of the M FV acquisition times 179, and deriving each of M feature elements 255 comprising the feature vector 175 from RSD elements 155 of a respective one of the M sets of RSD elements 155.

As disclosed above, the temporal coverage 189 determined for the yield model 183 may determine a configuration of compatible and/or suitable feature vectors 175 (e.g., feature vectors 175 that are compatible with the yield model 183 and/or suitable for being processed thereby). The temporal coverage 189 of the yield model 183 may determine the FV acquisition times 179 included in respective feature vectors 175 (e.g., may determine the number of feature elements 255 included in respective feature vectors 175, each feature element 255 comprising and/or derived from RSD elements 155 captured at one of a plurality of RSD acquisition times 159). The temporal coverage 189 of the yield model 183 may, therefore, determine a size of compatible feature vectors 175 and/or the configuration of ML components of the yield model 183, as disclosed herein. Step 1110 may comprise constructing feature vectors 175 of the training dataset 775 in accordance with the determined temporal coverage 189 of the yield model 183 (e.g., may comprise constructing compatible feature vectors 175). Constructing a feature vector 175 configured to cover a particular area (FV spatial extent 177) and/or correspond to a particular temporal coverage 189 (FV acquisition times 179) may comprise: a) identifying RSD elements 155 having RSD spatial extents 157 that intersect with the FV spatial extent 177; b) deriving a plurality of feature elements 255 from the identified RSD elements 155, each feature element 255 having an RSD acquisition time 159 corresponding to a respective one of the FV acquisition times 179; wherein deriving an feature element corresponding to a particular RSD acquisition time 159 comprises: c) selecting RSD elements 155 having the particular RSD acquisition time 159 from the identified RSD elements 155; and d) deriving the feature element 255 from the selected RSD elements 155. Constructing the training vectors 675 may further comprise associating the feature vectors 175 with respective yield quantities 635. The yield quantity 635 of a training vector 675 may be derived from yield values 135 of the yield datasets 134 determined to have locations that intersect with the FV spatial extent of the feature vector 175 of the training vector 675.

Step 1110 may further comprise developing the yield model 183 by use of the training dataset 775. Developing the yield model 183 at step 1110 may comprise instantiating, training, refining, validating, and/or otherwise managing the yield model 183 and/or a corresponding YM dataset 184, as disclosed herein. Step 1110 may comprise a modeling engine 182 training an ML implementation of the yield model 183 to produce accurate crop yield estimates 195 in response to feature vectors 175 of respective training vectors 675 of the training dataset 775. The training may comprise configuring ML components of the yield model 183 to: a) receive feature vectors 175 (e.g., receive compatible feature vectors 175 comprising feature elements 255 having RSD acquisition times 159 corresponding to the temporal coverage 189 of the yield model 183); and b) produce yield estimates 195 in response to the feature vectors 175. Training the yield model 183 may comprise implementing one or more training operations (training epochs). Implementing a training epoch may comprise the modeling engine 182 a) configuring the yield model 183 to process selected training vectors 675 to produce respective yield estimates 195; b) determine error metrics 735 in response to the yield estimates 195 (e.g., training error metrics 735, Tr_ERR); and c) tune the yield model 183 to reduce the determined error metrics 735 (Tr_ERR). The error metrics 735 (e.g., Tr_ERR) may be determined by comparing yield estimates 195 produced by the yield model 183 in response to feature vectors 175 of respective training vectors 675 to the yield quantities 635 of the selected training vectors 675 (which may correspond to captured yield data 104 verified to accurately reflect the actual crop yield within the FV spatial extent 177 of the feature vector 175). Tuning the yield model 183 may comprise adjusting ML configuration data thereof (YM data 184) in accordance with one or more ML algorithms, as disclosed herein. In some embodiments, implementing a training epoch may comprise implementing a plurality of training iterations, each iteration comprising processing selected training vectors 675 through the yield model 183 and/or tuning the yield model 183 in response to the resulting error metrics 735. Implementing a training epoch may further comprise performing training iterations until one or more completion criteria are satisfied, as disclosed herein. In some embodiments, training the yield model 183 at step 1110 may comprise implementing one or more training procedures, such as a k-fold cross validation training procedure, a dropout training procedure, and/or the like.

Step 1120 may comprise estimating spatial yield characteristics using the yield model 183 developed at step 1110. Step 1120 may comprise generating PZCY models 895 for a PZ 124. Step 1120 may comprise: a) specifying a PZ 124; b) identifying a yield model 183 compatible with the PZ 124; c) importing RS data 108 corresponding to the PZ 124 and/or identified yield model 183; d) constructing a feature dataset 875 for the PZ 124; and e) utilizing the identified yield model 183 to generate yield estimates 195 for the PZCY model 895 in response to feature vectors 175 of the feature dataset 875.

Step 1120 may comprise specifying the PZ 124 in response to PZ data 121, which may comprise any information pertaining to the PZ 124, such as a spatial extent 137 of the PZ 124 (e.g., geographical area, region, location(s), fields, subfields location(s), and/or the like), a production interval 138 of the PZ 124 (e.g., end time 213, start time 212, temporal locations, offsets, target regions 212, and/or production stages 139 within the production interval 138, and/or the like), information pertaining to the particular crop produced within the PZ 124 (e.g., the crop type, species, genus, variant, hybrid, and/or the like), a producer of the crop, and/or the like. Step 1110 may comprise acquiring PZ data 121 from any suitable source (e.g., user input, through one or more HMI components 115 of the computing device 111, via the network 101, one or more producers, organizations, PZ data records 804 maintained within one or more PZ repositories 805, and/or the like), as disclosed herein. Step 1120 may further comprise identifying a suitable yield model 183 by, inter alia, comparing the PZ 124 to YM datasets 184 of one or more yield models 184 (e.g., matching the crop produced in the PZ 124 to crop coverages 187 of the yield models 183).

Step 1120 may further comprise acquiring RS data 108 configured to cover the specified PZ 124. Step 1120 may comprise determining target spatial elements 147 configured to cover the spatial extent 137 of the PZ 124. Step 1120 may further comprise determining target acquisition times 149 within the production interval 138 of the PZ 124. The target acquisition times 149 may be determined in accordance with the temporal coverage 189 of the selected yield model 183, temporal coverage characteristics of the RS data 108, and/or the like. The target acquisition times 149 determined for the PZ 124 may be configured to correspond with acquisition times of the temporal coverage 189. The target acquisition times 149 may be configured to correspond to target acquisition times 149 of the RS data 108 used to develop the yield model 183. Step 1120 may comprise configuring the correlator 140 to determine target acquisition times 149 for the PZ 124 that correspond with target regions 212 and/or crop production stages 139 of the temporal coverage 189, as disclosed herein. Step 1120 may comprise importing second RS data 108, the second RS data 108 comprising RSD elements 155 configured to capture respective target spatial elements 147 within the spatial extent 137 of the PZ 124 at each of the determined target acquisition times 149.

Step 1120 may further comprise constructing a feature dataset 875 for the PZ 124, as disclosed herein. The feature dataset 875 may comprise a plurality of feature vectors 175 (e.g., second feature vectors 175). The second feature vectors 175 may be configured to cover the spatial extent 137 of the PZ 124 (the FV spatial extents 177 of the second feature vectors 175 may be configured to span, cover, and/or otherwise encompass the spatial extent 137 of the PZ 124). The second feature vectors 175 may be further configured to span the temporal coverage 189 of the identified yield model 183. Constructing the second feature vectors 175 may comprise mapping the second RS data 108 onto a feature scheme 609, as disclosed herein. The second feature vectors 175 may be configured to cover respective location(s) within the PZ 124 (may cover respective FV spatial extents 177 within the spatial extent 137 of the PZ 124). Constructing a feature vector 175 of the second feature vectors 175 may comprise: a) identifying RSD elements 155 having RSD spatial extents that intersect with the FV spatial extent 177 of the feature vector 175; and b) deriving a plurality of feature elements 255 from the identified RSD elements 155, each feature element 255 comprising and/or derived from RSD elements 155 captured at a respective one of a plurality of RSD acquisition times 159 (which may be configured to correspond to acquisition times specified by temporal coverage 189 of the yield model 183, as disclosed herein).

Step 1120 may further comprise utilizing the identified yield model 183 to generate a PZCY model 895 for the PZ 124. Generating the PZCY model 895 may comprise producing a plurality of yield estimates 195, each yield estimate 195 configured to estimate yield of the specified crop within specified subfield location(s) of the PZ 124. Generating the PZCY model 895 may comprise processing the feature vectors 175 of the feature dataset 875 by the identified yield model 183, as disclosed herein (e.g., processing each of the second feature vectors 175). Processing the second feature vectors 175 may comprise configuring the yield model 183 to produce respective yield estimates 195, each configured to estimate yield of the specified crop within a specified subfield location of the PZ 124 (e.g., locations per the FV spatial extents 177 of the second feature vectors 175). Generating the PZCY model 895 may further comprise combining the yield estimates 195, such that the PZCY model 895 comprises yield estimates 195 encompassing the spatial extent 137 of the PZ 124.

Figure 12:
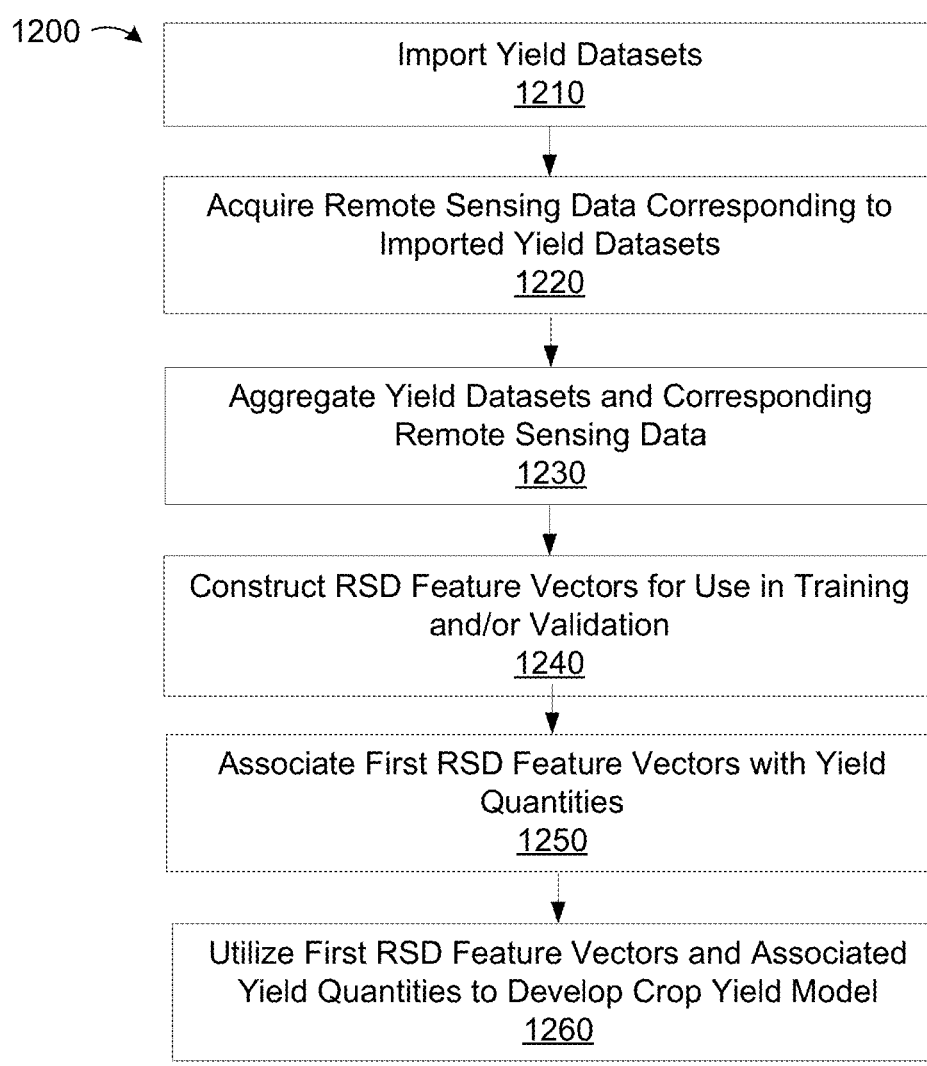
FIG. 12 is a flow diagram of one embodiment of a method for developing crop yield models, as disclosed herein.

FIG. 12 is a flow diagram of one embodiment of a method 1200 for developing a yield model 183, as disclosed herein. Step 1210 may comprise importing one or more yield datasets 134, as disclosed herein. The yield datasets 134 may be configured for use in training a yield model 183 for a specified crop. In some embodiments, step 1210 may comprise specifying characteristics of the yield model 183, such as a crop coverage 187, temporal coverage 189, and/or the like, as disclosed herein. Step 1210 may comprise importing captured yield data 104, which may comprise importing captured yield data 104 from one or more YD repositories 105, operators, producers, harvesters 102, yield monitoring devices 103, and/or the like.

Step 1220 may comprise acquiring RS data 108 corresponding to the yield datasets 134 imported at step 1210. Step 1220 may comprise determining spatial and/or temporal intersections between the yield datasets 134 and RS data 108, as disclosed herein. Step 1220 may comprise determining target spatial elements 147 configured to cover spatial extents 137 of respective yield datasets 134 and/or target acquisition times 149 within production intervals of the respective yield datasets 134. Step 1220 may further comprise importing RSD elements 155 covering the target spatial elements 147 and/or target acquisition times 149 from one or more RSD repositories 107, as disclosed herein.

Step 1230 may comprise aggregating the yield datasets 134 and/or corresponding RS data 108. The aggregating may comprise mapping yield values 135 of the yield datasets 134 and/or RSD elements 155 of the imported RS data 108 to a feature scheme 609, as disclosed herein. The mapping may comprise translation to a different spatial scale and/or resolution.

Step 1240 may comprise constructing a plurality of feature vectors 175 in response to the aggregation of step 1230 (first feature vectors 175). The feature vectors 175 constructed at step 1240 may be configured to cover the yield datasets 134 (e.g., FV spatial extents 177 of the feature vectors 175 may be configured to encompass spatial extent(s) 137 of the yield datasets 134, as disclosed herein). The feature vectors 175 may be further configured to cover specified FV acquisition times 179 in accordance with the temporal coverage 189 of the yield model 183, as disclosed herein.

Step 1250 may comprise associating the feature vectors 175 of step 1240 with respective yield quantities 635. The yield quantities 635 may be derived from yield values 135 captured at locations within FV spatial extents 177 of the respective feature vectors 175 (per the aggregation of step 1230). Step 1230 may, therefore, comprise constructing a training dataset 775 comprising a plurality of training vectors 675, each comprising a respective feature vector 175 and corresponding yield quantity 635.

Step 1260 may comprise utilizing the feature vectors 175 and associated yield quantities 635 to train the yield model

183, as disclosed herein. Step 1260 may comprise implementing one or more training procedures, such as one or more training epochs, k-fold cross validation procedures, dropout training procedures, and/or the like. Step 1260 may further comprise storing a YM dataset 184 comprising the yield model 183 in non-transitory storage (e.g., persistent storage 116 of the yield modeling apparatus 110).

Figure 13:
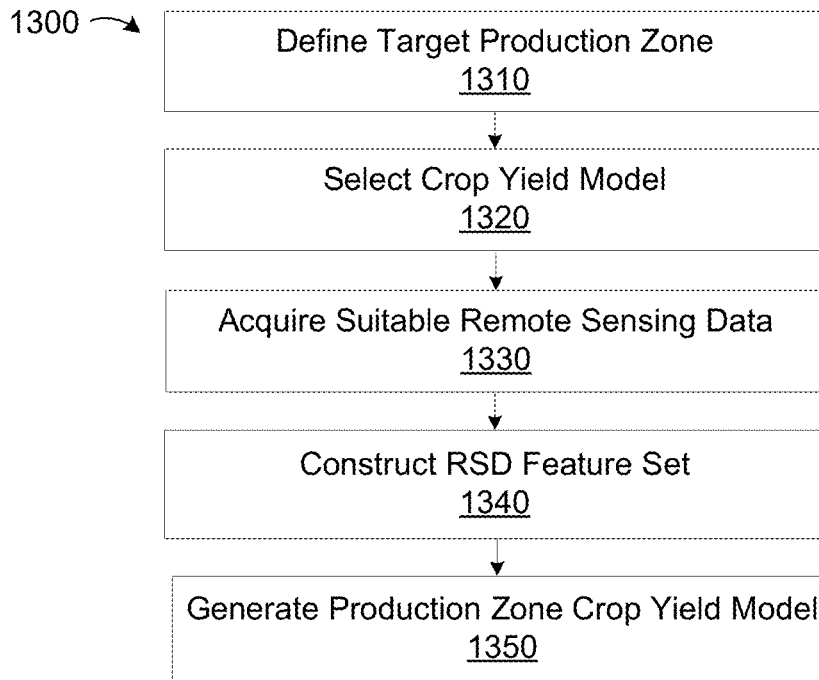
FIG. 13 is a flow diagram of one embodiment of a method for estimating spatial yield characteristics of a production zone (e.g., field), as disclosed herein.

FIG. 13 is a flow diagram of one embodiment of a method 1300 for estimating spatial yield characteristics of a PZ 124, as disclosed herein. Step 1310 may comprise defining a PZ 124. Step 1310 may comprise receiving, acquiring, and/or otherwise importing PZ data 121 pertaining to the PZ 124, as disclosed herein. Step 1310 may comprise determining the crop being produced within the PZ 124 (e.g., determining the crop type, species, genus, variant, and/or hybrid). Step 1310 may further comprise determining a spatial extent of the PZ 124, and/or characteristics of the production interval 138 in which the specified crop was produced (and/or is currently in the process of being produced).

Step 1320 may comprise selecting a yield model 183 of a plurality of yield models 183 managed by the yield modeling apparatus 110. Step 1320 may comprise comparing characteristics of the PZ 124 to respective yield models 183 maintained by the yield modeling apparatus 110 (e.g., comparing the PZ 124 to respective YM datasets 184). The comparing may comprise matching a crop coverage 187 of a yield model 183 to crop(s) of the PZ 124. The comparing may further comprise comparing temporal extents 189 of the yield models 183 to coverage schemes 109 of one or more RSDA platforms 106. The comparing may comprise determining temporal coverage characteristics of the spatial extent 137 of the PZ 124. The comparing may, therefore, comprise evaluating a temporal scheme 309 of RS data 108 covering the spatial extent 137 of the PZ 124 and/or temporal extents 189 of the respective yield models 183. The comparing may comprise identifying yield models 183 for which suitable RS data 108 are available (e.g., RS data 108 covering the spatial extent 137 of the PZ 124 at a suitable frequency, interval, and/or the like). Step 1320 may comprise selecting a yield model 183 having a temporal coverage 189 capable of being satisfied by one or more RSDA platforms 106, as disclosed herein. In some embodiments, step 1320 may comprise selecting a yield model 183 that covers a particular subset of the production interval 138 of the PZ 124. Step 1320 may comprise selecting a yield model 183 having a temporal extent 189 that covers a first portion of the production interval 138 of the PZ 124 (e.g., a first third, half, two thirds, and/or the like). Step 1320 may, therefore, comprise selecting a yield model 183 capable of estimating spatial yield characteristics within the PZ 124 during the production interval 138 thereof (e.g., prior to completion of the production interval 138).

Step 1330 may comprise acquiring suitable RS data 108, as disclosed herein. Step 1330 may comprise acquiring RS data 108 capable of producing suitable feature vectors 175. Step 1330 may comprise importing RS data 108 (e.g., second RSD elements 155) configured to cover the target spatial elements 147 at a plurality of different RSD acquisition times 159 corresponding to each of the target acquisition times 149. Step 1330 may comprise the acquisition module 120 of the yield modeling apparatus 110 acquiring RSD elements 155 having: a) RSD spatial extents 137 spanning the spatial extent 137 of the PZ 124, at b) each of a plurality of RSD acquisition times 159 configured to span the production interval 138 of the PZ 124 (and/or temporal coverage 189 of the selected yield model 183). Step 1330 may comprise a spatial profiler 142 determining target spatial elements 147 configured to cover, span, intersect with, and/or otherwise encompass the spatial extent 137 of the PZ 124, as disclosed herein. The target spatial elements 147 may be determined in accordance with a spatial coverage scheme 307 of one or more RSDA platforms 106 (e.g., by mapping location(s) of the PZ 124 onto spatial elements 347 of the spatial coverage scheme 307, such as a grid, a tiling grid, a spatial grid, a geographic grid, granules, fixed-size granules, and/or the like). Step 1330 may further comprise an interval profiler 144 determining target acquisition times 149 for the RS data 108. The target acquisition times 149 may be determined in accordance with temporal coverage characteristics of one or more RSDA platforms 106 (e.g., temporal coverage characteristics of the determined target spatial elements 147 by the one or more RSDA platforms 106). The target acquisition times 149 may be further configured to correspond to the temporal coverage 189 of the selected yield model 183, as disclosed herein. Step 1330 may comprise determining target acquisition times 149 that correspond with respective modeled acquisition times 789 of the selected yield model 183. Step 1330 may comprise defining target region(s) 212 corresponding to respective production stages 139 of the specified crop within the production interval 138 of the PZ 124, and selecting target acquisition times 149 within the defined target regions 212. Step 1330 may further comprise acquiring RS data 108 in accordance with the determined target spatial elements 147 and/or target acquisition times 149. Step 1330 may comprise importing a plurality of RSD elements 155, each configured to capture a respective RSD spatial extent 157 covering a respective one of the target spatial elements 147 at an RSD acquisition time 159 corresponding to one of the target acquisition times 149. Step 1330 may comprise importing N*M RSD elements 155, where N is the number of determined target spatial elements 147 (per the spatial extent 137 of the PZ 124) and M is the number of determined target acquisition times 149 (per the temporal coverage of the selected yield model 183).

Step 1340 may comprise constructing a feature dataset 875 for use in modeling spatial yield characteristics of the PZ 124. Step 1340 may comprise constructing feature vectors 175 comprising and/or derived from the RS data 108 imported at step 1330. Step 1340 may comprise constructing a feature dataset 875 configured to cover the spatial extent 137 of the PZ 124 (e.g., a feature dataset 875 comprising second feature vectors 175). Step 1340 may comprise constructing feature vectors 175 having FV spatial extents 177 configured to cover the spatial extent 137 of the PZ 124, as disclosed herein. Step 1340 may further comprise constructing feature vectors 175 having FV intervals 179 corresponding to the temporal coverage 189 of the selected yield model 183, as disclosed herein (e.g., feature vectors 175 that are compatible with the selected yield model 183).

Step 1340 may comprise mapping the RS data 108 acquired at step 1330 to a feature scheme 609 (e.g., as indicated by an RS coverage 188 of the selected yield model 183). Step 1340 may comprise translating RSD spatial extents 157 of respective RSD elements 155 onto a spatial feature scheme 607 having a spatial scale, resolution, and/or granularity different from that of the RSD elements 155. Step 1340 may further comprise constructing feature vectors 175 in accordance with a temporal coverage 189 of the selected yield model 183. Step 1340 may comprise determining a number of feature elements 255 to include in each feature vector 175 and/or determining RSD acquisition times 159 covered by the respective feature elements 255. Step 1340 may comprise selecting the RSD acquisition times 159 in accordance with modeled acquisition times 789 of the temporal coverage 189, such that each RSD acquisition time 159 corresponds with a respective one of the modeled acquisition times 789 (e.g., corresponds with respective RSD acquisition times 159 of the RS data 108 used to construct training vectors 675 for the selected yield model 183). Step 1340 may, therefore, comprise constructing feature vectors 175 from RS data 108 captured at times during which the specified crop was at particular production stages 139, as disclosed herein.

Step 1350 may comprise generating yield model for the PZ 124, as disclosed herein (e.g., a PZCY model 895). Step 1350 may comprise configuring the selected yield model 183 to produce a plurality of yield estimates 195 in response to the feature dataset 875 constructed at step 1340. Step 1350 may comprise instantiating the yield model 183 within computing resources of a computing device (e.g., within computing resources of computing device 111, as disclosed herein). Step 1350 may comprise loading portions of the YM data 184 of the selected yield model 183 into a processor 112 and/or memory 113 of the computing device 111. Step 1350 may further comprise initializing, arranging, connecting, and/or otherwise configuring ML components of the selected yield model 183 (e.g., in accordance with learned ML data of the YM configuration 185). Step 1350 may comprise instantiating and/or configuring one or more of an ANN, an MLP, and/or the like. Step 1350 may comprise instantiating and/or configuring one or more nodes 702, layers 710, and/or the like (e.g., an input layer 711 comprising input nodes 712, hidden layer(s) 721 comprising hidden layer nodes 722, an output layer 731 comprising one or more output nodes 732, and so on).

Step 1350 may comprise utilizing the selected yield model 183 to estimate spatial yield characteristics within the PZ 124. Step 1350 may comprise configuring the selected yield model 183 to process respective feature vectors 175 of the second feature vectors 175 constructed at step 1340. Processing a feature vector 175 may comprise routing components 253/263 of respective RSD feature elements 255 of the feature vector 175 to an input layer 711 of the yield model 183 (e.g., to respective input nodes 712). The processing may further comprise propagating outputs produced by respective nodes 702 in response to the feature vector 175 within the yield model 183 (e.g., propagating node activations from the input layer 711 to one or more hidden layers 721, and from the hidden layer(s) to the output layer 731, and so on). Processing the feature vector 175 may further produce an output quantity in response to the feature vector 175 (e.g., at an output node 732), the output quantity comprising a yield estimate 195 covering the FV spatial extent 177 of the feature vector 175. Step 1350 may comprise processing feature vectors 175 configured to cover respective subfield locations within the spatial extent 137 of the PZ 124, which may comprise producing a plurality of yield estimates 195, each yield estimate 195 covering the FV spatial extent 177 of a respective one of the feature vectors 175. Step 1350 may further comprise gathering, aggregating, combining, and/or otherwise organizing the yield estimates 195 into a PZCY model 895 covering the PZ 124, as disclosed herein.

Figure 14:
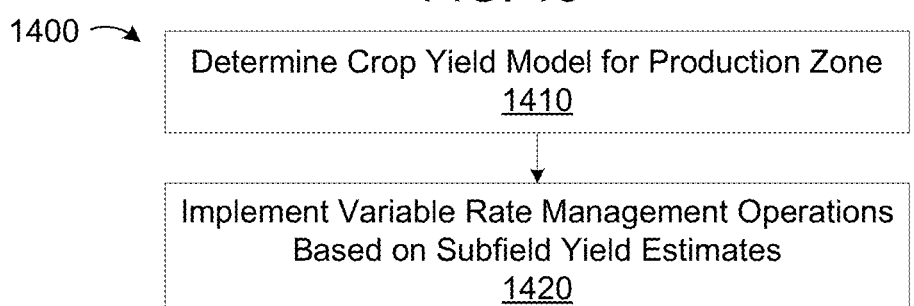
FIG. 14 is a flow diagram of one embodiment of a method for variable rate subfield management, as disclosed herein.

FIG. 14 is a flow diagram of one embodiment of a method 1400 for variable rate subfield management of a PZ 124. Step 1410 may comprise producing a PZCY model 895 for the PZ 124, as disclosed herein. Step 1410 may comprise developing a crop yield model 183 configured to estimate subfield yield characteristics of a specified crop in response to, inter alia, feature vectors 175 comprising RS data 108 captured during production of the specified crop, as disclosed herein. Step 1410 may further comprise acquiring RS data 108 corresponding to production of the specified crop within the spatial extent 137 of the PZ 124 during the determined production interval 138 of the PZ 124, constructing feature vectors 175 configured to capture respective subfield locations within the PZ 124 at each of a plurality RSD acquisition times 159, and using the crop yield model 183 to produce yield estimates 195 corresponding to each of the feature vectors 175. Alternatively, or in addition, step 1410 may comprise developing forecast yield models 183 for the specified crop, as disclosed herein.

Step 1420 may comprise using the PZCY model 895 to implement VRT operations within the PZ 124. Step 1420 may comprise identifying first subfield locations within the PZ 124, the first subfield locations having lower yield estimates 195 than other subfield locations of the PZ 124. Step 1420 may comprise generating a map covering the spatial extent 137 of the PZ 124, designating the first subfield locations within the map, and utilizing the map (and subfield designations) to implement variable rate subfield management operations (e.g., modify application of one or more production inputs, as disclosed herein). Step 1420 may comprise controlling the application of the production inputs within different subfield locations of the PZ 124. Step 1420 may comprise modifying application of one or more production inputs within the first subfield locations relative to the other subfield locations of the PZ 124. The modifying may be configured to increase crop production within the first subfield locations, decrease costs associated with crop production within the first subfield locations, and/or the like, as disclosed herein. In some embodiments, step 1420 may further comprise identifying second subfield locations within the PZ 124, the second subfield locations having yield estimates 195 below an exclusion threshold and/or low yield estimates 195 for a threshold number of production intervals 138. The second subfield locations may, therefore, comprise locations that are not viable for production of the specified crop. Step 1420 may comprise implementing VRT management operations configured to reduce and/or eliminate the application of production inputs within the second subfield locations, as disclosed herein.

In some embodiments, step 1420 may comprise determining utility metrics 197 for respective subfield locations within the PZ 124. Step 1420 may comprise determining a utility dataset 897 for the PZ 124 in response to generating the PZCY model 895 for the PZ 124, as disclosed herein. Step 1420 may comprise determining VRT operations configured to increase utility metrics 197 of respective subfield locations within the PZ 124, as disclosed herein. The VRT operations may be embodied as management instructions 199, which may be communicated to a producer through the network 101. In some embodiments, the determined VRT operations may be embodied as machine-readable instructions configured to execution by computing resources of machines involved in crop production within the PZ 124, as disclosed herein (e.g., instructions configured for execution by computing resources of a combine, irrigation system, and/or the like).

In some embodiments, step 1420 further comprises determining a yield forecast for the specified crop produced within the PZ 124. The yield forecast may be configured to estimate a yield of the specified crop across a plurality of different fields. Step 1420 may comprise determining VRT operations based upon, inter alia, the yield forecasts. Step 1420 may comprise determining VRT operations to reduce production costs expended within the PZ 124, and/or respective subfield locations therein, in response to the yield forecast exceeding a high yield threshold, which may indicate that the value of the specified crop is likely to be lower than expected (e.g., due to higher than expected supply). Alternatively, step 1420 may comprise determining VRT operations to increase production of the specified crop within the PZ 124 (at increased cost), in response to the yield forecast failing to satisfy a low yield threshold, which may indicate that the value of the specified crop is likely to be lower than expected (e.g., due to lower than expected supply).

Figure 15:
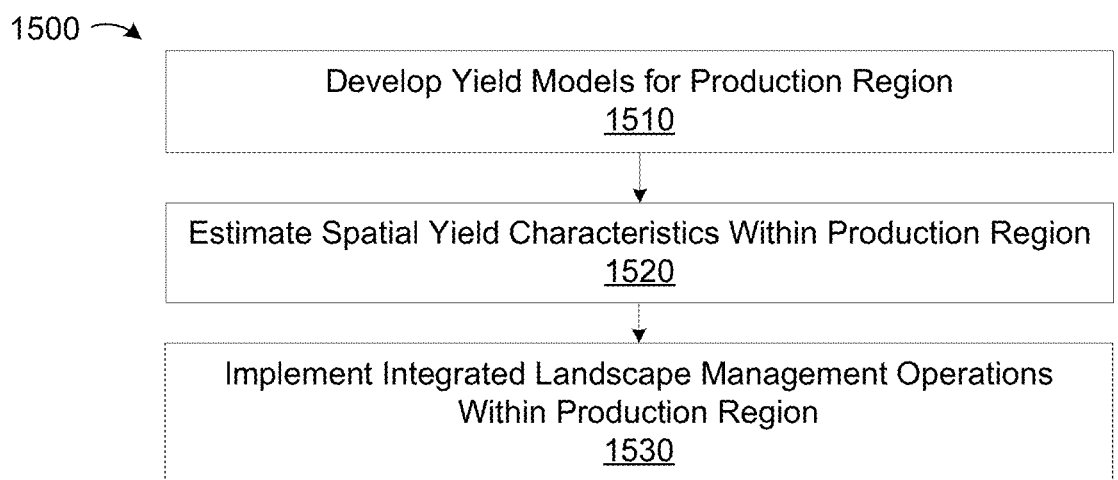
FIG. 15 is a flow diagram of one embodiment of a method for integrated landscape management, as disclosed herein.

FIG. 15 is a flow diagram of one embodiment of a method 1500 for ILM, as disclosed herein. Step 1510 may comprise developing yield models 183 for a production region. The production region may comprise geographical areas having same or similar production conditions (e.g., same of similar environmental conditions, climate, and/or the like). Step 1510 may comprise developing a plurality of yield models 183, each yield model 183 having a respective YM coverage 186. The yield models 183 developed at step 1510 may be configured to cover production of each of a plurality of different crops within the production region. The yield models 183 may define respective temporal coverages 189. In some embodiments, step 1510 comprises developing set of yield models 183, each having a same or similar crop coverage 187 and defining a different respective temporal coverage 189 (e.g., developing a set of yield models 183A and 183AA, each configured to model spatial yield characteristics for production of same and/or similar crops by use of feature vectors 175 covering different numbers of RSD acquisition times 159, as disclosed herein). Developing a yield model 183 at step 1510 may comprise: a) initializing the yield model 183; b) importing yield datasets 134 corresponding to the yield model 183; c) importing RS data 108 configured to cover the imported yield datasets 134; d) constructing a training dataset 775 for the yield models 183; and e) training the yield model 183 by use of the training dataset 775.

Initializing a yield model 183 at step 1510 may comprise receiving information pertaining to the initialization, design, configuration, and/or development of the yield model 183 at the yield modeling apparatus 110, as disclosed herein. Alternatively, or in addition, step 1510 may comprise determining information pertaining to the initialization, design, configuration, and/or development of the yield model 183 in accordance with an ML implementation of the yield modeling apparatus 110 (e.g., the architecture of ML components of the yield model 183 may be determined in accordance with one or more ML architectures, such as an artificial neural network architecture, multilayer perceptron architecture, and/or the like). Initializing a yield model 183 may further comprise, inter alia, determining a YM configuration 185 for the yield model 183, defining a YM coverage 186 for the yield model 183, and so on, as disclosed herein. Defining the YM coverage 186 may comprise designating the crop coverage 187, RS coverage 188, and/or temporal coverage 189 of the yield model 183. The crop coverage 187 may indicate the specified crop (or crops) covered by the yield model 183. The crop coverage 187 may further specify a production region covered by the yield model 183. The RS coverage 188 of the yield model 183 may define characteristics of imported RS data 108 (e.g., may specify EM wavelengths and/or bands to include in imported RSD elements 155 and/or suitable feature vectors 175, as disclosed herein). The temporal coverage 189 may define temporal coverage characteristics of the yield model 183, such as the number of RSD acquisition times 159 covered by the imported RS data 108, the number of feature elements 255 to include in respective feature vectors 175 (and/or corresponding modeled acquisition times 789), and/or the like, as disclosed herein. The temporal coverage 189 of respective yield models 183 may be determined in accordance any suitable factor, such as desired capabilities of respective yield models 183 (e.g., yield models 183 capable of producing yield estimates 195 based on RS data 108 covering subset(s) of respective production intervals 138, such as the yield model 183AA disclosed herein).

Developing a yield model 183 for the production region may further comprise importing yield datasets 134 corresponding to the yield model 183, as disclosed herein. Importing a yield dataset 134 corresponding to a yield model 183 may comprise retrieving captured yield data 104 corresponding to the crop coverage 187 of the yield model 183 (e.g., from one or more YD repositories 105). Importing the yield dataset 134 may comprise importing a plurality of yield values 135, each quantifying yield of the specified crop harvested at a respective location within a specified spatial extent 137 (the spatial extent 137 within the production region). The yield values 135 of the yield dataset 134 may comprise spatial yield characteristics for production of the specified crop over a determined production interval 138. Developing a yield model 183 for a specified crop may comprise importing a set of yield datasets 134, the set covering a limited number of fields within a production region. Step 1510 may comprise importing yield datasets 134 acquired by specified producers, such as producers determined to be capable of acquiring accurate captured yield data 104 (e.g., by adhering to proper calibration procedures, as disclosed herein).

Step 1510 may further comprise importing RS data 108 corresponding to the yield datasets 134 imported for the yield model 183 (importing first RS data 108). Step 1510 may comprise importing RS data 108 configured to cover the yield datasets 134. Importing RS data 108 configured to cover a yield dataset 134 may comprise importing RSD elements 155 configured to cover the spatial extent of the yield dataset 134 at each of a plurality of acquisition times. Importing RS data 108 configured to cover a yield dataset 134 of a yield model 183 may further comprise importing RS data 108 configured to capture the spatial extent 137 of the yield dataset 134 at acquisition times that cover the temporal extent 189 of the yield model 183. Importing RS data 108 to cover a yield dataset 134 of a yield model 183 may comprise importing a plurality of RSD elements 155, each RSD element 155 covering a specified portion of the spatial extent 137 of the yield dataset 134 (per the RSD spatial extent 157 thereof). Importing RS data 108 to cover the yield dataset 134 of the yield model 183 may further comprise importing RS data 108 corresponding to the temporal coverage 189 of the yield model 183 (e.g., importing RS data 108 capturing the spatial extent 137 of the yield dataset 137 at each of a plurality of acquisition times). Importing RS data 108 to cover a particular portion of the spatial extent 137 of the yield dataset 134 (e.g., a particular target spatial element 147) may comprise importing a plurality of RSD elements 155, each RSD element 155 capturing the same RSD spatial extent 157 at a different one of a plurality of RSD acquisition times 159. The RSD acquisition times 159 may be configured in accordance with the temporal coverage 189 of the yield model 189 (e.g., each RSD acquisition time 159 may be configured to correspond to a respective one of a plurality of modeled acquisition times 789 of the yield model 183). In some embodiments, importing RS data 108 to cover a yield dataset 134 of a yield model 183 may further comprise importing RS data 108 corresponding to an RS coverage 188 of the yield model 183. The importing may comprise retrieving RSD elements 155 configured to cover the spatial extent 137 at each of a plurality of RSD acquisition times 159, the RSD elements 155 comprising a plurality of RSD components 153, each RSD component 153 comprising RS data 108 corresponding to one of a plurality of EM wavelengths and/or bands.

In some embodiments, importing RS data 108 configured to cover one or more yield datasets 134 corresponding to a yield model 183 (e.g., related yield datasets 134) may comprise: determining target spatial elements 147 configured to cover the spatial extent(s) 137 of the yield datasets 134; determining target acquisition times 149 within respective production intervals 138 of the yield datasets 134; and importing RS data 108 configured to cover determined each of the target spatial elements 147 at each of the target acquisition times 149. The importing may comprise retrieving a plurality of RSD elements 155, each RSD element 155 comprising RS data 108 covering a same target spatial element 147 (per the RSD spatial extent 157 thereof) and having an acquisition time corresponding to a respective one of the target acquisition times 149 (per the RSD acquisition time 159 thereof). In some embodiments, each RSD element 155 may comprise one or more RSD components 153, each RSD component 153 comprising an EMR value for one of a specified set of EM wavelengths and/or bands. The RSD components 153 may be configured in accordance with an RS coverage 188 of one or more yield models 183, as disclosed herein.

The target spatial elements 147 for the one or more yield datasets 134 may be configured to cover, overlay, and/or otherwise encompass spatial extents 137 of the yield datasets 134. The target spatial elements 147 may be determined in accordance with a coverage scheme 109 of the RS data 108. Determining the target spatial elements 147 may comprise mapping, translating, and/or otherwise correlating locations of respective yield values 135 of the yield datasets 134 with spatial coverage characteristics of the RS data 108 (e.g., a spatial coverage scheme 307). Determining the target acquisition times 149 for the yield datasets 134 may comprise determining corresponding acquisition times 149 within respective production intervals 138 of the yield datasets 134. Determining the target acquisition times 149 may comprise determining a plurality of TAT sets 449, each defining target acquisition times 149 within a respective production interval 138 (e.g., within different non-overlapping and/or non-corresponding production intervals 138). The TAT sets 449 may be configured to define corresponding target acquisition times 149, which may comprise target acquisition times 149 corresponding to same and/or similar temporal locations, offsets, target regions 212, and/or crop production stages 139 within each different production intervals 138. The target acquisition times 149 may be further configured to correspond with temporal coverage characteristics of the RS data 108, the availability of suitable RS data 108, and/or the like. In some embodiments, the target acquisition times 149 may be configured in accordance with the temporal coverage 189 of a yield model 183, as disclosed herein. Step 1510 may comprise determining target acquisition times 149 within respective production intervals 138, each target acquisition time 149 corresponding to a respective one of a plurality of modeled acquisition times 789 of the yield model 183 (e.g., by mapping, correlating, and/or otherwise translating respective modeled acquisition times 789 into each of the different production intervals 138, as disclosed herein).

Developing a yield model 183 at step 1510 may further comprise constructing a training dataset 775. The training dataset 775 for the yield model 183 may be constructed from the yield datasets 134 of the yield model 183 and imported RS data 108 corresponding to the yield datasets 134. Constructing the training dataset 775 for the yield model 183 may comprise: aggregating the yield datasets 134 and corresponding RS data 108 in accordance with a feature scheme 609, and generating a set of training vectors 675 in response to the aggregating, as disclosed herein. The aggregating may comprise translating and/or mapping yield values 135 of the yield datasets 134 and RSD elements 155 of the imported RS data 108 to the feature scheme 609. The feature scheme 609 may define a spatial scale, resolution, and/or granularity different from the spatial scale, resolution, and/or granularity of the yield datasets 134 and/or RSD elements 155. The feature scheme 609 may define a coarser spatial resolution (e.g., may define FV spatial elements 647 covering 25-meter areas, whereas the RSD elements 155 cover respective 20-meter areas). Constructing the training vectors 675 may comprise generating a first set of feature vectors 175, each feature vector 175 of the first set configured to cover respective subfield locations of one or more of the yield datasets 134 (per the FV spatial extent 177 thereof). Generating a feature vector 175 may comprise identifying RSD elements 155 that intersect with the FV spatial extent 177 thereof, and deriving feature elements 255 from the identified RSD elements 155. In some embodiments, a feature vector 175 may be configured to correspond with the temporal coverage 189 of a yield model 183, which may define a number of RSD acquisition times 159 spanned by respective feature vectors 175 (per the FV interval 179 thereof). Constructing a feature vector 175 may comprise constructing a plurality of feature elements 255, each configured to cover a respective one of a plurality of RSD acquisition times 159 (as specified by the FV interval 179 thereof), as disclosed herein. Constructing an feature element 255 configured to cover a specified RSD acquisition time 159 may comprise identifying RSD elements 157 that intersect with the FV spatial extent 177 of the feature vector 175, selecting RSD elements 155 having RSD acquisition times 159 corresponding to the specified RSD acquisition time 159 from the identified RSD elements 155, and deriving the RSD feature element 255 from the selected RSD elements 155. An RSD feature element 255 may comprise a plurality of RSD feature components 253, each of which may be derived from a corresponding RSD component 153 of the selected RSD elements 155. The RSD feature components 253 of respective feature elements 255 may comprise RS data 108 corresponding to one of a selected set of EM wavelengths and/or bands, as disclosed herein. An RSD feature element 255 may further comprise a plurality of RSD spatial lag components 263, which may be derived from neighboring feature vectors 175, as disclosed herein. The disclosed feature vectors 175 may comprise and/or be derived from RS data 108 configured to capture production of a specified crop within a specified subfield location (FV spatial extent 177), the RS data 108 spanning a plurality of RSD acquisition times 159 (e.g., comprising and/or derived from RSD elements 155 captured at each of a plurality of different RSD acquisition times 159), and spanning a plurality of RSD components 153 (e.g., comprising and/or derived from a plurality of different RSD components 153, each corresponding to a different respective EM wavelength and/or band, configured to capture respective attributes and/or characteristics of the specified crop). An feature vector 175 may, therefore, capture a plurality of different attributes and/or characteristics of a specified crop at each of a plurality of different acquisition times during production of the specified crop.

Generating the training vectors 675 for the yield model 183 may further comprise determining a plurality of yield quantities 635, each associated with a respective feature vector 175 of the first set. The yield quantities 635 may be derived from yield values 135 covered by FV spatial extents 177 of the first feature vectors 175, as disclosed herein. The training vectors 675 may, therefore, comprise and/or be derived from RS data 108 configured to capture a plurality of different attributes and/or characteristics of the specified crop as produced at a designated subfield location at each of a plurality of different RSD acquisition times 159 during production of the specified crop at the designated subfield location (e.g., a plurality of different EM wavelengths and/or bands covering the designated subfield location at each of the plurality of different RSD acquisition times 159). The yield quantities 635 of the training vectors 675 may indicate an actual yield of the specified crop harvested from the designated subfield locations of the respective training vectors 675.

Developing the yield model 183 at step 1510 may further comprise training the yield model 183 by use of the training dataset 775 constructed for the yield model 183, as disclosed herein. The training may comprise configuring ML components of the yield model 183 to produce accurate yield estimates 195 in response to suitable feature vectors 175 (e.g., feature vectors 175 compatible with the temporal coverage 189 of the yield model 183). Step 1510 may comprise implementing one or more training procedures, such as an iterative training procedure, a training epoch, a k-fold cross validation procedure, a dropout procedure, and/or the like.

Step 1520 may comprise estimating spatial yield characteristics within the production region. Step 1520 may comprise determining yield models for production of specified crops within unmeasured PZ 124 within the production region by use of the yield models 183 developed at step 1510. Step 1520 may comprise determining PZCY models 895 for unmeasured PZ 124 within the production region, as disclosed herein. Determining a PZCY model 895 for a defined PZ 124 within the production region may comprise: a) selecting a yield model 183 for the PZ 124; b) importing suitable RS data 108; c) constructing a feature dataset 875 for the PZ 124; and c) determining the PZCY model 895 by use of the feature dataset 875 and selected yield model 183. The PZ 124 may be defined in response to receiving, acquiring, and/or otherwise importing PZ data 121 pertaining to the PZ 124, as disclosed herein. Defining the PS 124 may comprise determining a spatial extent 137 of the PZ 124, specifying the crop produced within the PZ 124 over a determined production interval 138, and/or the like. Selecting the yield model 183 may comprise comparing the PZ 124 to YM data 184 of respective yield models 183. The selecting may comprise matching the crop produced within the PZ 124 to crop coverages 187 of the yield models 183. The selecting may further comprise matching spatial and/or temporal coverage characteristics of RS data 108 corresponding to the PZ 124 to the RS coverage 188 and/or temporal coverage 189 of respective yield models 183. The selecting may comprise identifying a yield model 183 having a crop coverage 187 that matches the crop produced within the PZ 124. The selecting may further comprise identifying a yield model 183 having an RS coverage 188 and/or temporal coverage 189 capable of being satisfied by RS data 108 available within one or more RSD repositories 107, as disclosed herein.

Importing suitable RS data 108 for modeling spatial yield characteristics within a PZ 124 may comprising importing RS data 108 configured to cover production of the specified crop within the PZ 124 in accordance with the RS coverage 188 and/or temporal coverage 189 of the selected yield model 183 (second RS data 108). The importing may comprise determining a plurality of target spatial elements 147 configured to cover the spatial extent 137 of the PZ 124, determining a plurality of target acquisition times 149 within the production interval of the PZ 124, and acquiring RS data 108 configured to capture each of the determined target spatial elements 147 at each of the determined target acquisition times 149. The target spatial elements 147 may be determined in accordance with coverage schemes 109 of one or more RSDA platforms 106. The target acquisition times 149 may be determined in accordance with temporal coverage characteristics of the RS data 108, as disclosed herein. The target acquisition times 149 may be configured to correspond with the temporal coverage 189 of the selected yield model 183. Step 1520 may comprise mapping, translating, and/or otherwise correlating respective modeled acquisition times 789 of the selected yield model 183 with corresponding target acquisition times 149 defined within the production interval 138 of the PZ 124.

Constructing the feature dataset 875 for the PZ 124 may comprise generating a second set of feature vectors 175, the feature vectors 175 of the second set configured to span a spatial extent 137 of the PZ 124. The constructing may comprise aggregating the second RS data 108 in accordance with the feature scheme 609, as disclosed herein (e.g., mapping RSD elements 155 of the second RS data 108 to the feature scheme 609). The feature vectors 175 of the second set may comprise and/or be derived from RS data 108 configured to capture respective portions of the spatial extent 137 of the PZ 124 at each of a plurality of different RSD acquisition times 159. Constructing a feature vector 175 of the second set may comprise identifying RSD elements 155 that intersect with the feature vector 175, and deriving the feature vector 175 from the identified RSD elements 155. The feature vectors 175 of the second set may be configured in accordance with the temporal coverage 189 of the selected yield model 183. The temporal coverage 189 may determine a number of RSD acquisition times 159 (and/or corresponding feature elements 255) included in respective feature vectors 175 of the second set. Constructing a feature vector 175 of the feature dataset 875 may comprise: identifying RSD elements 155 covered by the FV spatial extent 177 of the feature vector 175, selecting RSD elements 155 having RSD acquisition times 159 corresponding to respective modeled acquisition times 789 of the selected yield model 183, and deriving respective feature elements 255 of the feature vector 175 from the selected RSD elements 155, as disclosed herein. The feature vectors 175 of the feature dataset 875 may comprise and/or be derived from RS data 108 configured to capture production of the specified crop within respective subfield locations (FV spatial extents 177), the RS data 108 spanning a plurality of RSD acquisition times 159 (e.g., comprising and/or derived from RSD elements 155 captured at each of a plurality of different RSD acquisition times 159), and spanning a plurality of RSD components 153 (e.g., comprising and/or derived from a plurality of different RSD components 153, each corresponding to a different respective EM wavelength and/or band, configured to capture respective attributes and/or characteristics of the specified crop). Each feature vector 175 of the second set may, therefore, capture a plurality of different attributes and/or characteristics of the specified crop at each of the plurality of different acquisition times during production of the specified crop within the PZ 124.

Determining a PZCY model 895 for the PZ 124 comprise processing the feature vectors 175 of the feature dataset 875 by the selected yield model 183, as disclosed herein (e.g., processing each of the second feature vectors 175). Processing the feature vectors 175 may comprise configuring the yield model 183 to produce respective yield estimates 195, each configured to estimate yield of the specified crop within a specified subfield location of the PZ 124 (e.g., subfield locations within the FV spatial extents 177 of the feature vectors 175). Determining the PZCY model 895 may further comprise combining the yield estimates 195, such that the PZCY model 895 comprises yield estimates 195 encompassing the spatial extent 137 of the PZ 124, as disclosed herein.

In some embodiments, step 1520 may comprise determining forecast PZCY models 895 for respective fields within the production zone. Determining the forecast PZCY models 895 may comprise developing forecast yield models 183 for specified crops, and using the forecast yield models 183 to generate forecast PZCY models 895 for respective fields within the production region during a current production interval 138, as disclosed herein.

Step 1530 may comprise implementing one or more ILM operations within the production region. Step 1530 may comprise implementing the ILM operations based on, inter alia, utility datasets 897 determined for respective fields within the production region. Step 1530 may comprise determining utility datasets 897 for respective PZ 124, as disclosed herein. In some embodiments, step 1530 may further comprise determining utility datasets 897 for one or more imported yield datasets 134 (e.g., measured fields). The utility dataset 897 determined for a field may comprise a plurality of utility metrics 197, each configured to quantify a utility for production of a specified crop within respective subfield locations (e.g., a respective FV spatial extent 177). The utility dataset 897 may further comprise a field utility metric 898, which may be configured to quantify a utility for production of the specified crop within the field as a whole (e.g., may be derived from the utility metrics 197 comprising the utility dataset 897).

Step 1530 may further comprise determining ILM operations for respective fields (e.g., fields corresponding to respective PZ 124 and/or yield datasets 134). Step 1530 may comprise evaluating the utility datasets 897 of the respective fields. A field may be selected for an ILM operation in response to determining that value, cost, and/or efficiency metrics of field fail to satisfy one or more utility thresholds, as disclosed herein. In some embodiments the utility thresholds may be based on, inter alia, field utility metrics 898 of other fields within the production region. Step 1530 may comprise designating a second crop to replace a first crop produced within a particular field (e.g., a particular PZ 124). The second crop may be selected to, inter alia, improve the determined utility metrics 197 of the PZ 124. The second crop may be selected from crops having a higher value than the first crop, lower production costs than the first crop, lower production requirements than the first crop, lower carbon footprint, and/or the like, as disclosed herein.

In some embodiments, step 1530 may comprise determining an optimal production scheme for the production region, as disclosed herein. Step 1530 may comprise determining a target crop output for the production region, which may comprise defining target yields for each of a plurality of crops (e.g., a plurality of production constraints Pc). Step 1530 may further comprise assigning crops to produce in respective fields (e.g., determining crop yields $y_{c\_f}$ for each of L fields). Step 1530 may comprise assigning crops having relatively high production costs and/or requirements (e.g., relatively high cost metrics as compared to other crops) to fields having relatively high field utility metrics 898 (e.g., high efficiency metrics as compared to other fields within the production zone). Step 1530 may further comprise assigning crops having relatively low production costs and/or requirements to fields having relatively low field utility metrics 898. Alternatively, or in addition, the step 1530 may comprise determining an optimal solution to an optimization problem, the optimization problem configured to: a) quantify production costs as a function of crop yields produced therein (and/or field utility metrics 898 determined for the fields, as disclosed herein), b) define crop production constraints specifying yields of specified crops to produce across the plurality of fields within the production region. Step 1530 may comprise determining an optimal solution that satisfies the defined crop production constraints at minimal aggregate cost across the plurality of fields, as disclosed herein.

In some embodiments, step 1530 may comprise determining yield forecasts for specified crops produced during a current production interval 138. The yield forecast for a specified crop may be determined at or near a harvest time of the specified crop (e.g., at an end 213 of the current production interval 138). The yield forecast may estimate of a yield amount of the specified crop forecast produced within the production region (e.g., produced by a plurality of different fields within the production region). The management module 190 determine management instructions 199 specifying operations to optimize utilization of the specified crop in accordance with the determined field forecast, which may include, but are not limited to: delay utilization of the specified crop, transfer portions of the specified crop into long term storage, sell portions of the specified crop at particular times, and/or the like.

As disclosed above, in some embodiments, step 1520 may comprise determining forecast PZCY models 895 for respective fields. The forecast PZCY models 895 may be determined during a current production interval 138 (by use of suitable forecast yield models 183). Step 1530 may comprise utilizing the forecast PZCY models 895 to implement ILM operations, as disclosed herein. Step 1530 may comprise determining yield forecasts for specified crops based on, inter alia, the forecast PZCY models 895. Step 1530 may further comprise determining whether to continue production within one or more fields based on the yield forecasts. Step 1530 may comprise determining to stop production within a designated field in response to the yield forecast for the crop being produced within the designated field exceeding a high yield threshold. The field may be selected in accordance with field utility metrics 898 produced in response to generating the forecast PZCY models 895, as disclosed herein (may be the field having lowest field utility metrics 898 of a group of fields producing the crop during the current production interval 138). In some embodiments, step 1530 may comprise determining VRT operations to modify production within one or more fields (and/or respective subfield locations) in accordance with the determined yield forecasts (e.g., increase yields at increased production cost or decrease production costs, resulting in decreased yields). In another embodiment, step 1530 may comprise causing a field to transition from production of a first crop to a second crop based on, inter alia, yield forecasts for the first and second crops.

Step 1530 may comprise producing management instructions 199 corresponding to the determined ILM operations (e.g., the optimal production scheme). Step 1530 may further comprise communicating the management instructions 199 to respective producers within the production region and/or machines involved in crop production within one or more of the fields (e.g., through the network 101). The management instructions 199 may be configured for implementation during a current production interval 138 and/or in one or more subsequent production intervals 138. The management instructions 199 may comprise instructions to, inter alia, indicate whether specified fields should be used for crop production in a current production interval 138 and/or one or more subsequent production intervals 138, designate crops to produce within specified fields, define an optimal production scheme for one or more fields (e.g., an optimal production scheme for fields within a particular production region), designate crop production levels for specified fields (and/or subfield locations), specify production inputs to apply within specified fields (e.g., VRT instructions for respective fields and/or specified subfield locations), specify utilization of specified crop yields in accordance with determined yield forecasts, manage crop production within specified fields during a current production interval 138 (e.g., cease production within one or more fields), and/or the like.

In the disclosure, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with optical character recognition systems, server computers, and/or communications networks have not been shown or described in detail to avoid unnecessarily obscuring descriptions of the embodiments.

Unless the context requires otherwise, as used herein, the word "comprise" and variations thereof, such as "comprises" and "comprising," are to be construed in an open, inclusive sense, that is as "including, but not limited to."

As used herein, "one embodiment" or "an embodiment" means that a particular feature, structure, or characteristic described in connection with the embodiment is included in at least one embodiment. Thus, the appearances of the phrases "in one embodiment" or "in an embodiment" herein are not necessarily all referring to the same embodiment. Furthermore, the particular features, structures, or characteristics may be combined or assembled in any suitable manner in one or more embodiments.

As used herein, the singular forms "a," "an," and "the" include plural referents unless the content clearly dictates otherwise. It should also be noted that the term "or" is generally employed in its broadest sense, that is, as meaning "and/or" unless the content clearly dictates otherwise.

We claim:

1. A computer-implemented method for spatial crop yield modeling, comprising:
    constructing training vectors for a yield model, comprising:
        deriving yield quantities from yield measurements of a specified crop produced at respective subfield locations within a first field during a first production interval, and
        constructing a first set of feature vectors, the feature vectors of the first set derived from remote sensing data configured to capture respective subfield locations within the first field at each of a plurality of first acquisition times during the first production interval;
    training the yield model to estimate yield quantities associated with respective feature vectors of the first set in response to the respective feature vectors; and
    configuring the yield model to estimate spatial yield characteristics of the specified crop produced in a second field during a second production interval in response to a second set of feature vectors, wherein feature vectors of the second set are derived from remote sensing data configured to capture respective subfield locations within the second field at each of one or more second acquisition times during the second production interval, each of the second acquisition times corresponding to a respective one of the first acquisition times.

2. The computer-implemented method of claim 1, further comprising:
    mapping the yield measurements and remote sensing data configured to capture respective subfield locations within the first field to a feature scheme; and
    deriving the yield quantities for respective feature vectors of the first set in response to the mapping;
    wherein the feature scheme comprises a spatial scale different from a spatial scale of the remote sensing data.

3. The computer-implemented method of claim 1, wherein the feature vectors are configured to cover respective geographical areas, and wherein constructing a feature vector configured to cover a specified geographical area comprises:
    identifying remote sensing data that intersects with the specified area; and
    deriving the feature vector from the identified remote sensing data.

4. The computer-implemented method of claim 1, wherein the feature vectors are configured to cover respective geographical regions at each of a plurality of acquisition times, and wherein constructing a feature vector configured to cover a particular geographical region from imported remote sensing data comprises:
    translating the imported remote sensing data to a spatial feature scheme comprising the particular geographical region;
    identifying remote sensing data of the imported remote sensing data that covers the particular geographical region in response to the translating; and
    deriving a plurality of data elements from the identified remote sensing data, each data element corresponding to a respective acquisition time of the plurality of acquisition times, wherein deriving a data element corresponding to a particular acquisition time comprises:
        selecting remote sensing data of the identified remote sensing data that was captured at the particular acquisition time, and
        deriving the data element from the selected remote sensing data.

5. The computer-implemented method of claim 1, wherein the remote sensing data comprises reflectance measurements of one or more electro-magnetic radiation wavelengths and electro-magnetic radiation bands.

6. The computer-implemented method of claim 1, further comprising:
    configuring the plurality of first acquisition times to correspond with respective target regions defined within the first production interval;

importing first remote sensing data for respective subfield locations within the first field, wherein importing first remote sensing data for a particular subfield location comprises importing a plurality of remote sensing data elements, each configured to capture the particular subfield location at a respective one of the plurality of first acquisition times; and constructing the first set of feature vectors from the first remote sensing data, each feature vector of the first set derived from remote sensing data elements configured to capture a respective subfield location within the first field at each of the plurality of first acquisition times.

7. The computer-implemented method of claim 6, further comprising:

configuring the plurality of second acquisition times to correspond with respective target regions defined within the second production interval;

importing second remote sensing data for respective subfield locations within the second field, wherein importing second remote sensing data for a particular subfield location comprises importing a plurality of remote sensing data elements, each configured to capture the particular subfield location at a respective one of the plurality of second acquisition times; and constructing the second set of feature vectors from the second remote sensing data, each feature vector of the second set derived from remote sensing data elements configured to capture a respective subfield location within the second field at each of the plurality of second acquisition times.

8. The computer-implemented method of claim 7, wherein the target regions defined within the second production interval are configured to correspond with the target regions defined within the first production interval.

9. The computer-implemented method of claim 7, wherein:

the first acquisition times are configured to correspond with respective developmental stages of the specified crop during the first production interval; and the second acquisition times are configured to correspond with the respective developmental stages of the specified crop during the second production interval.

10. A non-transitory computer-readable storage medium comprising instructions adapted to configure a computing device to implement operations for spatial crop yield modeling, the operations comprising:

acquiring yield measurements of a specified crop produced within first regions in first production intervals;

importing first remote sensing data, comprising first remote sensing data corresponding to the acquired yield measurements, the first remote sensing data acquired at respective acquisition times of a plurality of first acquisition times during the first production intervals;

producing first feature vectors from the first remote sensing data, each feature vector of the first feature vectors comprising remote sensing data covering a respective spatial extent at each of the plurality of first acquisition times;

generating a training dataset comprising:
feature vectors having spatial extents corresponding to the first regions, and
yield values derived from yield measurements within spatial extents of respective feature vectors of the training dataset;

training a yield model to produce yield estimates for respective spatial extents in response to feature vectors of the training dataset; and configuring the trained yield model to estimate spatial yield characteristics of the specified crop within a second region during a second production interval in response to second feature vectors derived from second remote sensing data configured to capture respective subfield locations within the second region at each of one or more second acquisition times during the second production interval, each of the second acquisition times corresponding to a respective one of the first acquisition times.

11. The non-transitory computer-readable storage medium of claim 10, wherein one or more of the first remote sensing data and the second remote sensing data comprise reflectance measurements of one or more electro-magnetic radiation bands, the electro-magnetic bands comprising one or more of band 2, band 3, band 4, band 5, band 6, band 8a, band 11, and band 12.

12. The non-transitory computer-readable storage medium of claim 10, wherein producing a feature vector of the training data set further comprises:

overlaying the remote sensing data with a feature scheme having a resolution different from a resolution of the remote sensing data;

identifying remote sensing data overlaid by respective elements of the feature scheme; and deriving the feature vector from the identified remote sensing data.

13. The non-transitory computer-readable storage medium of claim 10, wherein producing a feature vector configured to cover a particular spatial extent comprises:

identifying elements of the remote sensing data that intersect with the particular spatial extent, the identifying comprising determining correlation metrics configured to quantify a degree to which respective elements of the identified elements intersect with the particular spatial extent; and deriving the feature vector from the identified elements of the remote sensing data, the deriving comprising weighting respective elements of the identified elements in accordance with the determined correlation metrics.

14. The non-transitory computer-readable storage medium of claim 10, wherein producing a feature vector of the first feature vectors comprises:

identifying first remote sensing data that intersects with a spatial extent of the feature vector, selecting first subsets of the first remote sensing data, each comprising remote sensing data of the first remote sensing data acquired at a respective one of the first acquisition times, and deriving feature elements of the feature vector from respective ones of the first subsets, such that each feature element of the feature vector is derived from remote sensing data that intersects with the spatial extent of the feature vector captured at a respective one of the first acquisition times.

15. The non-transitory computer-readable storage medium of claim 14, the operations further comprising producing the second feature vectors, each feature vector of the second feature vectors configured to cover a respective spatial extent within the second region, wherein producing a feature vector of the second feature vectors comprises:

identifying second remote sensing data that intersects with the spatial extent of the feature vector, selecting second subsets of the second remote sensing data, each comprising remote sensing data of the second remote sensing data acquired at a respective one of the second acquisition times, and deriving feature elements of the feature vector from respective ones of the second subsets, such that each feature element of the feature vector is derived from remote sensing data that intersects with the spatial extent of the feature vector captured at a respective one of the second acquisition times.

16. The non-transitory computer-readable storage medium of claim 15, wherein:

the first acquisition times are determined to correspond with designated developmental stages of the specified crop during respective production intervals of the first production intervals; and the second acquisition times are configured to correspond with same developmental stages as the designated developmental stages of the specified crop during the second production interval.

17. The non-transitory computer-readable storage medium of claim 16, the operations further comprising:

defining target regions corresponding to respective developmental stages of the designated developmental stages of the specified crop into one or more of the first production intervals and the second production interval; and determining one or more of the first acquisition times and the second acquisition times in accordance with the defined target regions.

18. The non-transitory computer-readable storage medium of claim 16, wherein:

importing the first remote sensing data corresponding to the acquired yield measurements comprises:

determining N target spatial elements, wherein N is a positive integer greater than zero, each target spatial element of the N target spatial elements covering respective extents within the first regions, determining M acquisition times for the first acquisition times, wherein M is a positive integer greater than zero, each acquisition time of the M acquisition times within one or more of the first production intervals, and importing N×M remote sensing data elements, each remote sensing data element configured to capture a respective extent within the first regions at one of the M acquisition times; and producing the first feature vectors comprises:

mapping the first remote sensing data and the yield measurements to spatial extents of respective feature vectors of the first feature vectors, and deriving feature vectors of the first feature vectors and corresponding yield measurements in response to the mapping.

19. The non-transitory computer-readable storage medium of claim 18, wherein producing the first feature vectors further comprises:

determining M-X acquisition times for the first feature vectors, the determining comprising selecting acquisition times corresponding to respective ones of the M acquisition times, wherein X is a positive integer between 0 and M−1; and constructing M-X feature elements for each feature vector of the first feature vectors, wherein constructing the M-X feature elements for a feature vector comprises:

identifying remote sensing data that intersects with the spatial extent of the feature vector in response to the mapping, determining M-X subsets of the identified remote sensing data, each subset of the M-X subsets comprising remote sensing data of the identified remote sensing data, acquired at one of the determined M-X acquisition times, and deriving each feature element of the M-X feature elements from remote sensing data of a respective one of the M-X subsets.

20. The non-transitory computer-readable storage medium of claim 19, wherein:

the M-X acquisition times are defined within first portions of the first production intervals, such that the yield model is configured to produce yield estimates for production of the specified crop within the second region prior to completion of the second interval.

21. A yield modeling apparatus, comprising:

a computing device comprising a processor, memory, and non-transitory storage;

an acquisition module configured for operation on the processor of the computing device, the acquisition module configured to import remote sensing data from one or more repositories, including first remote sensing data configured to cover yield measurements of a specified crop produced during a first season at specified locations within a first field;

a feature construction module configured to construct model training data, comprising a first set of feature vectors configured to cover respective subfield locations within the first field, the feature vectors of the first set derived from remote sensing data configured to capture respective subfield locations within the first field at each of a determined number of capture times;

wherein the feature construction module is further configured to associate the first set of feature vectors with respective yield quantities, each derived from yield measurements captured at subfield locations covered by the respective feature vectors of the first set; and a yield modeling module configured to train a yield model to accurately reproduce yield quantities in response to corresponding feature vectors of the first set;

wherein the yield modeling module is further configured to estimate spatial yield characteristics of the specified crop produced in a second field during a second season in response to a second set of feature vectors, the feature vectors of the second set derived from remote sensing data configured to capture respective subfield locations within the second field at each of the determined number of capture times.

22. The yield modeling apparatus of claim 21, wherein constructing a feature vector configured to capture a particular spatial extent at each of the determined number of capture times comprises the feature construction module:

projecting remote sensing data onto a feature scheme comprising the particular spatial extent, wherein a scale of the particular spatial extent differs from a scale of the remote sensing data;

identifying remote sensing data overlaid by the particular spatial extent in response to the projecting;

selecting remote sensing data that was acquired at times corresponding to each capture time of the determined number of capture times from the identified remote sensing data; and constructing the feature vector from the selected remote sensing data, such that the feature vector comprises remote sensing data configured to capture same subfield locations at each of a plurality of different capture times.

23. The yield modeling apparatus of claim 21, wherein importing the first remote sensing data comprises the acquisition module:
- determining first target spatial elements, the first target spatial elements configured to span a spatial extent of the first field;
- determining first target acquisition times, the first target acquisition times configured to correspond with respective production stages of the specified crop during the first season; and
- importing a first plurality of remote sensing data elements, each configured to capture a respective one of the first target spatial elements at a respective one of the first target acquisition times.

24. The yield modeling apparatus of claim 23, wherein the acquisition module is further configured to import second remote sensing data corresponding to production of the specified crop within the second field during the second season, wherein importing the second remote sensing data comprises the acquisition module:
- determining second target spatial elements, the second target spatial elements configured to span a spatial extent of the second field;
- determining second target acquisition times, the second target acquisition times configured to correspond to the respective production stages of the specified crop during the second season; and
- importing a second plurality of remote sensing data elements, each configured to capture a respective one of the second target spatial elements at a respective one of the second target acquisition times.

\* \* \* \* \*